(12) United States Patent
George et al.

(10) Patent No.: US 9,392,028 B2
(45) Date of Patent: Jul. 12, 2016

(54) APPARATUS AND METHOD FOR MACRO OPERATION INVOLVING A PLURALITY OF SESSION PROTOCOL TRANSACTIONS

(75) Inventors: Richard George, Mapleton (CA); Alexander Shatsky, Waterloo (CA)

(73) Assignee: BlackBerry Limited, Waterloo (CA)

( * ) Notice: Subject to any disclaimer, the term of this patent is extended or adjusted under 35 U.S.C. 154(b) by 993 days.

(21) Appl. No.: 12/555,366

(22) Filed: Sep. 8, 2009

(65) Prior Publication Data

US 2010/0064172 A1 Mar. 11, 2010

Related U.S. Application Data

(60) Provisional application No. 61/095,272, filed on Sep. 8, 2008.

(51) Int. Cl.
*G06F 15/16* (2006.01)
*H04L 29/06* (2006.01)
*H04L 29/08* (2006.01)

(52) U.S. Cl.
CPC ............ *H04L 65/1006* (2013.01); *H04L 67/04* (2013.01); *H04L 67/14* (2013.01); *H04L 67/143* (2013.01); *H04L 67/147* (2013.01); *H04L 69/10* (2013.01)

(58) Field of Classification Search
CPC ..... H04L 67/14; H04L 67/04; H04L 65/1006; H04L 67/147; H04L 69/10; H04L 67/143
USPC .......................................... 709/230, 227, 204
See application file for complete search history.

(56) References Cited

U.S. PATENT DOCUMENTS

| 5,559,800 A | 9/1996 | Mousseau et al. |
| 7,337,221 B2 | 2/2008 | Radi et al. |

(Continued)

FOREIGN PATENT DOCUMENTS

| WO | 2007069944 | 6/2007 |
| WO | 2008004147 | 1/2008 |

(Continued)

OTHER PUBLICATIONS

International Search Report and Written Opinion issued on Dec. 8, 2009 from corresponding PCT Application No. PCT/CA2009/001216.

(Continued)

*Primary Examiner* — Richard G Keehn
*Assistant Examiner* — Mohammed Ahmed
(74) *Attorney, Agent, or Firm* — Borden Ladner Gervais LLP; Todd A. Keeler

(57) ABSTRACT

An apparatus and method for macro operation involving a plurality of session protocol transactions is disclosed. In accordance with an embodiment of the disclosure, a mobile device generates a binary encoded message having an indication from which a server can determine a plurality of session protocol transactions to be performed. The binary encoded message is sent from the mobile device and received by the server. In accordance with an embodiment of the disclosure, the server determines the plurality of session protocol transactions to be performed based on the indication in the binary encoded message and attempts the plurality of session protocol transactions. By reducing the number of messages between the mobile device and the server, and by reducing the message size compared to SIP messages, communication resources for the mobile device can be conserved. Also battery power for the mobile device can be conserved.

20 Claims, 31 Drawing Sheets

(56) References Cited

U.S. PATENT DOCUMENTS

| | | | |
|---|---|---|---|
| 7,412,541 | B1 | 8/2008 | Stadler et al. |
| 7,529,845 | B2 | 5/2009 | Liu |
| 2002/0126626 | A1 | 9/2002 | Singh et al. |
| 2003/0210649 | A1 | 11/2003 | Bondi |
| 2004/0024901 | A1 | 2/2004 | Agrawal et al. |
| 2005/0058125 | A1 | 3/2005 | Mutikainen et al. |
| 2006/0077957 | A1* | 4/2006 | Reddy et al. .................. 370/352 |
| 2006/0155814 | A1 | 7/2006 | Bennett |
| 2006/0239251 | A1* | 10/2006 | Bennett et al. ................ 370/352 |
| 2006/0259616 | A1 | 11/2006 | Lester |
| 2007/0104125 | A1 | 5/2007 | Ghai |
| 2007/0121808 | A1 | 5/2007 | Brunson et al. |
| 2007/0153775 | A1* | 7/2007 | Renschler .................... 370/356 |
| 2007/0281682 | A1 | 12/2007 | Raju et al. |
| 2008/0016100 | A1 | 1/2008 | Boni et al. |
| 2008/0056232 | A1 | 3/2008 | Koon et al. |
| 2008/0098117 | A1* | 4/2008 | Fukuhara et al. ............. 709/227 |
| 2008/0163318 | A1 | 7/2008 | Chen et al. |
| 2008/0216167 | A1 | 9/2008 | Imai et al. |
| 2009/0003325 | A1 | 1/2009 | Lee et al. |
| 2009/0024601 | A1 | 1/2009 | Zmolek |
| 2009/0086719 | A1 | 4/2009 | Mutikainen et al. |
| 2009/0210536 | A1* | 8/2009 | Allen et al. ................... 709/227 |

FOREIGN PATENT DOCUMENTS

| | | |
|---|---|---|
| WO | 2008075235 | 6/2008 |
| WO | 2009055827 | 4/2009 |

OTHER PUBLICATIONS

Signaling Compression retrieved on Sep. 3, 2008 from http://en.wikipedia.org/wiki/Sigcomp.

IMS CS Control Protocol (ICCP) Discussion Paper (3GPP TSG SA WG2 Architecture—S2#57 [S2-071840], Apr. 23-37, 2007, Beijing, China) 8 pages.

I1 Mobile Terminated session using Enhanced MSC for ICS (3GPP TSG CT WG1 Meeting #55 [C1-083324], Budapest, Hungary, Aug. 18-22, 2008) 9 pages.

I1 Mobile Originated session using Enhanced MSC for ICS (3GPP TSG CT WG1 Meeting #55 [C1-083323], Budapest, Hungary, Aug. 18-22, 2008) 9 pages.

I1 Mobile Terminated session using Enhanced MSC for ICS (EGPP TSG CT WG1 Meeting #55 [C1-083050], Budapest, Hungary, Aug. 18-22, 2008) 10 pages.

I1 Mobile Originated session using Enhanced MSC for ICS (EGPP TSG CT WG1 Meeting #55 [C1-083049], Budapest, Hungary, Aug. 18-22, 2008) 8 pages.

Alcatel-Lucent: "I1-ps, I1-cs and service support" 3GPP Draft; S2-072801 Analysis of ICCP and Service Support—Updated, 3rd Generation Partnership Project (3GPP), Mobile Competence Centre; 650, Route Des Lucioles; F-06921 Sophia-Antipolis Cedex; France, vol. SA WG2, no. Orlando; 20070702, Jul. 2, 2007, pp. 1-5, XP050260326 [retrieved on Jul. 2, 2007].

Nortel et al: "Unified ICS Architecture" 3GPP Draft; S2-075295—ICS-TR-10-A Unified ICS Architecture-R1, 3rd Generation Partnership Project (3GPP), Mobile Competnence Centre; 650, Route Des Lucioles; F-06921 Sophia-Antipolis Cedex; France, vol. SA WG2, no. Ljubljana; 20071102, Nov. 2, 2007, pp. 1-4, XP050262000 [retrieved on Nov. 2, 2007].

3GPP: "3rd Generation Partnership Project; Technical Specification Group Services and System Aspects; IP Multimedia System (IMS) centralized services (Release 8)" 3GPP Draft; 23892-200, 3rd Generation Partnership Project (3GPP), Mobile Competence Centre; 650, Route Des Lucioles; F-06921 Sophia-Antipolis Cedex; France, vol. TGS SA, no. Puerto Vallarta, Mexico; 20080305, Mar. 5, 2008, XP 050210619 [retrieved on Mar. 5, 2008].

Extended European Search Report that issued on Jan. 28, 2010 from corresponding European Patent Application No. 09169787.0.

Nordberg M. et al.: "Improving sigcomp performance through extended operations" Vehicular Technology Conference, 2003. VTC 2003-Fall. 2003 IEEE 58th Orlando, FL, USA Oct. 6-9, 2003; [IEEE Vehicular Technology Conference], Piscataway, NJ, USA, IEEE, US, vol. 5, Oct. 6, 2003, pp. 3425-3428, XP010701516 ISBN: 978-0-7803-7954-1.

International Search Report and Written Opinion that issued on Dec. 4, 2009 from corresponding PCT Patent Application No. PCT/CA2009/056233.

Examination Report dated Oct. 18, 2013 from corresponding European Patent Application No. 09 169 787.0.

Examiner's Report dated Jun. 15, 2015, issued in respect of corresponding Canadian Patent Application No. 2,736,313.

Office Action dated Mar. 9, 2015, issued in respect of corresponding European Patent Application No. 09169787.0.

Office Action dated Dec. 9, 2013 from related U.S. Appl. No. 13/062,882.

Examiner's Report dated Apr. 13, 2016, issued in respect of the corresponding Canadian Patent application No. 2,736,313.

* cited by examiner

| Request | Value (12 bit) | Description |
|---|---|---|
| INVITE | 0x1 | Request to connect a multimedia session; this is similar to a SIP INVITE in semantics, except that this is not a 3 way handshake. |
| BYE | 0x2 | Disconnect a dialog (including early dialog), similar to SIP BYE. |
| UPDATE | 0x3 | Updates an existing dialog, usually with a new SDP |
| SUBSCRIBE | 0x4 | Subscribe to a certain event type. |
| NOTIFY | 0x5 | Notification of an event, notify can be both solicited i.e. with an existing subscription and also un-solicited, without a subscription. |
| CANCEL | 0x6 | Similar to SIP CANCEL, used to cancel a transaction when a final response for the transaction has not been generated. Unlike SIP can be used only after the dialog is established, and only for requests to which it can take long time to respond. |
| OPTIONS | 0x7 | Similar to SIP OPTIONS, used to transmit the capability of the end point or the server. |
| INFO | 0x8 | Similar to SIP INFO, used to transmit arbitrary data between the BEV EP and Server. |
| RESERVED | 0x9 | Reserved for future verbs |
| RESERVED | 0xA | Reserved for future verbs |
| SWAP | 0xB | Swap the current call with the call referred in this message. Any of the calls may be active at this time. |
| UTRANSFER | 0xC | Unattended transfer request. |
| ATRANSFER_START | 0xD | Start the attended transfer request. |
| ATRANSFER_FINISH | 0xE | Finish the attended transfer request. |
| RESERVED | 0xF | Reserved for future verbs |
| REVERT | 0x10 | Revert current macro state to a state prior to the last completed transaction. E.g. after the AFTRANSFER_START the initiator may want to revert back to original state e.g. if the callee did not want to take this transfer. |
| PUBLISH | 0x11 | Similar to SIP PUBLISH, used to publish presence state. |
| SUPPLANT | 0x12 | Establish a new call with attributes/SDP in the request and teardown an existing call referred in the Rcall Id header. |

FIG. 4A

| MESSAGE | 0x13 | Similar to SIP MESSAGE, used to send unsolicited notification to the device, or vice-versa. |
|---|---|---|
| MOVE | 0x14 | Used when the device needs to do the following:<br>- Move to desk when active on VoIP call<br>- Move to desk when active on Cellular call<br>- Handoff to Cellular from VoIP<br>- Handoff to VoIP from Cellular |
| HEALTH-CHECK | 0x15 | Used to check the health of a device. |
| RESERVED | 0x15-FFF | Reserved for future verbs |

FIG. 4B

| Request | Value (12 bit) | Description |
|---|---|---|
| PROGRESS | 0x100-0x1FF | A general purpose provisional response, semantically similar to 1xxclass responses. A SIP 100 trying would be response code 0x100 which is 256 in decimal. |
| SUCCESS | 0x200-0x299 | Indicates that the request was successful. |
| REDIRECT | 0x300-0x399 | SIP Redirect responses. |
| FAILURE | 0x400-0x499 | 4xx class failure response |
| CLIENT TRANSACTION IN PROGRESS | 0x49B | If a BEV request is received by either the end point or server and it had previously sent a request, a final response to which has not yet been received then it responds to this new request with this CTIP response. |
| SERVER TRANSCATION IN PROGRESS | 0x49C | If a BEV request is received by either the end point or server and it has received a request, a final response to which has not yet been sent then it responds to this new request with this STIP response. |
| SESSION INTERVAL TOO HIGH | 0x49D | The server responds with this when the requested expiration interval in Expires header is too high. |
| SUBSCRIPTION INTERVAL TOO HIGH | 0x49E | The server responds with this when the requested expiration interval in Subscription-Expires header is too high |
| COULD NOT REVERT TXN | 0x49F | The server could not revert the transaction. (Please see Transactions section for details) |
| FAILURE | 0x500-0x599 | 5xx class failure response |
| FAILURE | 0x600-0x699 | 6xx class failure response |

FIG. 5

| Header Name | Type | Usage (Different from SIP) | Usage | Order | Presence |
|---|---|---|---|---|---|
| Call-Id | 0x05 | The Call-Id of this call, this is similar to SIP call-id, one Call-Id always refers to one and only one dialog. | 8 octet encoded | 1 | m |
| Sequence-Id | 0x10 | A running sequence for new requests within a dialog. | Big endian integer occupying four octets. | 2 | m |
| From | 0x03 | The URI of the caller, this can be a SIP URI, Tel URL or any other URI scheme including a plain string, this is used primarily for identification and display purposes. | TLV String | 3 | m/rq, o/rs |
| To | 0x04 | The URI to which the request is addressed, this can be a SIP URI, Tel URL or any other URI scheme including a plain string, this is used primarily for identification and display purposes. To in responses may carry ANI information. | TLV String | 4 | m/rq, o/rs |
| R-URI | 0x0?? | Same as the SIP Request URI. This can be a SIP URI, Tel URI or any other URI scheme | TLV String | 5 | m/rq, o/rs |
| RCall-Id | 0x06 | Referred Call-Id. In some messages an existing call may be referred in a new call. This header holds that call id. An example could be Join, Replaces or Swap usage. | 8 octet encoded | 6* | o |
| Timestamp | 0x07 | The timestamp in UTC timestamp format of the message creation time. | Big endian integer occupying four octets. | 7* | o |

FIG. 6A

| | | | | |
|---|---|---|---|---|
| Content-Type | 0x01 | Same semantics as SIP, the content type is a string like "application/sdp" encoded according to CMIME | Please see content handling in description | Last header if present, can only be followed by content disposition | 0 |
| Content-Disposition | 0x02 | SIP semantics, encoded according to CMIME | Please see content handling in description | Last optional header | 0 |
| App-Id | 0x08 | The token(s) that identify an application both on the HH and the server. This indicates the application that either initiated this message or the application to which this message is destined to. E.g. "app1" Further the App Id header can have a list of features after the application id in this header. The separator between app id and feature tags is ";", and features themselves are comma separated. Eg. "app1;f1,f2,f3" | TLV String and is a multi-valued header | 8* | o, m if there is app features header |
| Refer-To | 0x0A | A URI resource that is being referenced. | TLV String | 9* | 0 |
| Expires | 0x0B | Time in seconds. | Big endian integer occupying four octets. | 10* | m in dialog creation request, o in INVITE or subsequent request and o in responses. |
| Subject | 0x0C | Similar to SIP Subject header | TLV String | 11* | O |

FIG. 6B

| | | | | |
|---|---|---|---|---|
| Contact | 0x0D | Similar to SIP Contact, but used exclusively for forwarding the calls | TLV String | 12* | m in 0x39A response code, 0 otherwise. |
| Subscription-Expires | 0x0E | Time in seconds. | Big endian integer occupying four octets. | 13* | m in SUBSCRIBE, 0 in NOTIFY and responses to SUBSCRIBE |
| Event | 0x0F | The event name that is being subscribed to. | TLV String | 14* | m in SUBSCRIBE / NOTIFY request, n otherwise. |
| Remote-Id | 0x15 | The event name that is being subscribed to. | TLV String | 15* | 0 in UPDATE request. |
| Reason | 0x11 | The reason for a request. For example, the reason with the value of 0x01 for the BYE request indicates the user was removed from the system through the MVS console.<br><br>The reason for a macro request by indicating the failure:<br>61 – Holding Error (Swap)<br>62 – Resuming Error (Swap)<br>63 – Peer Call doesn't exist<br>64 – Peer Dialog doesn't exist<br>65 – Internal error | 1 octet | 16* | o/rq |

APPARATUS AND METHOD FOR MACRO OPERATION INVOLVING A PLURALITY OF SESSION PROTOCOL TRANSACTIONS

RELATED APPLICATION

This application claims the benefit of U.S. provisional application No. 61/095,272 filed Sep. 8, 2008, the entire disclosure of which is incorporated by reference.

COPYRIGHT NOTICE

A portion of this disclosure contains material that is subject to copyright protection. The copyright owner has no objection to the facsimile reproduction of this disclosure as it appears in the Patent and Trademark Office patent file or records, but otherwise reserves all copyrights whatsoever.

FIELD OF THE DISCLOSURE

This disclosure relates to communication protocols, and more particularly to communication protocols for session management between peers.

BACKGROUND OF THE DISCLOSURE

SIP (Session Initiation Protocol) is defined by IETF (Internet Engineering Task Force) in RFC (Request for Comments) 3261 and has been developed to allow session control between peers. A session is also known as a call. SIP is typically used for initiating/setting up and tearing down/terminating multimedia communication sessions such as but not limited to voice and video calls etc over an IP bearer such as that provided by the Internet. SIP is a derivative of the HTTP (Hypertext Transfer Protocol) system, which is ASCII (American Standard Code for Information Interchange) based. SIP is intended to support a superset of the call processing functions present in the PSTN (Public Switched Telephone Network). Thus, SIP can be used for operations such as but not limited to call setups, call terminations, call modifications and call transfers etc. These operations can also be collectively known as SIP operations.

SIP SigComp (as per RFC 5049 Applying Signaling Compression (SigComp) to the Session Initiation Protocol) is a mechanism that uses a compression scheme to compress SIP strings thereby achieving a smaller payload. Compressed SIP strings are sent to the device and then de-compressed by the device.

BRIEF DESCRIPTION OF THE DRAWINGS

Embodiments will now be described with reference to the attached drawings in which:

FIG. 4 is a table of example request verbs defined for a BEV (Binary Encoded Verb Protocol);

FIG. 5 is a table of example response codes defined for BEV;

FIG. 6 is a table of example headers defined for BEV;

DETAILED DESCRIPTION OF EMBODIMENTS

Figure 1:
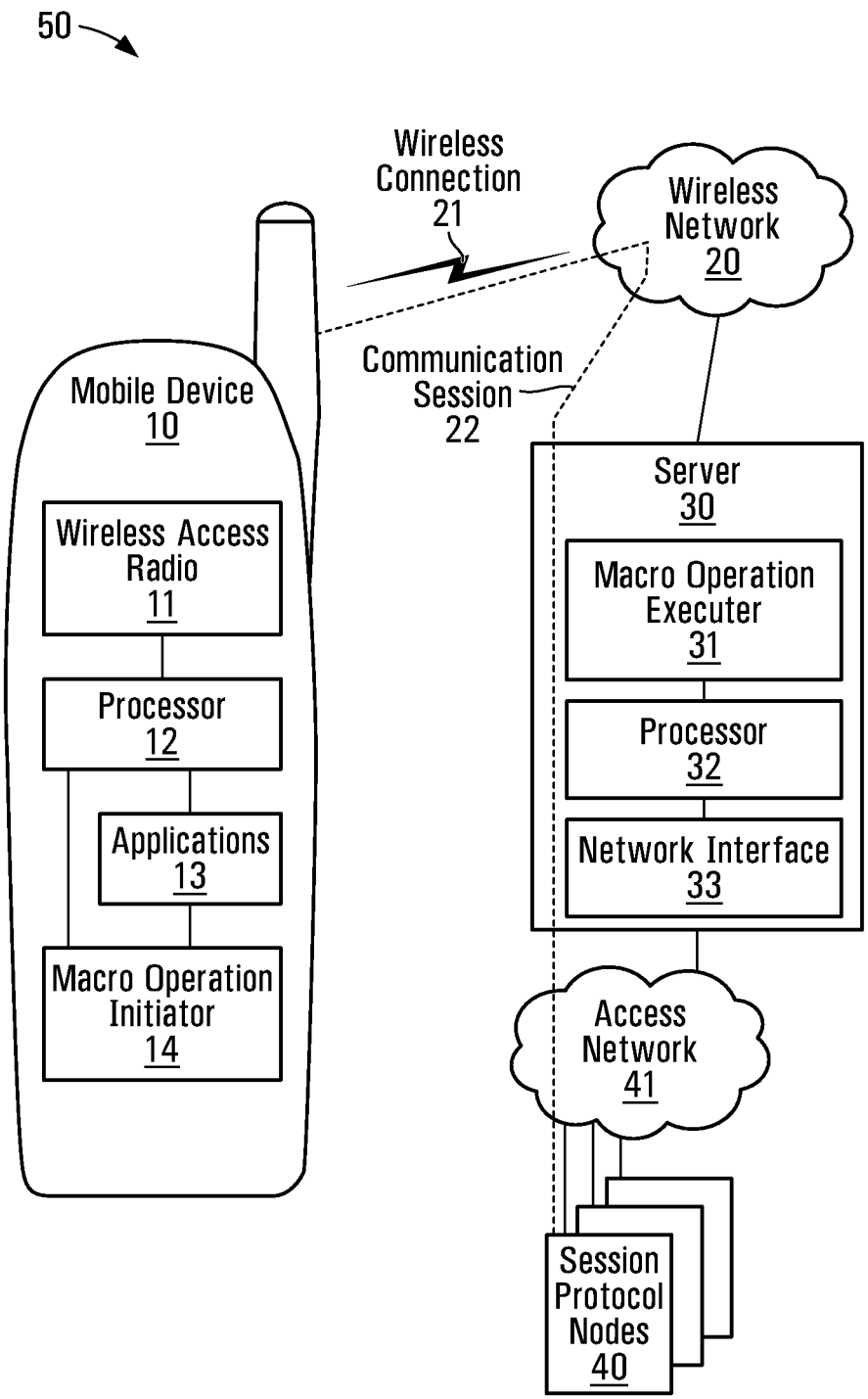
FIG. 1 is a block diagram of an example communication system.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Session protocols such as SIP implement generality over other considerations. Unfortunately, this means that for even simple operations there may be a lot of SIP messages involved. For example, a simple session/call set up may involve four or more SIP messages while a transfer may involve nineteen SIP messages. Furthermore, each SIP message can be fairly verbose. For instance, SIP messages are sometimes hundreds of bytes long and can contain a lot of headers for routing purposes. Exchanging several large SIP messages can be undesirable because communication resources are consumed. The problem can be worse if a mobile device is involved, as battery life and communication resources might be especially limited. Although compressing SIP strings using SIP SigComp can help to reduce message size, SIP SigComp can increase processing and memory requirements for the device because the de-compression of the SIP strings is performed. Furthermore, SIP SigComp does nothing to reduce the number of SIP messages involved for any particular operation. Thus, there is a need for another solution that mitigates some or all of the foregoing disadvantages with session protocols such as SIP.

According to a broad aspect of the disclosure, there is provided a method for execution by a communications device for initiating a macro operation, the method comprising: sending a binary encoded message comprising an indication from which a network node can determine a plurality of session protocol transactions to be performed.

According to another broad aspect of the disclosure, there is provided a computer readable medium having computer executable instructions stored thereon for execution on a processor of a communications device so as to implement the method summarised above.

According to another broad aspect of the disclosure, there is provided a mobile device comprising: a processor; and a macro operation initiator configured for sending a binary encoded message comprising an indication from which a network node can determine a plurality of session protocol transactions to be performed.

According to another broad aspect of the disclosure, there is provided a method for execution by a network node for executing a macro operation, the method comprising: receiving a binary encoded message from a communications device; determining a plurality of session protocol transactions to be performed based on an indication in the binary encoded message; and attempting the plurality of session protocol transactions.

According to another broad aspect of the disclosure, there is provided a computer readable medium having computer executable instructions stored thereon for execution on a processor of a network node so as to implement the method summarised above.

According to another broad aspect of the disclosure, there is provided a network node comprising: a processor; and a macro operation executer configured for: receiving a binary encoded message from a communications device; determining a plurality of session protocol transactions to be performed based on an indication in the binary encoded message; and attempting the plurality of session protocol transactions.

Other aspects and features of the present disclosure will become apparent, to those ordinarily skilled in the art, upon review of the following description of the specific embodiments of the disclosure.

Communication System

Referring now to FIG. 1, shown is a block diagram of an example communication system 50. The communication system 50 has a mobile device 10, a wireless network 20, a server 30, an access network 41, session protocol nodes 40, and may have other components that are not shown for sake of simplicity. The mobile device 10 has a wireless access radio 11, a processor 12, one or more applications 13, a macro operation initiator 14, and may have other components that are not shown for sake of simplicity. The server 30 has at least one network interface 33, a macro operation executer 31, a processor 32, and may have other components that are not shown for sake of simplicity. Note that the server 30 is shown separate from the wireless network 20 and the access network 41, but could alternatively be part of the wireless network 20 and/or access network 41. The session protocol nodes 40 are nodes that use a session protocol such as SIP and might for example include any one or appropriate combination of wired session protocol devices, wireless session protocol devices, and session protocol servers.

In operation, the mobile device 10 communicates with the wireless network 21 using its wireless access radio 11. The wireless communication is over a wireless connection 21 between the mobile device 10 and the wireless network 20. In the illustrated example, it is assumed that the communication includes a communication session 22 between the mobile device 10 and one of the session protocol nodes 40. The communication session 22 might for example be a voice and/or video call involving at least one of the applications 13 of the mobile device 10. At least one of the applications 13 involved in the communication session 22 might initiate operations such as but not limited to hold, swap, transfer, etc. The particular set of operations available is implementation and application specific. The application 13 requests application-specific operations from the macro operation initiator 14. The macro operation initiator 14 is responsible for initiating operations on behalf of the application 13.

Some of the operations are macro in nature, which means that a plurality of session protocol transactions between the server 30 and at least one of the session protocol nodes 40 is involved. A "session protocol transaction" includes a session protocol request and all session protocol responses that specifically relate to the session protocol request. A session protocol transaction is defined in RFC 3261 for the case of SIP. A session protocol transaction can either originate at the server 30 or terminate at the server 30. A session protocol transaction that originates at the server 30 includes a session protocol request sent by the server 30 along with all session protocol responses received that specifically relate to the session protocol request. A session protocol transaction that terminates at the server 30 includes a session protocol request received by the server 30 along with all session protocol responses sent that specifically relate to the session protocol request.

Once the application 13 has requested a macro operation, in accordance with an embodiment of the disclosure, the macro operation initiator 14 generates a binary encoded message having an indication from which the server 30 can determine a plurality of session protocol transactions to be performed. The binary encoded message is sent by the mobile device 10 and received by the server 30. The server 30 communicates with the wireless network 20 and the access network 41 using its at least one network interface 33; however, this does not preclude the mobile device 10A from using two or more network interfaces. To execute the macro operation, in accordance with an embodiment of the disclosure, the server 30 determines the plurality of session protocol transactions to be performed based on the indication in the binary encoded message and attempts the plurality of session protocol transactions. In some implementations, the server 30 first determines the application being used, as the session protocol transactions might be application-specific.

Note that the plurality of session protocol transactions between the server 30 and at least one of the session protocol nodes 40 can be executed without the mobile device 10 exchanging several session protocol messages with the server 30. Rather, the server 30 executes the plurality of session protocol transactions based on the binary encoded message sent from the mobile device 10. Thus, there is no reliance on standard session protocol call flows between the mobile device 10 and the server 30. Consequently, the number of messages exchanged between the mobile device 10 and the server 30 can in some cases be reduced by about 75% compared to the number of messages involved in the traditional session protocol call flows. For example, a call transfer that would normally involve nineteen session protocol messages between a device and server in the case of SIP can be completed with only four messages between the device and server.

Also note that the binary encoded message is relatively compact in size compared to session protocol messages. This is because binary encoding results in smaller messages than other encoding schemes such as ASCII. Note that the binary encoded message might not be wholly binary encoded, but includes at least a substantial portion that is binary encoded. Furthermore, in some implementations, the transport layer between the mobile device 10 and the server 30 follow a point to point protocol and so no routing requirements are needed in the application layer protocol. In these specific implementations, routing and data reliability features of a point-to-point transport layer protocol that provides a client/server type architecture in which the path between the server and client is known and non-variable are used for this purpose. This point to point protocol allows for a simpler transaction model and stricter sequencing scheme as it provides all the routing mechanisms, which means that the binary encoded message carries just the headers related to the application operation. Examples of such protocols include but not limited to SMS, USSD, etc. By contrast, session protocol messages such as SIP messages include substantial routing information because they are designed to run over a standard internet transport protocol such as UDP (User Datagram Protocol), TCP (Transmission Control Protocol) or TLS (Transport Layer Security) and so the SIP message tracks its progress between different nodes on the internet. For these reasons, the binary encoded message can in some cases be fewer than 100 octets, which is less than the average session protocol message size of about 300-500 octets in the case of SIP.

Therefore, in addition to the number of messages exchanged between the mobile device 10 and the server 30 being reduced, the size of each message can also reduced. By reducing the number of messages involved and by reducing the message size, communication resources for the mobile device 10 can be conserved. For instance, the processor and memory budget on the mobile device is significantly reduced thus conserving battery power and by reducing the bandwidth used by each message further savings in battery power and radio resource utilisation can be made.

In the illustrated example, reference is made to a "session protocol". In some implementations, the session protocol is SIP. However, it is to be understood that other session protocols are possible and are within the cope of this disclosure. In other implementations, the session protocol is H323. In other implementations, the session protocol is MGCP. Other session protocols may be possible.

There are many possibilities for the indication from which the server can determine a plurality of session protocol transactions to be performed. In some implementations, the indication is a macro verb and is different for each macro operation. Example macro operations include call swap, unattended call transfer, start of attended call transfer, finish of attended call transfer, and call transfer revert. Example use cases demonstrating these macro operations are provided below under the section entitled "BEV Use Cases". Although these verbs are all call related, the use of the verb is application specific, so, for example, if the application was a conference application, a specialise verb may allow the mobile device to mute all conference participants with a single request. As a further example, for an interactive gaming application, specialised verbs may allow the complex mixing of gaming information at the server and the sharing of the information in real-time with all participants. Note that other implementations are possible in which the indication is not a macro verb. For example, in other implementations the indication is a header/parameter. In some implementations, the indication is a combination of verb, header, and/or other message parameters. More generally, the indication can be any suitable indication from which the server can determine a plurality of session protocol transactions to be performed.

In the illustrated example, the macro operation initiator 14 and the macro operation executer 31 are both implemented as software and are each executed on their respective processors 12, 32. However, more generally, the macro operation initiator 14 and the macro operation executer 31 may each be implemented as software, hardware, firmware, or any appropriate combination thereof.

Although embodiments have been described with reference to the mobile device 10 shown in FIG. 1, it is to be understood that such embodiments may be practiced more generally with a communications device. The communications device may be any tethered communications device (i.e. wired) or untethered communications device (i.e. wireless). Note that for a tethered communications device there is no need for a wireless access radio for wireless communication. In some implementations, the communications device is a UE (user element that is directly used by a user. In alternative implementations, the communications device acts on behalf of a UE as a proxy for initiating and/or terminating macro operations. Further example details of communication devices are provided later under the section "Communications Device".

It is noted that the server 30 shown in FIG. 1 can be any network node involved in session management. The server 30 might have other functions as well. Although embodiments have been described with reference to the server 30, it is to be understood that such embodiments may be practiced more generally with a network node. The network node might be a single network node or a combination of separate network nodes that may or may not be distributed in a network. In specific implementations, the network node is an IMS server. Other implementations are possible.

It is to be understood that the wireless network 20 would have any appropriate combination of components suitable for a wireless network and that the access network 41 would have any appropriate combination of components suitable for an access network. Note that the wireless network 20 may include wired components in addition to wireless components. The components of the wireless network 20 are implementation specific and may depend on the type of wireless network. There are many possibilities for the wireless network. The wireless network might for example be but not limited to any of GSM, LTE, UTRAN, CDMA, iDEN, 802.11a, 802.11b, 802.11g, 802.11n, 802.16 WiMAX, etc. Although the example presented above focuses on wireless communication, it is to be understood that embodiments of the disclosure are similarly applicable to non-wireless communication systems. In such embodiments, a wired network may be provided in place of the wireless network 20.

Further details of macro operation initiation and macro operation execution are provided below with reference to FIGS. 2 through 23.

Method in a Communications Device

Figure 2:
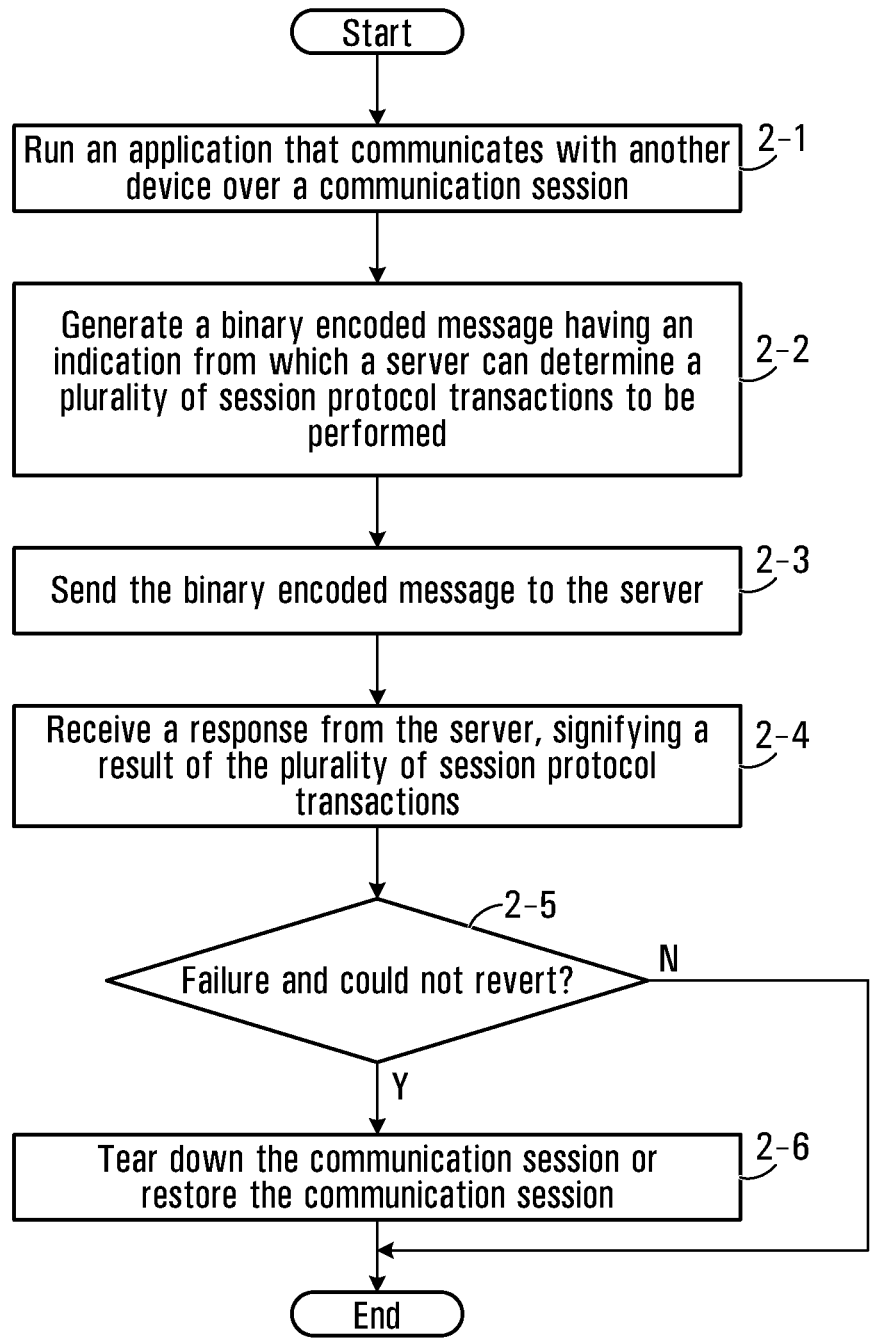
FIG. 2 is a flowchart of a method for initiating a macro operation.

Referring now to FIG. 2, shown is a flowchart of a method for initiating a macro operation. This method may be implemented in a communications device, for example by the macro operation initiator 14 of the mobile device 10 shown in FIG. 1. More generally, this method may be implemented in any appropriately configured communications device.

In some implementations, as shown at step 2-1, the communications device runs an application that communicates with another device via one or more dialogs over a communication session. For this example, it is assumed that the application prompts a macro operation involving the communication session. Alternatively, a macro operation might be initiated by the communications device for other purposes, for example for establishing a communication session or for registering/subscribing purposes. In any case, the operation is "macro" in nature because it involves a plurality of session protocol transactions between a server and at least one session protocol node. The session protocol might for example be SIP as discussed above for FIG. 1, or some other session protocol. At step 2-2, in accordance with an embodiment of the disclosure, the communications device generates a binary encoded message having an indication from which the server can determine a plurality of session protocol transactions to be performed. The indication might for example be a macro verb as discussed above for FIG. 1. At step 2-3 the communications device sends the binary encoded message to the server. In some implementations, the binary encoded message is sent free of routing information as similarly described with reference to FIG. 1.

If the binary encoded message is received by the server, then the server can subsequently execute the plurality of session protocol transactions between the server and the at least one session protocol node. Note that the plurality of session protocol transactions can be executed without the communications device exchanging several messages with the server. As similarly described with reference to FIG. 1, this can result in conserving communication resources and/or battery power for the communications device.

In some implementations, as shown at step 2-4, the communications device receives a response from the server signifying a result of the plurality of session protocol transactions. If at step 2-5 the response signifies that the plurality of session protocol transactions were not successful and the server could not revert to a state prior to attempting the plurality of session protocol transactions, then at step 2-6 the communications device has the option to either tear down the communication session if the resultant state is unrecoverable, or take further steps that will result in the restoring a safe known state for at least one of the dialogs over the communication session.

Method in a Network Node

Figure 3:
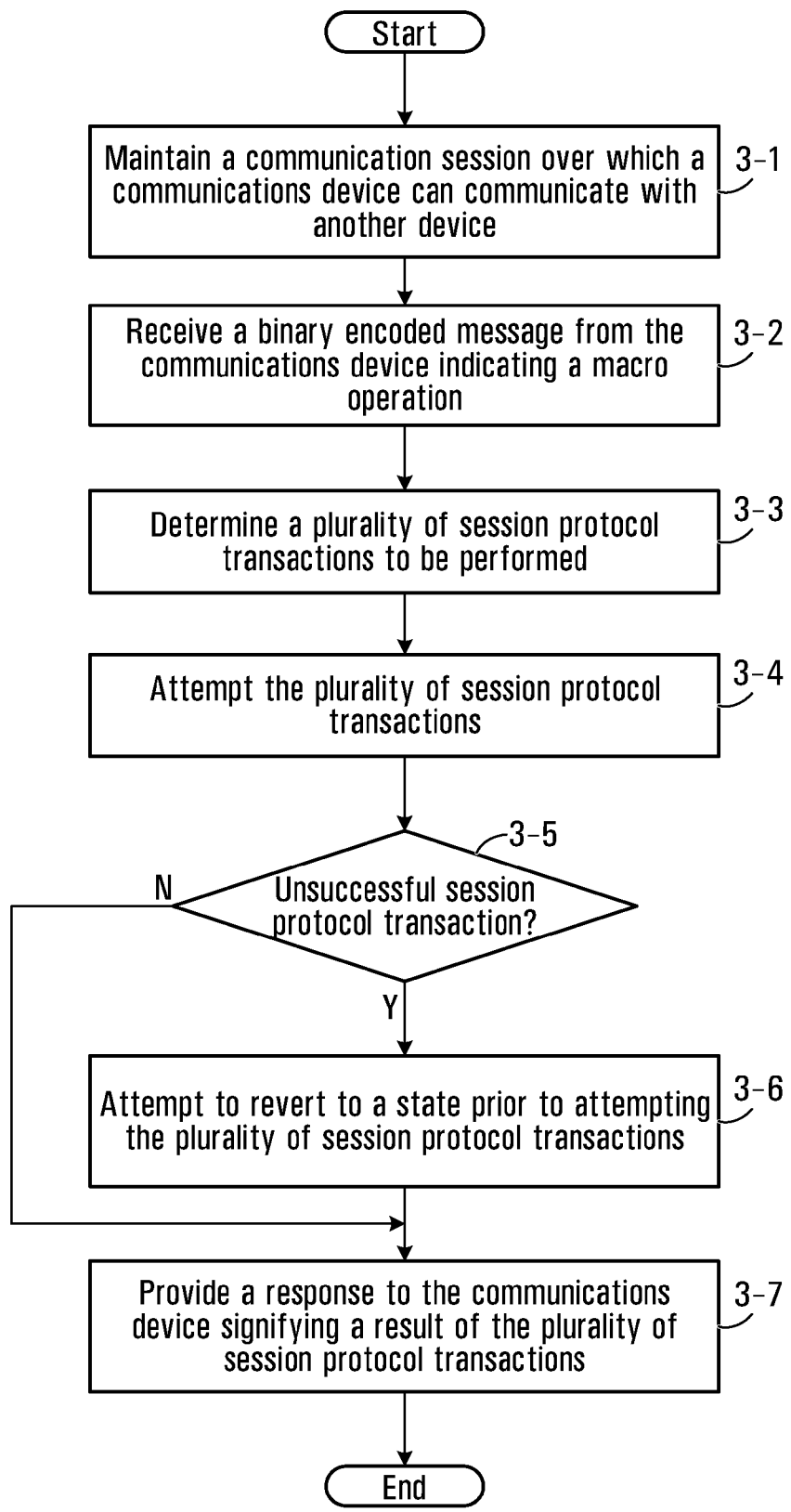
FIG. 3 is a flowchart of a method for executing a macro operation.

Referring now to FIG. 3, shown is a flowchart of a method for executing a macro operation. This method may be implemented in network node, for example by the macro operation executer 31 of the server 30 shown in FIG. 1. More generally, this method may be implemented in any appropriately configured network node of a communications system.

In some implementations, as shown at step 3-1, the network node maintains one or more communication sessions between itself as the proxy for the communications device and one or more session protocol nodes. For this example, it is assumed that the communications device prompts a macro operation involving the communication session. Alternatively, a macro operation might be initiated by the communications device for other purposes, for example for establishing a communication session or for registering/subscribing purposes. In any case, the operation is "macro" in nature because it involves a plurality of session protocol transactions by the network node. The session protocol might for example be SIP as discussed above for FIG. 1, or some other session protocol.

At step 3-2, the network node receives a binary encoded message from the communications device indicating the macro operation to be performed. The indication might for example be a macro verb as discussed above for FIG. 1. In some implementations, the binary encoded message is received free of routing information as similarly described with reference to FIG. 1. At step 3-3, the network node determines a plurality of session protocol transactions to be performed. At step 3-4, the network node attempts the plurality of session protocol transactions. Note that the plurality of session protocol transactions can be executed without exchanging several session protocol messages with the communications device. In some implementations, the plurality of session protocol transactions is executed without communicating all session protocol responses relating to the session protocol transactions. As similarly described with reference to FIG. 1, this can result in conserving communication resources and/or battery power for the communications device.

In some implementations, as shown at step 3-5, the network node determines whether the plurality of session protocol transactions was successful. If at step 3-5 any of the plurality of session protocol transactions were unsuccessful, then at step 3-6 the network node attempts to revert to a state prior to attempting the plurality of session protocol transactions. At step 3-7, the network node provides a response to the communications device signifying a result of the plurality of session protocol transactions. If the network node has attempted to revert to a state prior to attempting the plurality of session protocol transactions, then the response indicates whether the revert was successful. This allows the communications device to take appropriate actions in the event that the revert was unsuccessful.

BEV Details

In the examples presented above, messaging between a mobile device and a server has been described for macro operations. In the following sections, specific details of a BEV (Binary Encoded Verb Protocol) and I1 protocol used for the messaging are provided. It is to be understood that these details are very specific for exemplary purposes.

The table provided below contains definitions of acronyms and abbreviations, some of which are used to describe BEV.

| Abbreviation | Expansion | Description |
| --- | --- | --- |
| PBX | Private Branch Exchange | An enterprise based switch that allows multiple telephony lines within a company to connect to the external PSTN. |
| PSTN | Public Switched Telephone Network | A domestic telecommunications network usually accessed by telephones, key telephone systems, private branch exchange trunks, and data arrangements. |
| RTP | Real Time Protocol | See RFC3550 |
| SDP | Session Description Protocol | See RFC4566 |
| SIP | Session Initiation Protocol | See RFC3261 |

BEV Overview

BEV is functionally a client-server protocol where the client is the BEV end point. The BEV end point communicates with the BEV server using BEV. This communication leg between the BEV end point and BEV server forms a BEV session with multiple BEV dialogs. On the other side of the BEV Server, the BEV Server acts as a proxy to the BEV end point to one or more session-based application servers such as PBXs, IMS Servers, Voicemail Servers, Instant Messenger Servers, etc. In most cases the protocol used between the BEV Server and the session-based application server shall be SIP, but other protocols such as H.323, web services, CTI, ECMA CTI, etc. may be used.

There are many possibilities for the "BEV end point". In some implementations, the BEV end point is loosely similar to a SIP User Agent Client with some constraints as defined in this disclosure. Those skilled in the art will realize that a BEV end point can be but not limited to a wireless device or a communications device, or a network node, etc. In some implementations, a BEV end point is uniquely identified by an ID called the BEV Unique ID, PIN etc, which provides all the information for routing the message at the transport layer. A physical device may have more that one SIP URI (Uniform Resource Identifier) or other external identifier associated with it, but it can only have one BEV UID (User Identifier) associated with it.

Each BEV End point has one BEV server to which it is associated. There are many possibilities for the "BEV server". Those skilled in the art will realize that a BEV server is a network node and could be an IMS Application Server examples being but not limited to 3GPP Voice Call Continuity Sever, 3GPP Service Centralization and Continuity Application Server, 3GPP IMS Centralized Services server etc. Whenever a BEV end point sends a BEV request or response, regardless of the BEV UID, the message lands on the same BEV Server. Note that this does not exclude the use of multiple BEV Servers in a High Availability and/or load sharing model, just that however the BEV Servers are organized; they represent a single logical server from the point of view of the BEV end point. Thus in case of a failure of the BEV Server the network infrastructure shall failover the BEV Server functionality to a hot standby server. This failover shall be transparent to the BEV End Points.

Furthermore, a BEV Server could be assigned dynamically by the network, where by the BEV End Point is either aware or not aware of this mapping. When the BEV End Point is not aware, the network assigns the BEV Sever and routes the messages accordingly. This could be achieved by analyzing a subscriber or equipment identifier in the protocol message and routing the message based on this subscriber identity. The subscriber identity could be private identity such as but not limited to a MIN, IMSI (see 3GPP TS23.003), IMS Private Identity (see 3GPP TS23.003 for an example) or a Public User Identity such as but not limited to MSISDN (see 3GPP TS23.003), PIN, MSN etc or some other unique alphanumeric string. The equipment identifier could be an Instance ID such as but not limited to PIN, MAC address, IMEI or an encoded/scrambled, hashed InstanceID etc. Or a combination of Public and or Private and or equipment identifier could be used. A static assign of BEV Servers is also possible.

Whilst the examples presented herein focus on implementations with a "BEV server", it is to be understood that embodiments are more generally applicable to a network node. The network node might be a single network node or a combination of separate network nodes that may or may not be distributed in a network.

BEV is a layered protocol with several distinct layers: transport layer, parser layer, sessions layer, transaction layer, and transaction user/application layer. Example details of these layers are provided below. Note that various implementations may choose to model these layers in different form, perhaps merging some layers into one. This is a non-normative section for exemplary purposes.

The transport layer is the lowermost layer in BEV stack and sits over the point-to-point transport protocol as discussed previously. The primary purpose of this layer is to interface with the transport protocol to send and receives BEV packets. This layer is registers with the transport protocol and relays any transport level acknowledgements to the session layer. Any transport error as reported by the transport protocol is handled by the BEV client. Since BEV relies on the transport protocol's reliability, connection failures are left outside scope of this example, but in the case that the transport protocol does not provide an assured delivery function, this function would be implemented in the transport layer. The client may re-try the message (in an HA capable environment) or may simply abandon the state after cleanup.

The Parser layer is responsible for parsing of BEV messages from the binary encoding to its implementation specific object notation.

The sessions layer registers with the transport layer to receive a transport level acknowledgement and keep a packet until it has received a positive acknowledgement that the packet has been received by the target. This layer also maintains a buffer to correctly order the BEV packets in cases when they get out of order as specified later in this disclosure. A notable function of this layer is how it manages ordering as will be described later.

The transaction layer maintains the transactions as described in this disclosure and rolls forward or rolls back the state based on the transaction progression. The transaction user layer uses the transactions to progress their states.

The transaction user/application layer is responsible to have an interface or an API to the users of BEV. It is through this layer that the BEV users would create or get hold of BEV Dialog object, or transaction object and the like. Rather than a real protocol layer this is more of an abstraction of the layers underneath. A BEV Dialog is a point to point signaling conversation between the BEV endpoint and the BEV server.

BEV Packet Structure

BEV is a binary protocol unlike SIP but maintains a similar format of verb and header. In addition to the binary nature, BEV has several other key differences from SIP. For example, BEV does not have a Request URI like SIP but does have the concept of headers. A BEV message generally has three components:

BEV Request Verb/BEV Response Code;
BEV Version Information; and
BEV Headers

The choice of a unique BEV verb has been made by the distinct action it performs. Problems in SIP where there is a very heavy semantic overloading is avoided. A BEV verb means only one thing to the BEV end point and the application running on the BEV server. However, one BEV Request Verb could result in different signaling between the BEV Servers and the different application servers. For example, the way attended transfer is implemented using different SIP call flows between the various commercial PBX implementations is known by the BEV server but not by the BEV end point. In addition, a BEV verb may be specific to an application, thus allowing application specific namespace of the verb value.

In order to provide details of how the components of a BEV message are binary encoded, the following notation is assumed:

[0x01] The notation [0x??] indicates a single octet holding the indicated hexadecimal value.

[[??]] This indicates a length structure. Double square brackets surrounding a decimal value represent the length of data that follows. For example, [[19]] indicates a data block that follows has 19 octets. When the length structure is shown explicitly, the series of octets actually in the structure are all contained within surrounding square brackets (e.g. [[0x84] [0x12]]).

Details of how the components a BEV message are binary encoded will now be provided.

The BEV Request verb and Response codes are encoded in 16 bits in the following structure.

| | Bit | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Value | d | t | X | | | | | | | | | | | | | x |

The MSB (Most Significant Bit) of the first octet (denoted as "d") indicates the direction of the message as follows:

| Reset (0): | Endpoint to server |
|---|---|
| Set (1): | Server to Endpoint |

The second MSB (denoted as "t") indicates request or response as follows:

| Reset (0): | Request |
| Set (1): | Response |

The third MSB and the fourth MSB (both denoted as "x") are both reserved bits. The remaining 12 bits indicate the request verb or response code of the messages.

Tables of request verbs and response codes defined for BEV are shown in FIGS. 4 and 5, respectively. It is to be understood that these request verbs and response codes are very specific for exemplary purposes. Note that the BEV response codes are similar to SIP response codes and also carry similar semantics. However, BEV also defines some new response codes in each of the categories that are proprietary extensions to the responses. For example, response code 0x49A indicates that the end point wants to ignore the call. Applications are not to arbitrarily add new request verbs. If a new verb is used then it is to be documented as a BEV extension. Further details of the BEV verbs are provided below under section entitled "BEV Verbs".

After the BEV request verb/response code, a BEV packet has an octet that carries the version information for BEV. The current version as of this disclosure is [0x01]. Any change to BEV results in the change of the version number. The version number is used to establish compatibility between the BEV end point and BEV server.

Headers in BEV are represented right after the first three octets containing the request/response and version information. Headers are name value pairs with the following format:

Header-Code Header-Value

More specifically, headers are represented in TLV (Type Length Value) form as follows:
[Type] [[Length]]<Data Payload/Content>,
except where specified otherwise in the table shown in FIG. 6. In the TLV form, the type is represented as an octet and is encoded using MIME (Multipurpose Internet Mail Extensions) or another suitable protocol. The Data Payload/Content is also encoded using MIME or another suitable protocol.

The content-type header is also encoded using the same protocol, e.g.
Content-type: TEXT/PLAIN; charset=US-ASCII; color=blue
[0x01][[29]][0x02][0x01] charset=US-ASCII; color=blue
Other headers can be seen in FIG. 6. In this table:
"Order" indicates the relative position in the headers,
'*' indicates that ordering is insignificant for that header. If the order is same for more than one headers then one and only one may be present in the message. The ordering number is purely relative. So 4* means that this is optional header but if present it is to be present after headers with order less that 4 and before header with order greater than 4.
"Presence" column can have values like "m" for mandatory, "o" for optional and "n" for not allowed. "m/rq" means mandatory in request, "o/rs" means optional in response etc.
String headers if multi-valued are separated by ",".
Both explicit formatting of payload data structures and implicit formatting of payload data structures are possible. In explicit formatting, a length structure encodes the size of the data to follow. Two types of length structures are possible: variable format length structures and fixed format length structures, details of which are provided below. In implicit formatting, established conventions dictate the length of fields within the data. For example, command identifiers are 1 octet in length, as are command-flag values. Thus, in a common protocol such as TLV, the length is often omitted if the variable associated with the type is of a fixed size. Depending on the particular protocol, data structures can either be formatted explicitly or implicitly. Packets can use a mixture of both types of formatting; in these cases, certain sequencing guidelines for the type octet codes are to be met.

A fixed format length structure contains a specified number of octets to encode the length of data that follows. For example, in a fixed 4-octet structure, 4 octets form a big-endian value indicating the data payload length.

Variable format length structures use 1 to 4 octets to encode a compressed integer that indicates the length of the data to follow. In each octet in the structure except the last, the MSB gets set to indicate that another length octet follows; the MSB of the last octet in the structure remains unset. To find the length encoded, the lower 7 bits in each octet in the structure are read, concatenated together, and the result is treated as a big-endian integer. For example, if data is 6,746 octets long, then the following procedure can be used to calculate the length structure octets:
Express the value in hex: 1A5A ([0x1A][0x5A])
Convert the hex value of [0x1A][0x5A] into binary and separate the binary string into 7—bit segments: 001 1010 101 1010
Write each 7-bit segment in the length structure with the most significant (now unused) bit to the value of 1 for all but the last octet: 1011 0100 0101 1010 0xB40x5A [0xB4][0x5A]

An example algorithm for reading a variable format length structure is provided below:

```
private byte readVariableLengthStructure( ) {
    byte returnValue = 0;
    for (byte b = readByte( ); b & 0x80 != 0; b = readByte( )) {
        returnValue |= b & 0x7F;
        ++used;
        if (used > 4 || (used == 4 && (i & 0x0E000000) != 0)) {
            throw new NumberFormatException( );
        }
        returnValue <<= 7;
    }
}
```

BEV messages in some cases may carry more than one payload body, for example SDP description for a media flow, in such cases the payload bodies are carried as Multipart messages. The order of such Multipart bodies shall be defined by this disclosure wherever this mechanism is used.
BEV Request Verbs Specific example details will now be provided for the BEV verbs shown in FIG. 4. It is to be understood that these details are very specific for exemplary purposes.

INVITE—BEV End Point Initiated

| Message type: | I1 INVITE |
| Direction: | BEV End point to BEV server |

Description: This message is sent by the ICE UE to the network to establishment of a session. Note that this message can alternatively be sent by a wireless device, a BEV End point or something else. This message includes the information elements listed below.
Information Element
Message Type
Version Octet
CallID
SequenceID
R-URI
P-Preferred-Identity
Accept-Contact
From
To
Other elements The Information Elements will now be described:
Message Type—Identifies the following:
i) Direction is ICS UE to SCC AS
ii) Request Verb
iii) An I1 INVITE
Version Octet—Carries the version information for I1 protocol. The current version is [0x01].
CallID—This information element identifies the dialogue and will be described in more detail in BEV Transactions.
SequenceID—This information element identifies the message within the dialogue and is incremented each time a new message is sent within the dialogue and will be described in more detail in BEV Transactions.
R-URI—This is the same as per RFC 3261.
P-Preferred Identity —
Accept-Contact—per RFC 3841
From—This is the same as per RFC 3261.
To—This is the same as per RFC 3261.

INVITE—SCC AS Initiated

| Message type: | I1 INVITE |
| --- | --- |
| Direction: | IBEV Server to BEV End point |

Description: This message is sent by the BEV Server to the BEV End point to establishment of a session. This message includes the information elements listed below.
Information Element
Message Type
Version Octet
CallID
Sequence ID
R-URI
P-Called-ID
Accept-Contact
From
To
Other I1 elements

Bye

| Message type: | I1 BYE |
| --- | --- |
| Direction: | BEV Server to BEV End point and vice versa |

Description: This message is sent by the BEV Server or Bev End point to the BEV End point/Bev Server to terminate the session for the Call-ID identified.

This message includes the information elements listed below.
Information Element
Message Type
Version Octet
SequenceID

Update

This message includes the information elements listed below.
Information Element
Message Type
Version Octet
CallID
SequenceID

Subscribe

| Message type: | I1 SUBSCRIBE |
| --- | --- |
| Direction: | BEV End point to BEV Server or vice versa |

Description: This message is sent by the BEV End Point to the BEV Server or vice versa to indicate that the function originating the message needs to be notified about certain events. These events are identified within the body of the message.
This message includes the information elements listed below.
Information Element
Message Type
Version Octet
CallID
Sequence ID
R-URI
App-ID
Subscription—
Expires
From
To
Event

Notify

This message includes the information elements listed below.
Information Element
Message Type
Version Octet
CallID
Sequence ID
R-URI
App-ID
Event

Cancel

This message includes the information elements listed below.
Information Element
Message Type
Version Octet
CallID
SequenceID Options This message includes the information elements listed
Information Element
Message Type
Version Octet
CallID
Sequence ID BEV Transactions A BEV transaction typically includes a request and a response. A transaction is active as long as a request is issued and a response is not received for it. A Sequence-Id header is used to order the transactions in BEV which is a monotonously increasing sequence number for requests in one direction and for a certain dialog. In other words the two BEV entities maintain separate Sequence-Id headers of their own. The direction indicator in the message is used to disambiguate the sequence. A Sequence-Id is associated with a Request, the Response always has the same sequence number as that of the corresponding Request.

The consequence of monotonically sequence is that the BEV end points and servers can enforce a single active transaction constraint and reject an out of sequence message. At any given time there can be at most one transaction active in either direction from any BEV end point to the server for a certain dialog. It is possible to get a new dialog request while an existing call signaling is happening, but for a given dialog there is no more than one transaction active at the same time. As an example, if an end point issues a BEV INVITE request to call out, then before this INVITE request is responded to with a final response a new BEV request cannot be initiated by the end point nor can the server send a new request to the end point. In general, if a BEV entity has received a request with a Sequence-Id as "N" where N is an integer and has still not sent the final response and it receives a request with a Sequence-Id "N+1" then it rejects the request with "Server Transaction In Progress" response.

There are exceptions where a BEV transaction does not include a request and a response. Exceptions include CANCEL, BYE and UPDATE requests. CANCEL as well as BYE requests form their own transaction. CANCEL request can be sent only after the dialog is established. There can be only one CANCEL request sent and it will have Sequence-Id as "N+1" where "N" was Sequence-Id of a request it is canceling. BYE request can be sent to disconnect established and early dialogs. There can be only one BYE request with Sequence-Id "N+1" from a previous request. UPDATE requests form their own transactions but are related to the INVITE transaction in context of which they are sent. There can be more than one UPDATE with monotonically increasing sequence numbers, starting at N+1. UPDATE requests can be responded to before the overall INVITE transaction.

A BEV transaction has an overall transaction timeout, which is set to 64*T1 where T1 is as defined by RFC 3261 and configured for a particular deployment. A BEV transaction may have any number of provisional responses but has only one final response. Retransmissions are not used in BEV, as the transport protocol is assumed to be a reliable protocol.

Since transport protocols such as UDP do not guarantee ordering of messages, it is possible for requests to become out of order. For instance, a BYE request could be received before the INVITE, or an UPDATE request could arrive before INVITE, or a subsequent UPDATE request could arrive before a previously sent UPDATE request. The BEV Sessions layer that receives requests from transport layer should in this case buffer BYE, CANCEL and UPDATE messages out of the order received and present the messages to the layers above it only in the proper order.

BEV retransmission should ensure that a message is eventually delivered. However, a message should not be buffered for more than the overall transaction timeout and should instead be dropped. Further, any other Request in process or new for this Dialog should now be responded with a 504 (Server Timed Out) response. There are no requirements on ordering of responses and they should be presented as they arrive.

BEV adds many operations/commands that are macro in nature meaning that one BEV operation results in several SIP transactions by the server. Note that the several SIP transactions can be executed without the BEV end point exchanging several messages with the server. As similarly described with reference to FIG. 1, this can result in conserving communication resources and/or battery power for the BEV end point.

If any of the SIP transactions on the server side fail, then the state on the BEV end point attempts to revert back to what it was before the BEV operation started. As an example, if SWAP request was sent out by BEV end point and the server started the process by putting one call on HOLD and INVITING the second UA and if the second UA rejected the INVITE then the server reverts the state back by Re-INVITING the participant on hold and sending an error response back to end point. The error response in this case would contain an SDP. However in event that the server fails to restore to the state back (e.g. rejection of re-INVITE to participant just put on hold) then server sends a response COULD NOT REVERT TXN, which means that the call is now dropped and end point is to close all connections and cleanup state with respect to this call.

BEV Dialog

A BEV Dialog is a mechanism to combine related messages under a single conversation and is identified by a Call-Id in the message. The implication of BEV dialog is persistence of state on the BEV Server and end points. The state is expected to live in the network until the dialog expires. This state includes the protocol state and any application specific state.

A Call-Id identifies a dialog with a BEV UID, which identifies a user and is unique in space and time. The Call-Id is to be encoded into 8 octets of which the first 4 octets has the BEV UID uniquely identifying a user involved in the call and last 4 octets includes a combination of time and some running sequence to lend uniqueness in time.

Note that while the notion of dialogs is understood in SIP parlance in regards to dialog creating methods, BEV Dialog is a concept that extends that definition to all BEV requests. BEV expects the request specific semantic state to be present thereby lending a meaning of a conversation beyond INVITE and SUBSCRIBE. There are two distinct types of dialogs: INVITE Dialogs and Non INVITE Dialogs. Details of the INVITE Dialogs and Non INVITE Dialogs are provided below.

INVITE Dialogs are created by INVITE and SUPPLANT requests and torn down by BYE/SUPPLANT. INVITE Dialogs do not have limited expiry time. Expires header, even if present on the INVITE request, has no impact on this dialog. Dialog is created when a SUCCESS response to INVITE is returned. Any subsequent request with the same call-id in either direction is considered part of the same dialog. If any subsequent request contains an Expires header then it does not effect the overall dialog lifetime as this is an INVITE dialog. An INVITE dialog can only be torn down by an explicit BYE request or an implicit message involving RCall-Id header, like SUPPLANT. If a subsequent request is not responded to within a session or the request is rejected with an error response, the original dialog is not affected. However, if there is a loss of transport connection the INVITE dialog is to be torn down gracefully with appropriate SIP signaling on the server side.

Non INVITE Dialogs are created by all requests except INVITE, SUPPLANT, BYE and CANCEL. Every Non INVITE dialog creation request (initial request) should have an Expires header. If the Expires header is not present then it semantically means that the dialog is not going to be expected beyond this single message. If the Expires header is present in the initial request then that becomes the upper bound on the dialog lifetime on both BEV endpoint and Server. Both server and endpoint are expected to maintain any state that is created as a result of any exchange for at least the dialog expiration time. The server in response to a Non INVITE dialog request with Expires should add the Expires header in all messages indicating the time left for the dialog expiry. This is true for the response sent by both BEV Server and BEV end point in this dialog. A subsequent request should not carry the Expires header as it is to be ignored, unless it is sent with Expires=0. This special value of Expires has an effect of immediately expiring the dialog on both ends. A loss of transport also results in immediate termination of dialog, like INVITE dialogs.

No special messaging is required on the expiration of a dialog. If a message is sent with the same call-id "after" the dialogs have expired then it may result in creation of a new dialog but may not be able to use the state created as a result of previous interaction. For example, a BEV end point may send a BEV INFO request with Expires header with a 180 seconds value to the BEV Server. Assuming the Call-Id was a new Call-Id from that end point the server creates a new dialog and processes the message in the context of that new dialog. The BEV Server sends a response that should include the expiry time of 180 (if header is present). Note that if the dialog time request is very high and the server cannot have a dialog for that long then it sends a response SESSION EXPIRATION TOO HIGH with a suggested alternative in Expires header. Thereafter, any request sent with the same call-id "within 180 seconds" of the initial request belong to the same dialog. Both endpoint and server associates the messaging with the state they may have created during initial processing. Responses to all requests should have an Expires header indicating time remaining at each end.

In some implementations, it is possible to upgrade from a Non INVITE dialog to an INVITE dialog. Usually both these types of dialogs are distinct, but in some cases, while a Non INVITE dialog is in progress, an INVITE may be sent within the same dialog. This results in dialog converting to INVITE dialog which basically means that it shall not expire on time, but only when a BYE request terminates the INVITE dialog.

Health Check

BEV Health Check feature adds the capability to periodically check the availability of a mobile device. Normally, the SIP Session Timer to periodically refresh SIP sessions by sending repeated INVITE/UPDATE requests, where the repeated INVITE/UPDATE requests are sent as in-dialog requests, the BEV Health Check requests are sent as out-of-dialog requests. In contrast, the session BEV server can use only one dialog to send BEV health check requests to BEV end point, regardless of how many active BEV invite Dialogs. Compared to SIP mechanism, this approach could reduce the number of messages exchanged between the BEV server and end point.

BEV Use Cases

Referring now to FIGS. 6 through 22, shown are signalling diagrams depicting use cases for BEV. It is to be understood that these use cases are very specific for exemplary purposes only. Note that the signalling diagrams include various request verbs and response codes, details of which can be found in the tables of FIG. 4 and FIG. 5. Also, many of the signals are shown with various string headers, details of which are shown in the table of FIG. 6. Whilst many of these examples are specific to SIP, it is to be understood that embodiments are applicable to other session protocols.

Note that in some cases one BEV call flow may map to many different SIP call flows achieving the same result. This would particularly be the case when one PBX/Server handles a feature differently than other. The signaling diagrams described in this section deal with the most general cases on the SIP side and they in no way constrain the SIP signaling to be exactly as specified. This disclosure is only specifying BEV.

Also note that if an action is achieved differently in different scenarios then that distinction should be made evident by different header values in the request, including but not limited to the App-Id header. This request would then be routed by the BEV Server to the appropriate application on the BEV Server; this application on the server then would be responsible to map the BEV call flow to the appropriate SIP call flow on the other end.

BEV Registration/Subscription

Figure 7:
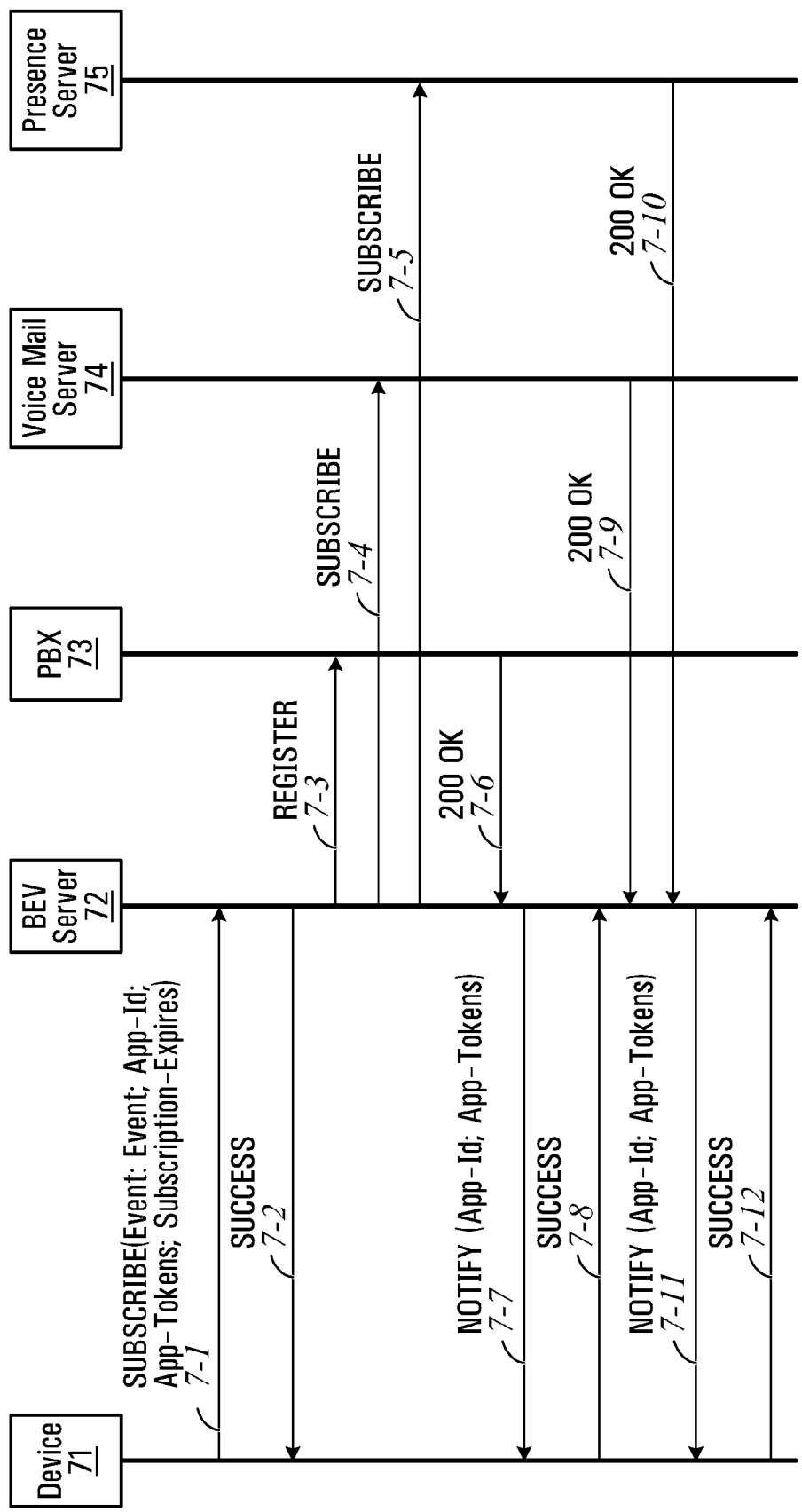
FIGS. 7 through 22 are signalling diagrams depicting use cases for BEV.

Referring now to FIG. 7, shown is a signalling diagram showing registration/subscription. In this example, there is a device 71, a BEV server 72, a PBX (Private Branch Exchange) 73, a voicemail server 74, and a presence server 75. The subscription to the BEV server 72 will be described below. Those skilled in the art will appreciate that the elements 71,72,73,74,75 shown in the signalling diagram are for exemplary purposes only, and that other elements are possible for performing the same or similar functionality. For example, the BEV server 72 could be replaced by an SCC AS, and the PBX 73 could be replaced by an IMS S-CSCF and/or Telephony Application Server (TAS), etc.

At step 7-1, the device 71 sends to the BEV server 72 a request to subscribe. The request to subscribe might be sent only when a change of circumstances on the device results in one or more applications changing their availability. For example, moving out of Wi-Fi coverage would de-activate the VoIP application. At step 7-2, the BEV server 72 sends to the device 71 a confirmation that the request to subscribe was received. The request to subscribe involves a macro operation meaning that the BEV server 72 goes on to perform multiple SIP transactions (i.e. 7-3 through 7-6, 7-9, 7-10) to complete the macro operation.

Note that in a traditional SIP system the endpoint would separately register and/or subscribe to each application server, and then maintain that registrations and/or subscriptions through a timeout mechanism. In comparison, the BEV endpoint 71 uses a single SUBSCRIBE verb to register all of the applications that are on the device as well as the status of the device with the BEV server 72. This status contains information that controls which applications are actually active at that particular moment, for example, whether the device 71 is associated to a Wi-Fi wireless network and thus the VoIP application is active.

At steps 7-3 through 7-5, the BEV server 72 sends to the PBX 73 a request to register, to the voicemail server 74 a request to subscribe, and to the presence server 75 a request to subscribe, respectively. At step 7-6, the PBX 73 sends to the BEV server 72 a confirmation that the registration was successful. Accordingly, at step 7-7 the BEV server 72 sends to the device 71 a notification of the registration. At step 7-8, the device 71 sends to the BEV server 72 a confirmation that the notification was received. At step 7-9, the voicemail server 74 sends to the BEV server 72 a confirmation that the subscription request was successful. Also, at step 7-10, the presence server 75 sends to the BEV server 72 a confirmation that the subscription request was successful. Accordingly, at step 7-11 the BEV server 72 sends to the device 71 a notification that the subscriptions were successful. At step 7-12, the device 71 sends to the BEV server 72 a confirmation that the notification was received.

Whenever there is a change in application feature status on the end point it would result in a BEV RE-SUBSCRIBE and also when the network situation changes it results in a BEV NOTIFY to be generated from the BEV Server to BEV endpoint.

Specific example details for the BEV signaling at steps 7-1, 7-2, 7-7, 7-8, 7-11, and 7-12, respectively, are detailed below. Note that these details are very specific for exemplary purposes only.

```
[ SUBSCRIBE ], verb [ 4 ]
Call-Id: 18623994909
Sequence-Id: 1
From: "BOSS User 1"<boss:8615@wintestnet.rim.net>
To: "BOSS User 1"<boss:8615@wintestnet.rim.net>
App-Id: mvsFmcClient;user=8615;features=fmc,mwi
Subscription-Expires: 3600
Event: BBEvent
[ SUCCESS ], verb [ 512 ]
Call-Id: 18623994909
Sequence-Id: 1
Subscription-Expires: 3599
[ NOTIFY ], verb [ 5 ]
Call-Id: 18623994909
Sequence-Id: 1
Timestamp: 1220626999945
App-Id: mvsFmcClient;features=fmc;state=active
Event: BBEvent
[ SUCCESS ], verb [ 512 ]
Call-Id: 18623994909
Sequence-Id: 1
[ NOTIFY ], verb [ 5 ]
Call-Id: 18623994909
Sequence-Id: 2
Timestamp: 1220629999945
App-Id: mvsFmcClient;features=mwi;state=active
Event: BBEvent
[ SUCCESS ], verb [ 512 ]
Call-Id: 18623994909
Sequence-Id: 2
```

Keep Alive/Re-Subscriptions/Out of Coverage

The initial SUBSCRIBE request carries a Subscription-Expires header. This header establishes the interval for which the BEV server will assume that the BEV endpoint is up even in the absence of any messaging. Note that Subscription interval has nothing to do with dialog expiration. A subscription may live beyond a session.

If the BEV server receives any message from the subscribed BEV end point then it resets the expiration timer as if it received a subscription refresh. Conversely a BEV endpoint that is subscribed to a server need not send re-SUBSCRIBE request messages at regular intervals if it is sending any other BEV messages to the server. However, sending of explicit Re-SUBSCRIBE request messages would not be a violation of the protocol.

Sending of re-SUBSCRIBE are optional and would not be required in cases where the BEV server is able to ascertain the connectivity and availability of BEV end point by some other out of band mechanism like a Relay ping information.

The BEV server also maintains the re-subscription/re-registration towards the applications servers 73, 74 and 75. The duration of this re-registration/re-subscription period is specific to the application servers.

Making or Getting a VoIP Call

Figure 8:
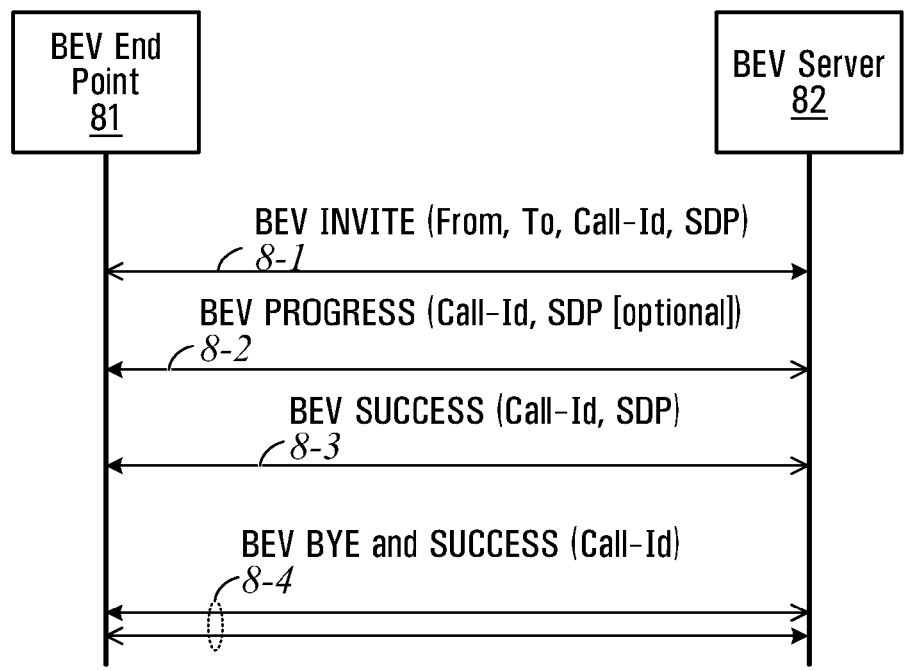

Referring now to FIG. 8, shown is a signalling diagram for a call setup (or session initiation) and teardown (or release/termination). In this example, there is a BEV end point 81 and a BEV server 82. The setup and teardown of a simple VoIP call will now be described below.

At step 8-1, the BEV end point 81 sends to the BEV server 82 a request to connect to a multi-media session. At step 8-2, the BEV server 82 sends to the BEV end point 81 a response to the request. Once the BEV end point 81 is connected to the multi-media session, then at step 8-3 the BEV server 82 sends to the BEV end point 81 a confirmation that the connection to the multi-media session was successful. Later at step 8-4, the BEV server 82 sends to the BEV end point a request to end the dialog, and the BEV end point 81 sends to the BEV server 82 a confirmation that the request to end the dialog was successful.

Note that a message having double arrows indicates that either one of the BEV end point 81 and the BEV server 82 can send the message. For instance, the BEV server 82 could alternatively request to connect to a multi-media session. This might be the case for example if a SIP node (not shown) in communication with the BEV server 82 is establishing a session with the BEV end point 81.

The setup and teardown of a simple VoIP call is similar to SIP except that there are fewer message exchanges. There is no 3 way handshake as in SIP because the unavailability of end point after it sent a BEV INVITE is detected by the BEV transport layer. Also, the setup and teardown of a simple VoIP call involves messages with headers that are stripped down because of nature of BEV. The headers shown in parentheses are the only ones that are used for basic call flows.

Note for most of the simple features like BUSY, NO ANSWER, and REJECT, that the messaging is similar to SIP except the above mentioned simplifications.

Specific example details for the BEV signaling at steps 8-1 through 8-4, respectively, are detailed below. Note that these details are very specific for exemplary purposes only.

```
[ INVITE ], verb [ 1 ]
Call-Id: 18796516481
Sequence-Id: 1
From: "BOSS User 1"<boss:8615@wintestnet.rim.net>
To: <boss:73244@10.251.73.26>
App-Id: mvsFmcClient
Content-Type: application/sdp
v=0
o=user 2000 1 IN IP4 10.251.73.26
s=Blackberry 2.0 MVS Session
c=IN IP4 10.251.73.26
t=0 0
m=audio 20000 RTP/AVP 0 8
a=rtpmap:0 PCMU/8000
a=rtpmap:8 PCMA/8000
a=sendrecv
[ PROGRESS ], verb [ 180 ]
To: "BOSS User 1"<boss:8615@wintestnet.rim.net>
From: <boss:73244@wintestnet.rim.net>
Call-Id: 18796516481
Sequence-Id: 1
[ SUCCESS ], verb [ 512 ]
Call-Id: 18796516481
Sequence-Id: 1
To: "BOSS User 1"<boss:8615@wintestnet.rim.net>
```

```
From: <boss:73244@wintestnet.rim.net>
Content-Type: application/sdp
v=0
o=user 2000 1 IN IP4 10.251.73.21
s=Cisco UCM
c=IN IP4 10.251.73.21
t=0 0
m=audio 20002 RTP/AVP 0 8
a=rtpmap:0 PCMU/8000
a=rtpmap:8 PCMA/8000
a=sendrecv
[ BYE ], verb [ 2 ]
Call-Id: 18796516481
Sequence-Id: 2
[ SUCCESS ], verb [ 512 ]
Call-Id: 18796516481
Sequence-Id: 2
```

Disconnecting Early Dialogs

Figure 9:
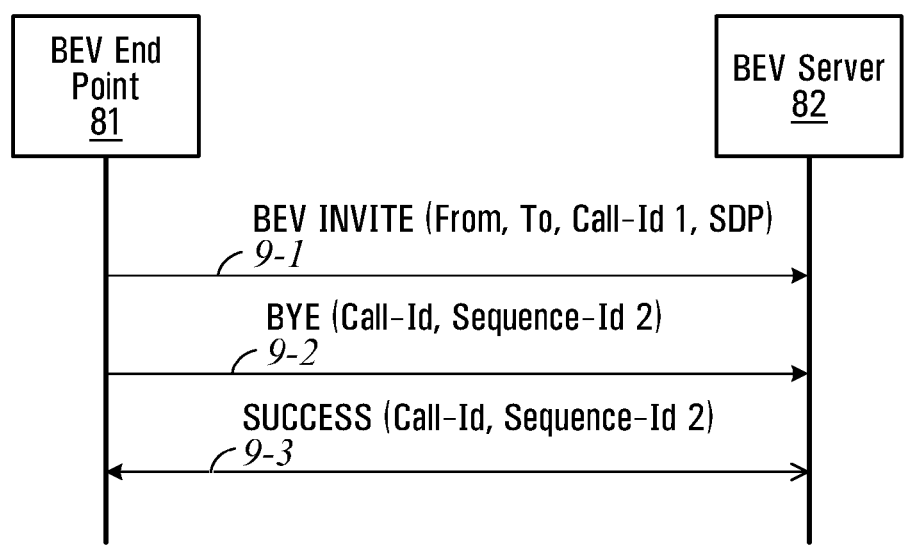

Referring now to FIG. 9, shown is a signalling diagram for INVITE and BYE on early dialogs. For this example, there is the BEV end point 81 and the BEV server 82. It will be shown that, unlike SIP protocol, BEV allows a BYE request to abandon a call before the call is established.

At step 9-1, the BEV end point 81 sends to the BEV server 82 a request to connect to a multi-media session. Soon after this, at step 9-2 the BEV end point 81 sends to the BEV server 82 a request to disconnect the dialog. Note that this request is sent before a final response is received. The BEV server 82 operates to cancel the call attempt and at step 9-3 sends to the BEV end point 81 a confirmation that the request to disconnect the dialog was successful.

BEV BYE differs from SIP CANCEL because BEV BYE can be sent anytime before a final response is received. Also, BEV BYE may be sent after or even before any provisional response is received but only after the transport ACK is received from the transport protocol for the INVITE request. In the event the INVITE has not successfully been delivered the BEV transport layer buffers the BYE request received from the originator.

BYE request will create its own transaction with Sequence-Id incremented by 1 from the INVITE request it cancels, so the pair of SUCCESS response and Sequence-Id will unambiguously indicate if this response if for INVITE or BYE transaction. The Server upon receiving the BYE request will stop processing of the INVITE request if it is in progress, terminate the early dialog, and send SUCCESS response for the BYE transaction. The INVITE transaction will not be responded. If SUCCESS response for the INVITE transaction has been generated and BYE request is received the Server will terminate the dialog and send SUCCESS response for the BYE transaction.

If the INVITE request is cancelled it does not form a dialog on the end point or the server.

Specific example details for the BEV signaling at steps 9-1 through 9-3, respectively, are detailed below. Note that these details are very specific for exemplary purposes only.

```
[ INVITE ], verb [ 1 ]
Call-Id: 18796516483
Sequence-Id: 1
From: "BOSS User 1"<boss:8615@wintestnet.rim.net>
To: <boss: 73244@10.251.73.26>
App-Id: mvsFmcClient
Content-Type: application/sdp
v=0
o=user 2000 1 IN IP4 10.251.73.26
```

```
s=Blackberry 2.0 MVS Session
c=IN IP4 10.251.73.26
t=0 0
m=audio 20000 RTP/AVP 0 8
a=rtpmap:0 PCMU/8000
a=rtpmap:8 PCMA/8000
a=sendrecv
[ BYE ], verb [ 2 ]
Call-Id: 18796516483
Sequence-Id: 2
[ SUCCESS ], verb [ 512 ]
Call-Id: 18796516483
Sequence-Id: 2
```

INVITE without SDP or SIP UPDATE

Figure 10:
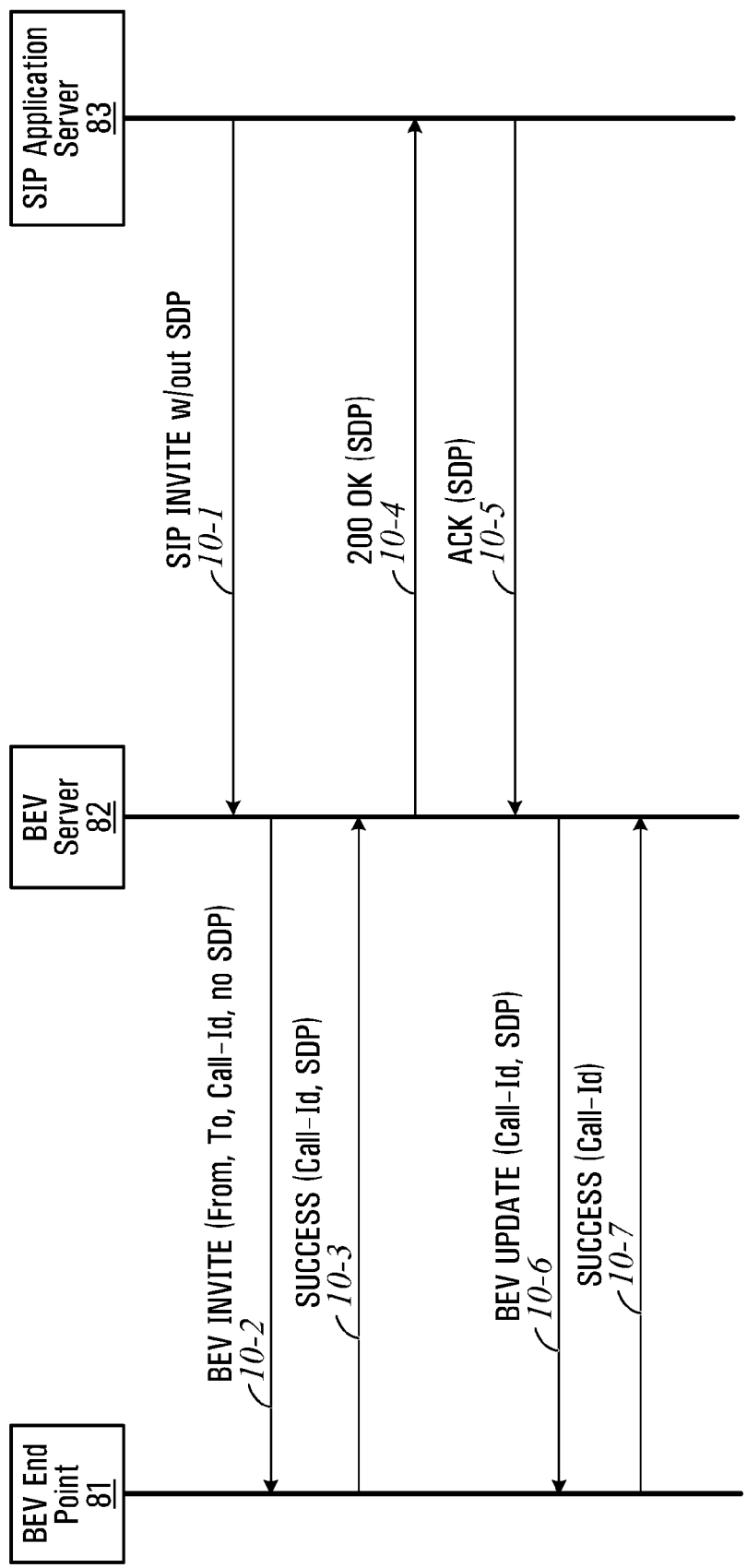

Referring now to FIG. 10, shown is a signalling diagram depicting SIP invite without an SDP. In this example, there is the BEV end point 81, the BEV server 82, and a SIP application server 83. It will be shown that a call can be established when the SIP invite does not include an SDP.

At step 10-1, the SIP application server 83 sends to the BEV server 82 a request to connect to a multi-media session. In this case, the request is without an SDP. At step 10-2, the BEV server 82 sends to the BEV end point 81 a request to connect to the multi-media session. Again, no SDP is present in the request. At step 10-3, the BEV end point 81 sends to the BEV server 82 a confirmation that the request to connect to the multi-media session was successful. Note that the confirmation includes the SDP. At step 10-4, the BEV server 82 sends to the SIP application server 83 a confirmation that the request to connect to the multi-media session was successful. Again, this confirmation includes the SDP. At step 10-5, the SIP server 83 sends to the BEV server 82 an acknowledgement that the confirmation was received. Note that this acknowledgement includes the SDP. At step 10-6, the BEV server 82 sends to the BEV end point 81 a request to update the existing dialog based on the SDP provided by the SIP application server 83. Note that since BEV does not have a 3 way handshake as in SIP there is not any opportunity to send the SDP via an ACK. Therefore, the general purpose UPDATE request is used to UPDATE the SDP for all such cases, including a re-INVITE or even an UPDATE case. The BEV end point 81 updates the existing dialog and at step 10-7 sends to the BEV server 82 a confirmation that the update was successful.

Specific example details for the BEV signaling at steps 10-2, 10-3, 10-6, and 10-7, respectively, are detailed below. Note that these details are very specific for exemplary purposes only.

```
[ INVITE ], verb [ 1 ]
Call-Id: 18796516488
Sequence-Id: 1
From: "BOSS User 1"<boss:8615@wintestnet.rim.net>
To: <boss: 73244@10.251.73.26>
App-Id: mvsFmcClient
[ SUCCESS ], verb [ 512 ]
Call-Id: 18796516488
Sequence-Id: 1
To: "BOSS User 1"<boss:8615@wintestnet.rim.net>
From: <boss:73244@wintestnet.rim.net>
Content-Type: application/sdp
v=0
o=user 2003 1 IN IP4 10.251.73.21
s=Blackberry 2.0 MVS Session
c=IN IP4 10.251.73.21
t=0 0
m=audio 20002 RTP/AVP 0 8
```

-continued

```
a=rtpmap:0 PCMU/8000
a=rtpmap:8 PCMA/8000
a=sendrecv
[ UPDATE], verb [3 ]
Call-Id: 18796516488
Sequence-Id: 2
App-Id: mvsFmcClient
Content-Type: application/sdp
v=0
o=user 2000 2 IN IP4 10.251.73.26
s=Cisco UCM
c=IN IP4 10.251.73.26
t=0 0
m=audio 20000 RTP/AVP 0 8
a=rtpmap:0 PCMU/8000
a=rtpmap:8 PCMA/8000
a=sendrecv
[ SUCCESS ], verb [ 512 ]
Call-Id: 18796516488
Sequence-Id: 2
```

SUBSCRIBE and NOTIFY

Figure 11:
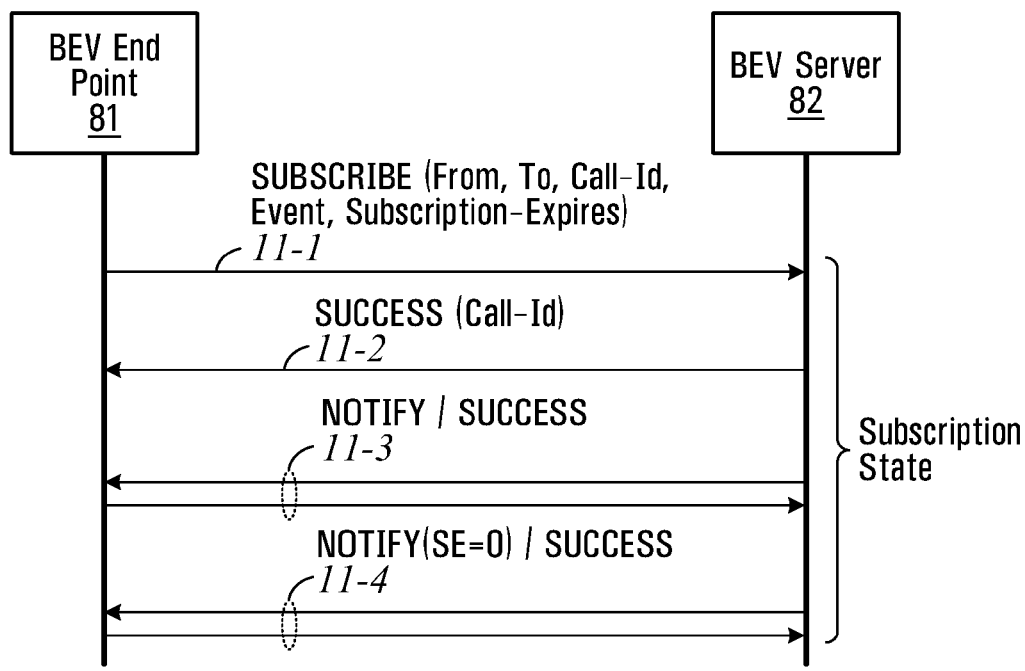

Referring now to FIG. 11, shown is a signalling diagram for subscribing to events and receiving notifications. In this example, there is the BEV end point 81 and the BEV server 82. It will be shown that BEV entities can SUBSCRIBE for events and get notifications when that event is generated on the network/BEV Server.

At step 11-1, the BEV end point 81 sends to the BEV server a request to subscribe to a certain event type. The BEV server 82 subscribes the BEV end point 81 to the event type and at step 11-2 sends to the BEV end point a confirmation that the request was successful. Later at step 11-3, the BEV server 82 sends to the BEV end point 81 a notification of an event, and the BEV end point 81 sends to the BEV server 82 a confirmation that the notification was successful. Later at step 11-4, the BEV server 82 sends to the BEV end point 81 a notification that the subscription has been terminated by the application server, this being indicated with a Subscription-Expires header set to zero.

As shown in this example, a general purpose subscribe notify mechanism exists in BEV like SIP, for subscribing to events. The SUBSCRIBE request carries a Subscription-Expires header that indicates the overall subscription interval requested. As like Dialogs the Server can reject with a SUBSCRIPTION INTERVAL TOO HIGH, with a suggested Subscription-Expires header. If the server accepts it then the client can expect to receive NOTIFY events, when the subscription ends the server sends a NOTIFY indicating the end of subscription.

Note that Subscriptions are independent of Dialog expiry as a result subscription state is orthogonal to dialog state and is more persistent in nature. This also implies that Dialogs are not directly linked with Subscriptions and theoretically an end point (or server) may issue two separate SUBSCRIBE requests from (or to) the same end point for the same event type. The receiver then updates the Subscription-Expires with the new request. Note that only one NOTIFY is be generated for one Event towards (from) an end point. Subscriptions are a contract between an end point and server on an event basis in BEV and are not bound to a dialog.

Options

Figure 12:
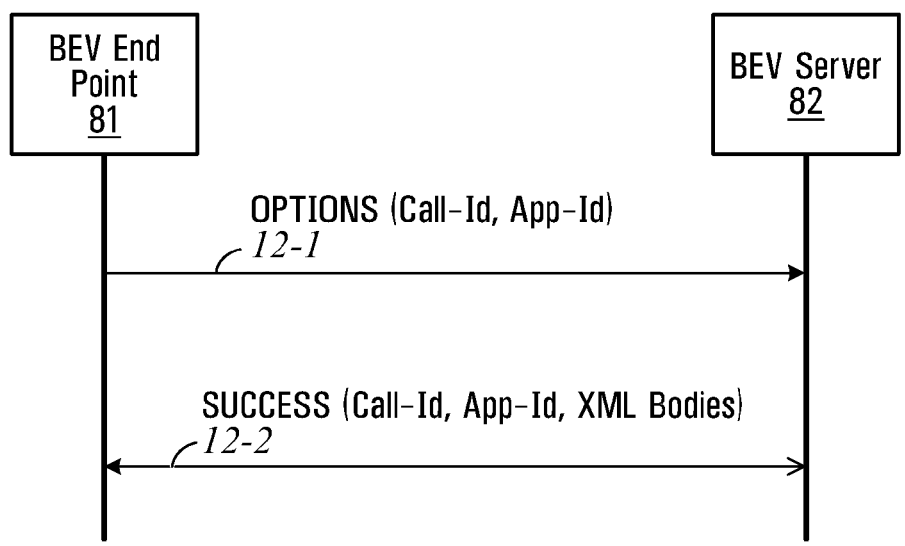

Referring now to FIG. 12, shown is a signalling diagram for getting configuration from a configuration server. For this example, there is the BEV end point 81 and the BEV server 82. At step 12-1, the BEV end point 81 sends to the BEV server 82 a message indicating the capabilities of the BEV end point 81. The BEV server 82 is updated and at step 12-2 sends to the BEV end point 81 a confirmation that the request was successful.

Sometimes SIP OPTION is used for getting configuration from a configuration server. BEV provides a similar mechanism; the configuration can be received for the device or for Apps deployed on it. The optional App-Id header contains the list of applications that are requesting the configuration, the response may contain the XML payload—possibly with multipart MIME. Note that no other header is used for this processing. In response, the App-Id order corresponds to the order of payload in XML multipart for different applications.

Call Waiting and Hold

Figure 13:
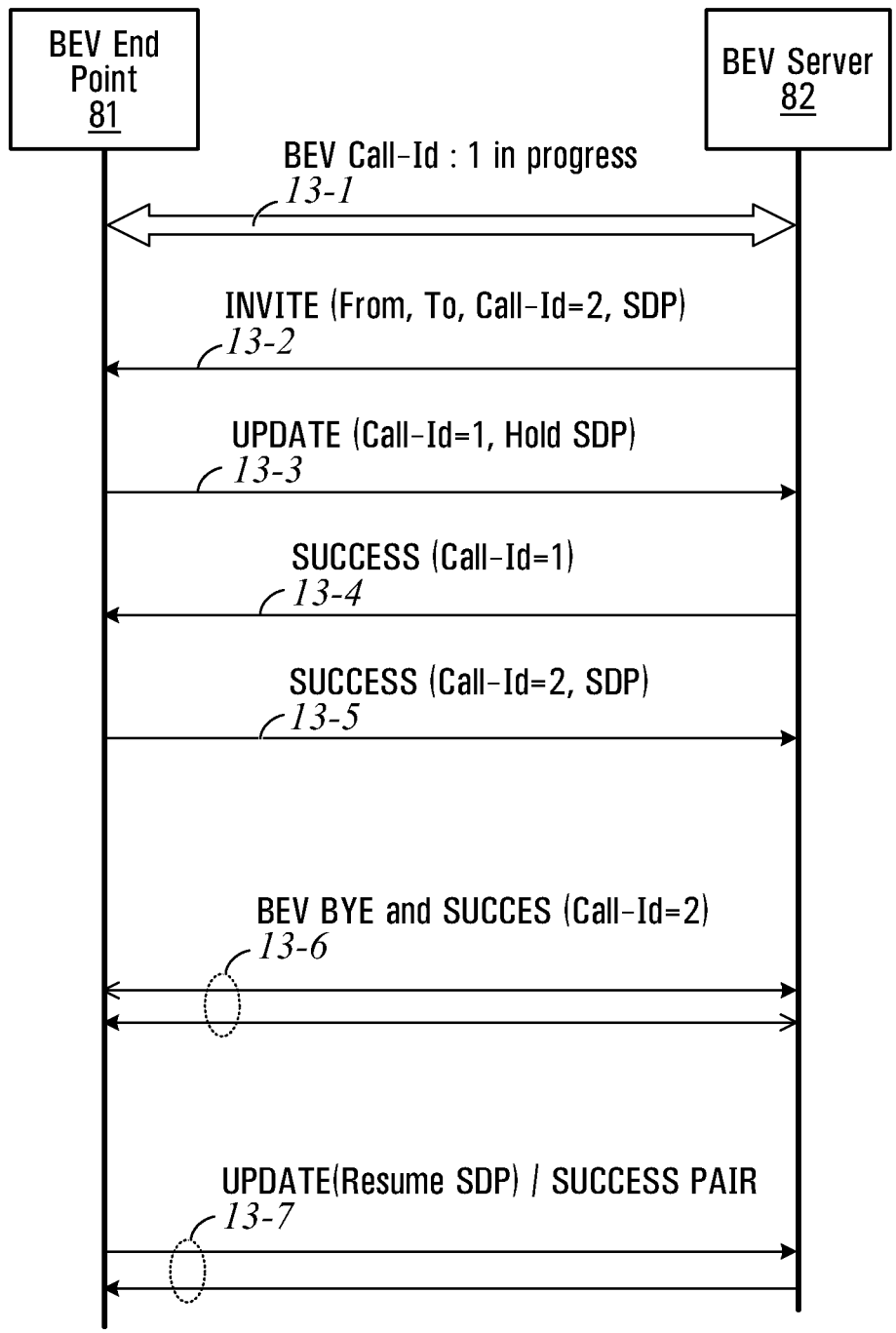

Referring now to FIG. 13, shown is a signalling diagram for call waiting and hold. In this example, the BEV end point 81 is coupled the BEV server 82. For this example, it is assumed that one dialog is already in progress when the device 81 gets an incoming call from the server 82.

At step 13-1, there is a first call in progress. At step 13-2, the BEV server 82 sends to the BEV end point 81 a request to connect to a second multi-media session. Note that the request has a different call id meaning that this is a new call. At step 13-3, the user has answered the new incoming call, and so the BEV end point sends to the BEV server 82 a request to place the first call on hold. At step 13-4, the BEV server 82 sends to the BEV end point 81 a confirmation that the request to place the first call on hold was successful. At step 13-5, the BEV end point 81 sends to the BEV server 82 a confirmation that the request to connect to the second multi-media session was successful. At this point, the second call is active while the first call is on hold.

Later at step 13-6, the BEV end point 81 sends to the BEV server 82 a request to end the second call, and then the BEV server 82 sends to the BEV end point 81 a confirmation that the request was successful. Thus, the second call was ended by the BEV end point 81. Note that alternatively the second call could be ended by the BEV server 82. After the second call has ended and the user resumes the first call, the BEV end point 81 sends to the BEV server 82 a request to resume the first call, and then the BEV server sends to the BEV end pint 81 a confirmation that the request was successful.

Figure 14:
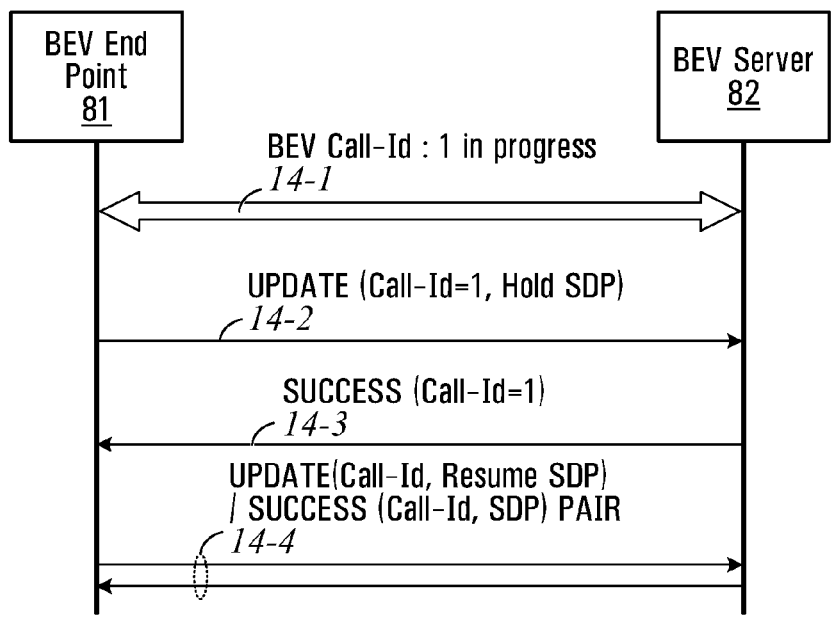

Referring now to FIG. 14, shown is a signalling diagram for a hold and resume procedure. In this example, there is the BEV end point 81 and the BEV server 82. It will be shown that, similar to the Hold procedure shown in FIG. 13, the UPDATE request can re-connect a previously held call with a single transaction.

At step 14-1, there is an active call in progress. At step 14-2, the BEV end point 81 sends to the BEV server 82 a request to place the call on hold. The BEV server 82 places the call on hold and at step 14-3 sends to the BEV server 82 a confirmation that the request was successful. Later at step 14-4, the BEV end point 81 sends to the BEV server 82 a request to resume the call. The BEV server 82 resumes the call and at step 14-5 sends to the BEV end point 81 a confirmation that the request was successful. In the last UPDATE message, the SUCCESS response contains a new SDP that would allow the BEV end point 81 to resume the RTP (Real Time Protocol) conversation again.

Call Swap

Figure 15:
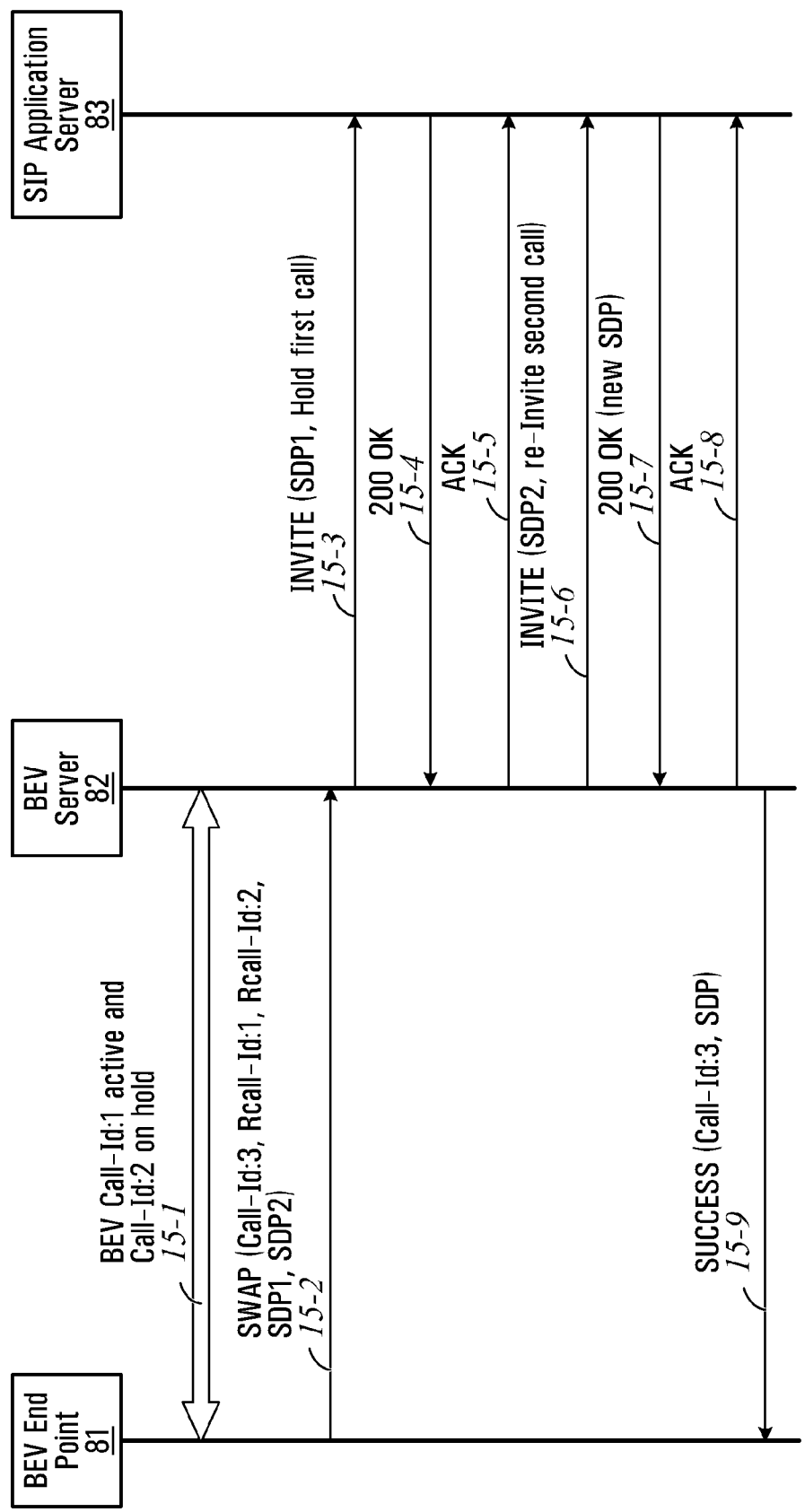

Referring now to FIG. 15, shown is a signalling diagram for swapping two calls. In this example, there is the BEV end point 81, the BEV server 82, and the SIP application server 83. A call swap, which is a mechanism where there are at least two calls the user in engaged in at any given time and one is active and other(s) are on hold, will now be shown to be achieved by a combination of UPDATE-Hold and UPDATE-Resume transactions.

At step 15-1, there is a first call that is active and a second call that on hold (by UPDATE-Hold mechanism). At step 15-2, the BEV end point 81 sends to the BEV server a request to swap the two calls, this action being triggered by the user of the BEV end point 81. There are two RCall-Id headers: one refers to the active call and the other refers to the held call. Also, there are two SDPs as Multipart MIME: a first SDP for generating a Hold and a second SDP for Re-Inviting the other party. The request to swap the two calls involves a macro operation meaning that the BEV server 82 goes on to perform multiple SIP transactions (i.e. 15-3 through 15-8) to complete the macro operation.

At step 15-3, the BEV server 82 sends to the SIP application server 83 a request to hold the first call. The SIP application server 83 places a first call on hold and at step 15-4 sends to the BEV server 82 a confirmation that the request was successful. At step 15-5 the BEV server 82 sends to the SIP application server an acknowledgement of the confirmation. At step 15-6, the BEV server 82 sends to the SIP application server 83 a request to activate the second call, which was initially on hold. The SIP application server 83 activates the second call and at step 15-7 sends to the BEV server 82 a confirmation that the request was successful. At step 15-8, the BEV server 82 sends to the BEV application server 83 an acknowledgement of the confirmation. Note that while in this example the two calls are active on the same SIP application Server 83, it is possible that the calls are on different SIP Application Servers, e.g. one call on the local enterprise PBX while the second is an IMS-based call. In either case, the BEV end point 81 is abstracted from the complexity of how the calls are routed and controlled.

At this point, the two calls have been swapped and therefore at step 15-9 the BEV server 82 sends to the BEV end point 81 a confirmation that the request to swap the two calls was successful. The SUCCESS response may also carry a new SDP in order to resume the voice with seconds call. Note that BEV simplifies the call swap procedure by having only one transaction between the BEV end point 81 and the BEV server 82.

In case of swap failure, the BEV end point 81 will sent UPDATE to resume the corresponding dialog based on the reason header.

Un-Attended Call Transfer

Figure 16:
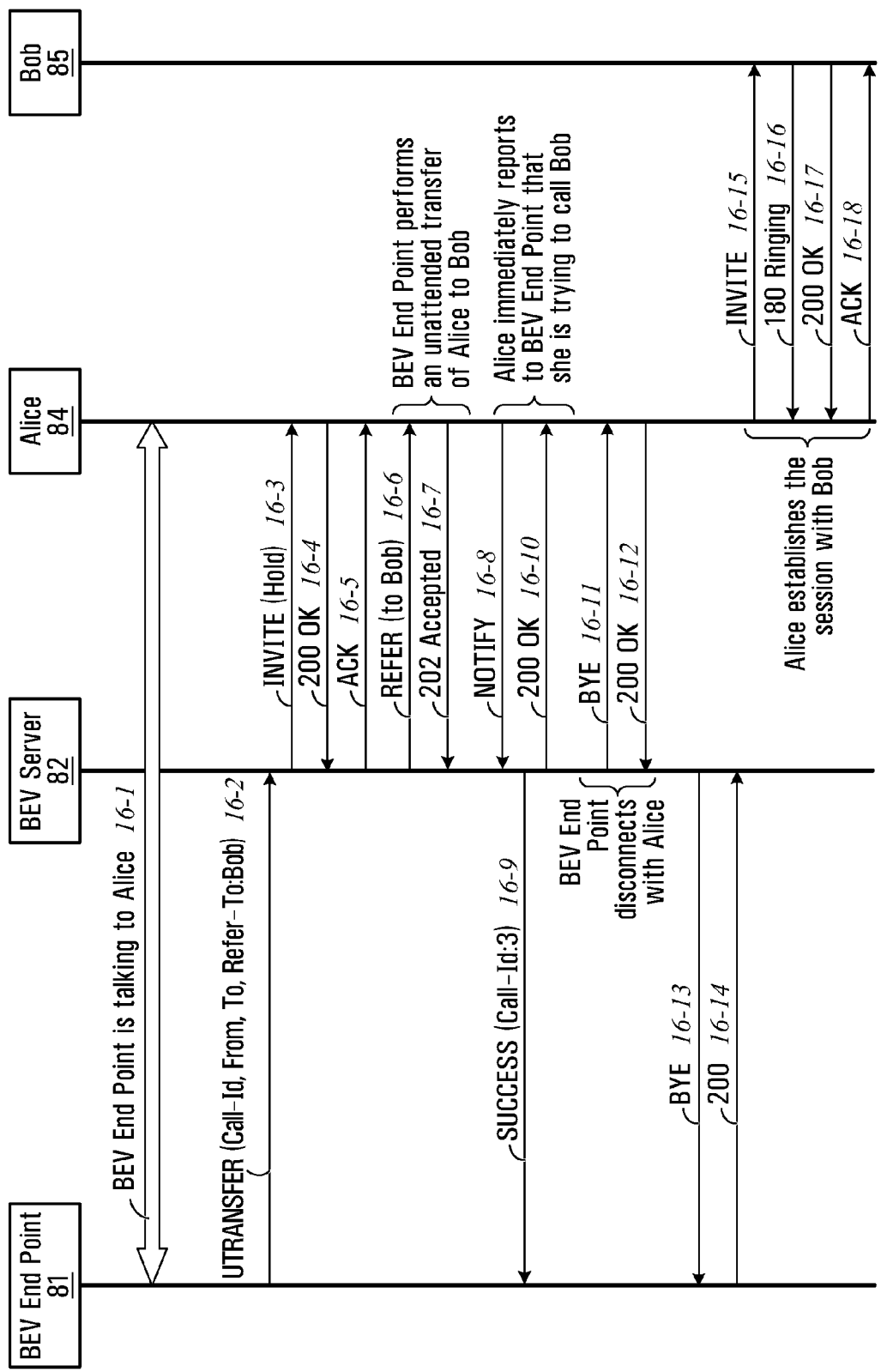

Referring now to FIG. 16, shown is a signalling diagram for an unattended call transfer. In this example, there is the BEV end point 81, the BEV server 82, Alice 84, and Bob 85. Alice 84 and Bob 85 are both SIP devices. In the unattended transfer case the BEV end point 81 transfers a call to some other party 85 without first consulting with the new callee 85. As usual BEV call flow is a simplification of the actual SIP call flow.

At step 16-1, the BEV end point 81 is talking to Alice 84. At this point, Bob 85 is not participating in any communication. At step 16-2, the BEV end point 81 sends to the BEV server 82 a request for an unattended transfer so that Alice 84 and Bob 85 can communicate with one another. The request for an unattended transfer involves a macro operation meaning that the BEV server 82 goes on to perform multiple SIP transactions (i.e. 16-3 through 16-12) to complete the macro operation.

At step 16-3, the BEV server 82 sends to Alice 84 a request to place the call on hold. Alice 84 places a call on hold and at step 16-4 sends to the BEV server 82 a confirmation that the request was successful. At step 16-5, the BEV server 82 sends to Alice 84 an acknowledgement of the success. At step 16-6, the BEV server 82 sends to Alice 84 a request to perform a transfer to Bob 85. At step 16-7, Alice 84 sends to the BEV server 82 a confirmation that the request was received. At step 16-8, Alice 84 sends to the BEV server 82 a notification that Alice 84 will try to call Bob 85. At step 16-9, the BEV server 82 sends to Alice 84 a confirmation that the notification was received. Since Alice 84 will try to call Bob 85, the BEV server 82 sends to Alice 84 a request to disconnect from the call. Alice 84 disconnects and at step 16-12 sends to the BEV server 82 a confirmation that the request was successful. Accordingly, at step 16-13 the BEV server 82 sends to the BEV end point 81 a request to disconnect from the call. The BEV end point 81 disconnects from the call and at step 16-14 sends to the BEV server 82 a confirmation that the request was successful. At this point, the BEV end point 81 and Alice 84 are disconnected.

Subsequently, Alice 84 establishes a session with Bob 85 at steps 16-15 through 16-18. At step 16-15, Alice 84 sends to Bob 85 a request to connect to a call. At step 16-16, Bob 85 sends to Alice 84 a message that indicates ringing. Once Bob 85 answers the call, then at step 16-17 Bob 85 sends to Alice 84 a confirmation that the request to connect to the call was successful. At step 16-18, Alice sends to Bob 85 an acknowledgment of the success. At this point, the call has been transferred from between the BEV end point 81 and Alice 84 to between Alice 84 and Bob 85.

The Unattended transfer happens within one single BEV transfer, the request for unattended transfer is called UTRANSFER. In the above figure the signaling in red is SIP and black is BEV. On getting the UTRANSFER request the BEV server may engage in SIP call flow for unattended transfer, at some point on the SIP side a BYE is issued to Alice at which time on the BEV side a SUCCESS response is sent out. This can also be a signal to shutdown any RTP channel towards Alice as we know that call transfer is now in progress.

Note that Un-Attended transfers can happen in many ways on the SIP side, as an example in the case of Move call feature on getting UTRANSFER request to desk the BEV server 82 may hold one participant and initiate call to the desk-phone and then send REFER to PBX with Replaces. As far as BEV is concerned this is just another UTANSFER case. The actual variation of SIP signaling is handled by the application on the BEV server 82.

Specific example details for the BEV signaling at steps 16-2, 16-9, 16-13, and 16-14, respectively, are detailed below. Note that these details are very specific for exemplary purposes only.

```
[ UTRANSFER], verb [ C ]
Call-Id: 187965164
From: "BOSS User 1"<boss:8615@wintestnet.rim.net>
To: <boss:73244@10.251.73.26>
Sequence-Id: 5
Refer-To: <boss:8616@wintestnet.rim.net>
App-Id: mvsFmcClient
[ SUCCESS ], verb [ 512 ]
Call-Id: 187965164
Sequence-Id: 5
[ BYE ], verb [ 2 ]
Call-Id: 187965164
Sequence-Id: 6
[ SUCCESS ], verb [ 512 ]
Call-Id: 187965164
Sequence-Id: 6
```

Attended Call Transfer

Figure 17:
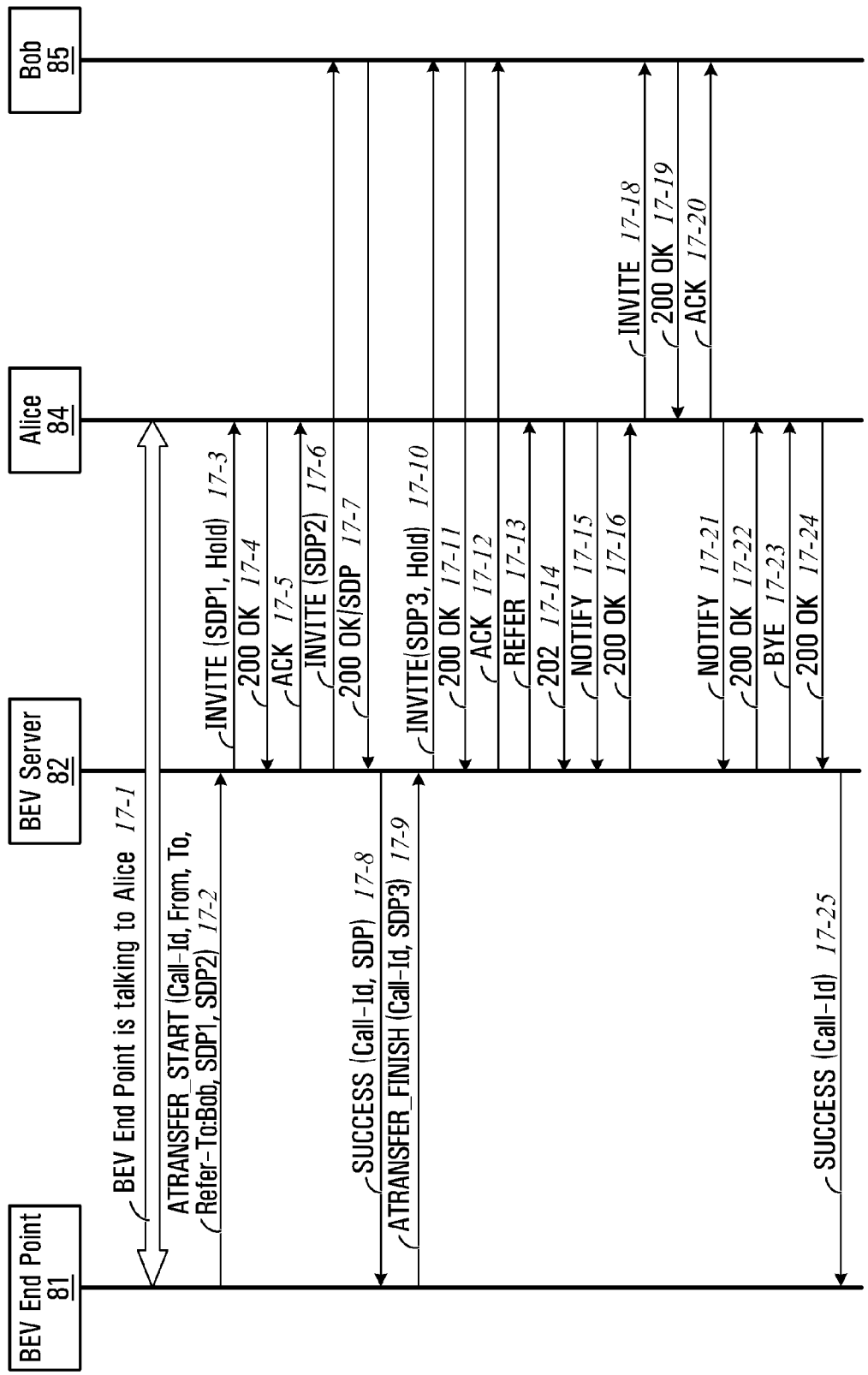
Figure 18:
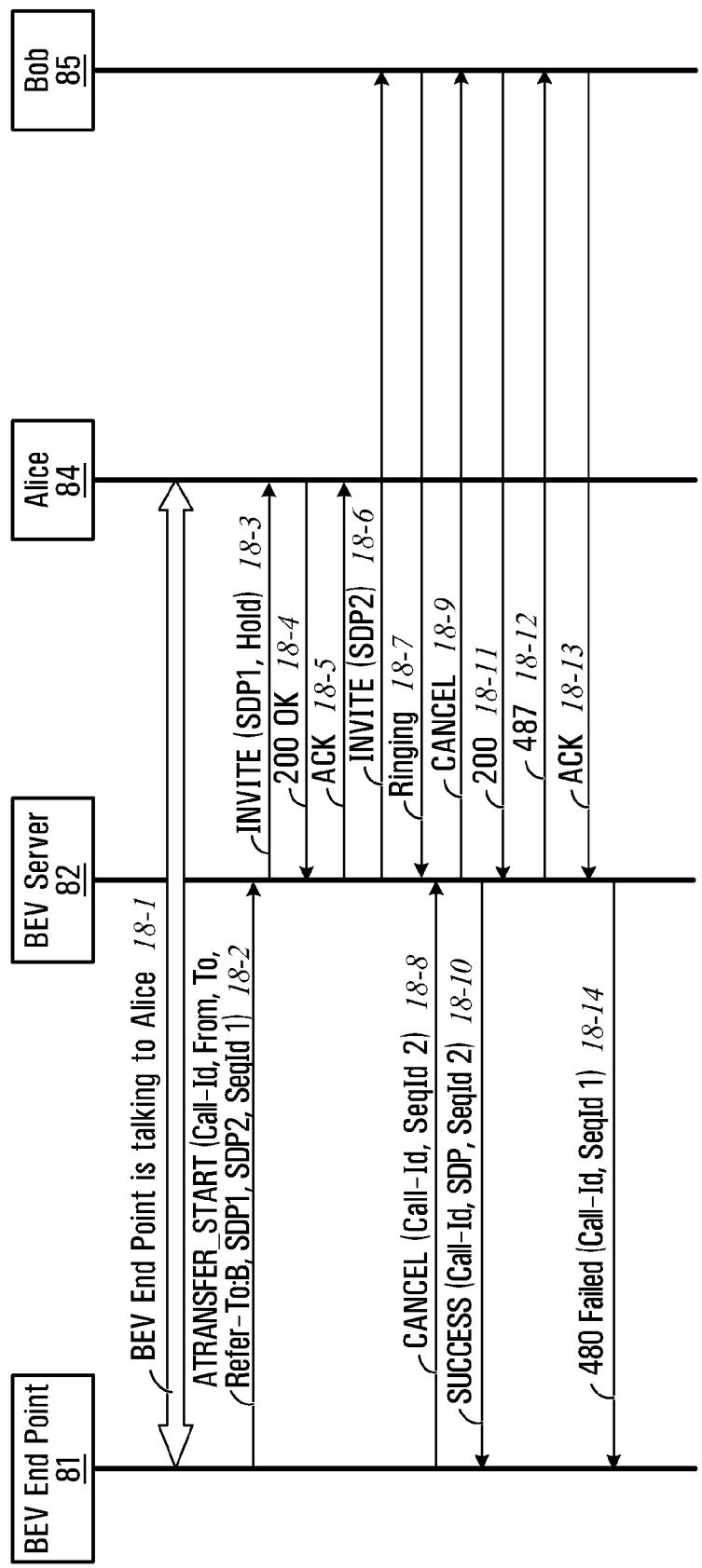
Figure 19:
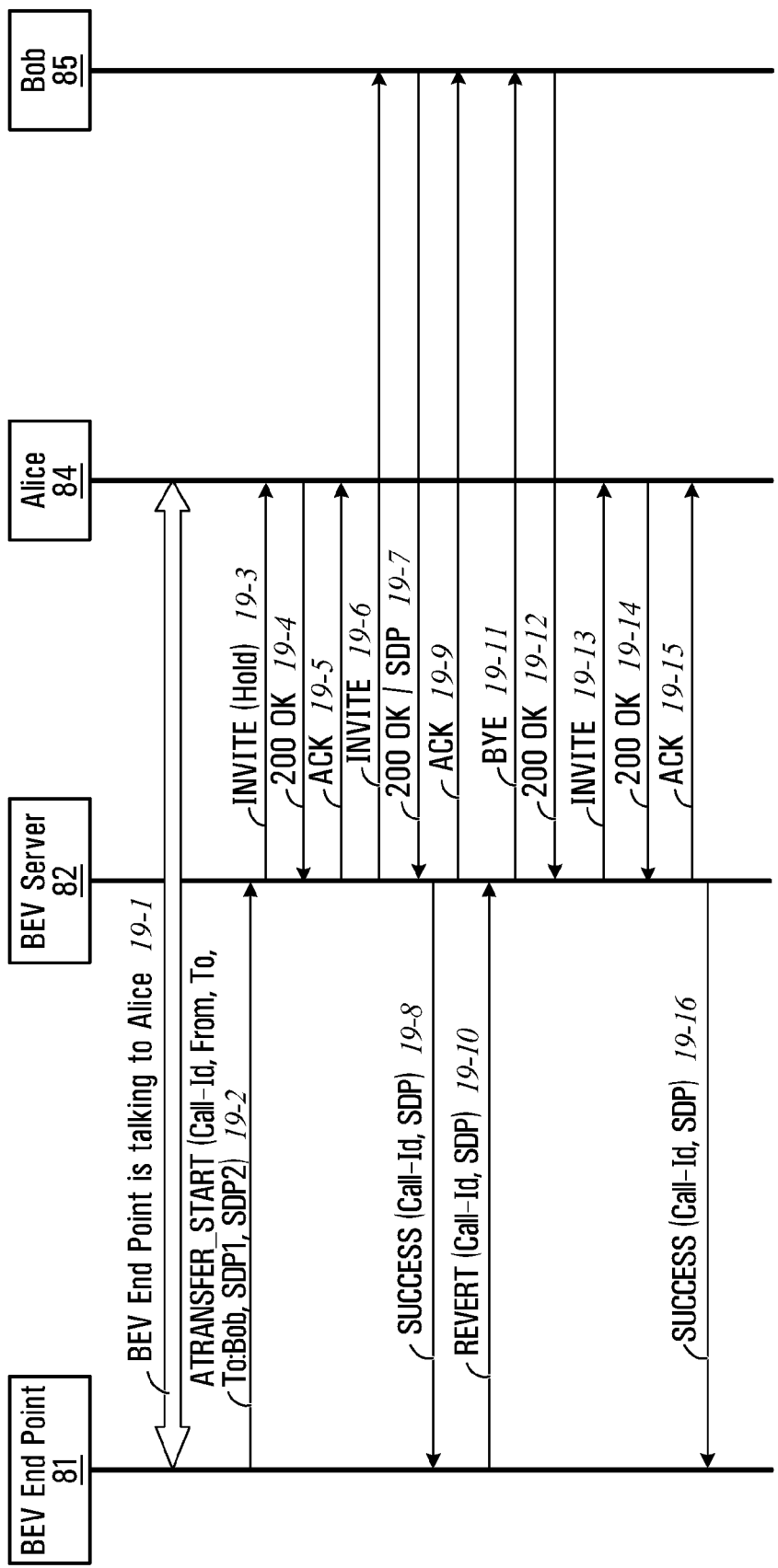
Figure 20:
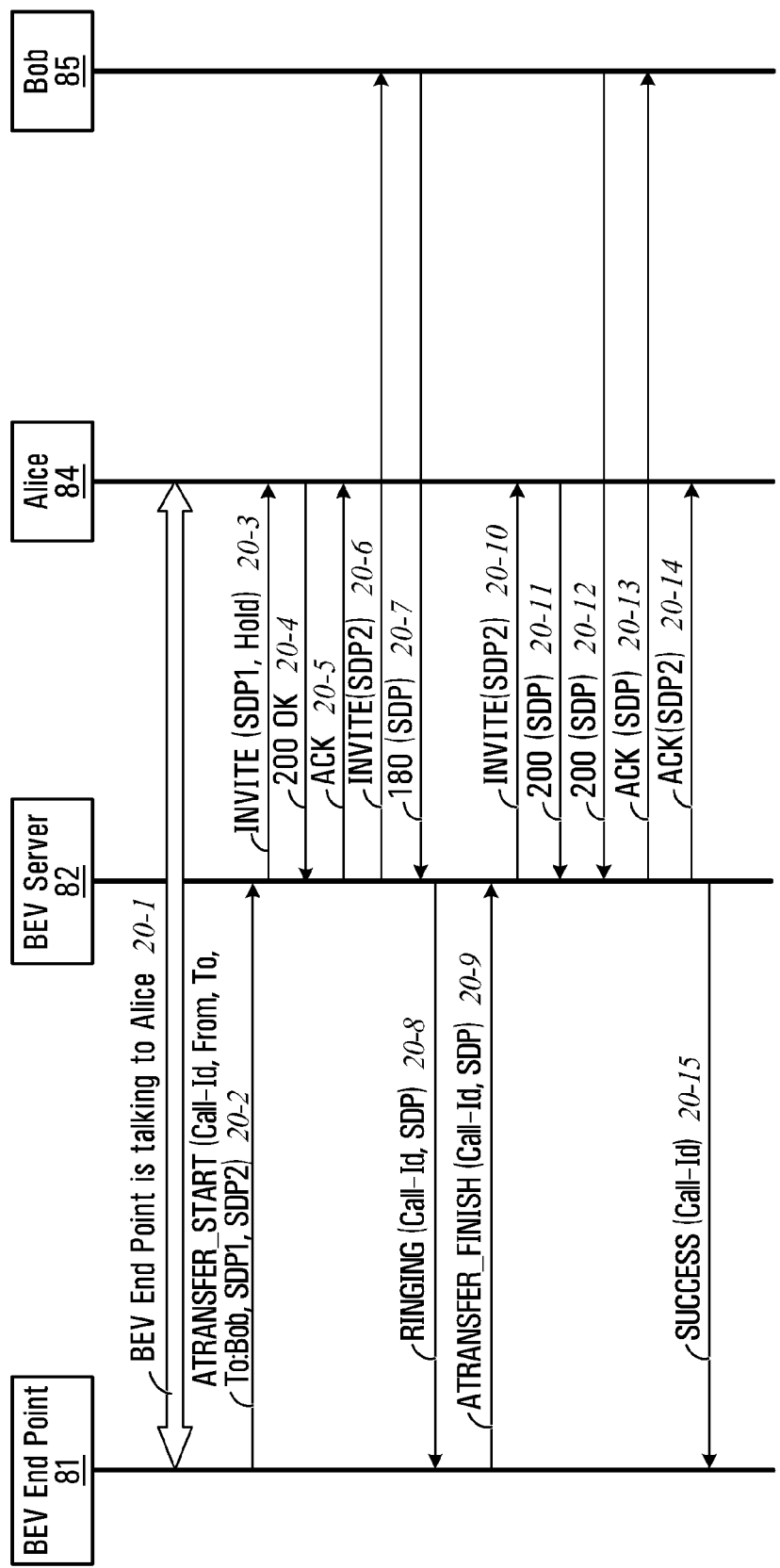
Figure 21:
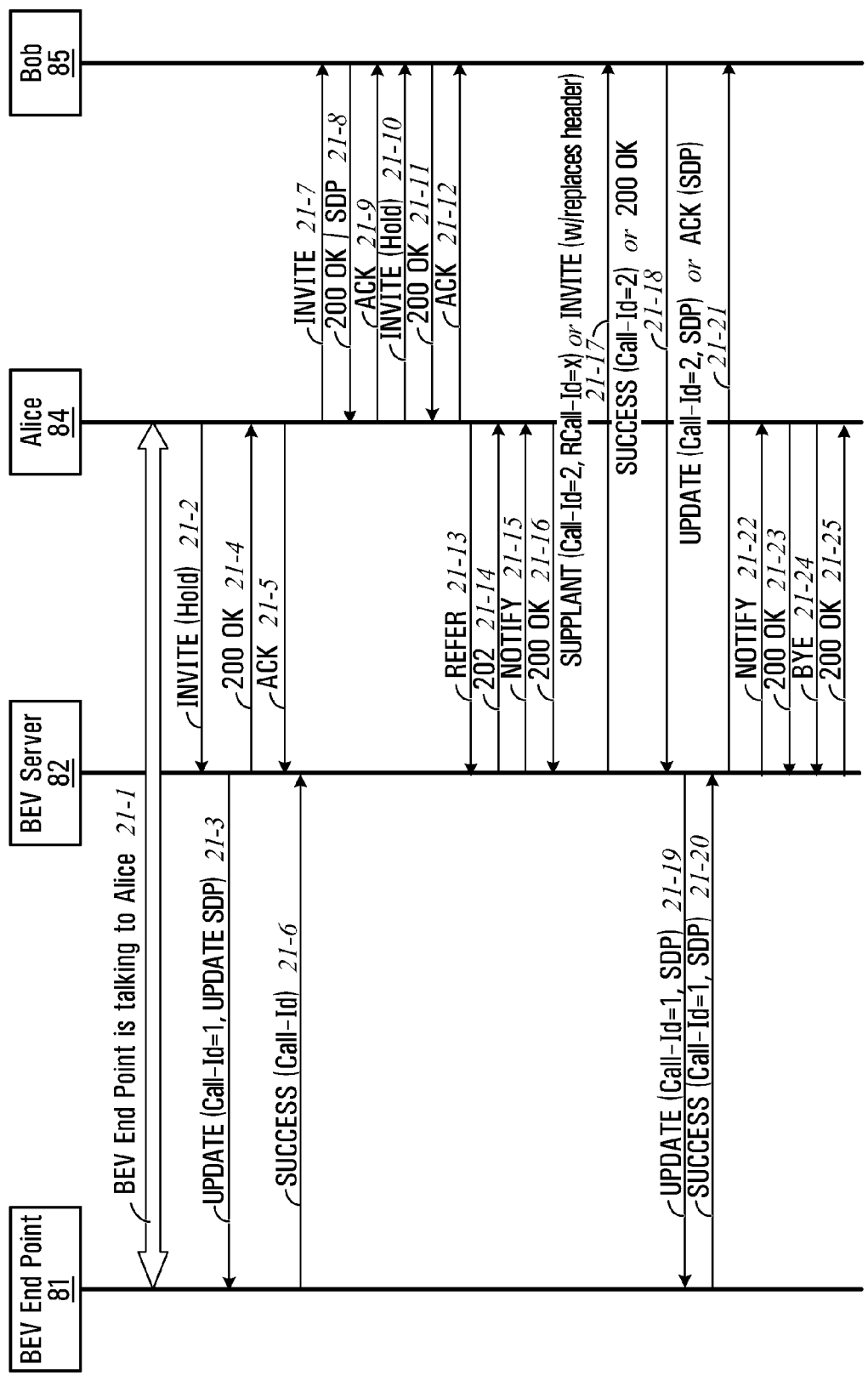

Referring now to FIG. 17, shown is a signalling diagram for an attended transfer. The attended call transfer flow is one in which before transferring the call the second callee is first consulted. It will be shown how the end point 81 is in conversation with Alice 84 and does an attended transfer to Bob 85 after first talking to Bob 85 to presumably obtain his consent.

At step 17-1, the BEV end point 81 is talking to Alice 84. At step 17-2, the BEV end point 81 sends to the BEV server 82 a request to start an attended transfer. The ATRANSFER_START starts the proceedings and also stops the RTP from the end point to Alice. This flow also uses a Multipart MIME and contains two SDPs. The first SDP is for the first Hold and second SDP is to be used to INVITE other party (Bob in this example). The request to start an attended transfer involves a macro operation meaning that the BEV server 82 goes on to perform multiple SIP transactions (i.e. 17-3 through 17-7) to complete the macro operation.

At step 17-3, the BEV server 82 sends to Alice 84 a request to place the call on hold. Alice 84 places the call on hold and at step 17-4 sends to the BEV server 82 a confirmation that the request was successful. At step 17-5, the BEV server 82 sends to Alice 84 an acknowledgement of the success. At step 17-6, the BEV server 82 sends to Bob 85 a request to connect to a multi-media session. Bob 85 connects to the session and at step 17-7 sends to the BEV server 82 a confirmation that the request was successful. At step 17-8, the BEV server 82 sends to the BEV end point 81 a confirmation that the request to start the attended transfer was successful. The SUCCESS response has the SDP of Bob 85 and so the BEV end point 81 can consult with Bob 85 before the actual transfer. At this point, the start of the attended transfer has been completed.

The BEV end point 81 can communicate with Bob 85 and presumably obtains his consent to transfer him to Alice 84. At step 17-9, the BEV end point 81 sends to the BEV server 82 a request to finish the attended transfer. The ATRANSFER_FINISH request mutes the voice channel and on receiving the SUCCESS completely tears down the dialog on the BEV end point. The request to finish the attended transfer involves a macro operation meaning that the BEV server 82 goes on to perform multiple SIP transactions (i.e. 17-10 through 17-24) to complete the macro operation.

At step 17-10, the BEV server 82 sends to Bob 85 a request to place the call on hold. Bob 85 places the call on hold and at step 17-11 sends to the BEV server 82 a confirmation that the request was successful. At step 17-12, the BEV server 82 sends to Bob 85 an acknowledgement of the success. At step 17-13, the BEV server 82 sends to Alice 84 a request to call Bob 85. At step 17-14, Alice 84 sends to the BEV server 82 a confirmation that the request was received, and, as part of the standard SIP call flow, Alice send a NOTIFY as acknowledgement to the REFER in step 17-13. At step 17-16, the BEV server 82 sends to Alice a confirmation that the notification was received.

Alice 84 goes on to call Bob 85. At step 17-18, Alice 84 sends to Bob 85 a request to connect to a call. Bob 85 connects to the call and at step 17-19 sends to Alice 84 a confirmation that the request was successful. At step 17-20, Alice 84 sends to Bob 85 an acknowledgement of the success. Also, at step 17-21 Alice 84 sends to the BEV server 82 a notification that the call between Alice 84 and Bob 85 has been established. At step 17-22, the BEV server 82 sends to Alice 84 a confirmation that the notification was received. At step 17-23, the BEV server 82 sends to Alice 84 a request to end the call. The call is ended and at step 17-24 Alice 84 sends to the Bev server 82 a confirmation that the request was successful. Accordingly, at step 17-25 the BEV server 82 sends to the BEV end point 81 a confirmation that the request to finish the attended transfer was successful.

Specific example details for the BEV signaling at steps 17-2, 17-8, 17-9, and 17-25, respectively, are detailed below. Note that these details are very specific for exemplary purposes only.

```
[ ATRANSFER_START], verb [ D ]
Call-Id: 18796516433
From: "BOSS User 1"<boss:8615@wintestnet.rim.net>
To: <boss:73244@10.251.73.26>
Sequence-Id: 8
Refer-To: <boss:8616@wintestnet.rim.net>
App-Id: mvsFmcClient
Content-Type: application/sdp
v=0
o=user 2000 5 IN IP4 10.251.73.26
s=Blackberry 2.0 MVS Session
c=IN IP4 10.251.73.26
t=0 0
m=audio 20000 RTP/AVP 0 8
a=rtpmap:0 PCMU/8000
a=rtpmap:8 PCMA/8000
a=sendonly
v=0
o=user 2001 1 IN IP4 10.251.73.26
s=Blackberry 2.0 MVS Session
c=IN IP4 10.251.73.26
t=0 0
m=audio 20002 RTP/AVP 0 8
a=rtpmap:0 PCMU/8000
a=rtpmap:8 PCMA/8000
a=sendrecv
[ SUCCESS ], verb [ 512 ]
Call-Id: 18796516433
Sequence-Id: 8
Content-Type: application/sdp
v=0
o=user 2003 5 IN IP4 10.251.73.21
s=Cisco UCM
c=IN IP4 10.251.73.21
t=0 0
m=audio 20002 RTP/AVP 0 8
a=rtpmap:0 PCMU/8000
a=rtpmap:8 PCMA/8000
a=sendrecv
[ ATRANSFER_FINISH], verb [ E ]
Call-Id: 18796516433
From: "BOSS User 1"<boss:8615@wintestnet.rim.net>
To: <boss:73244@10.251.73.26>
Sequence-Id: 9
Refer-To: <boss:8616@wintestnet.rim.net>
App-Id: mvsFmcClient
Content-Type: application/sdp
v=0
o=user 2001 2 IN IP4 10.251.73.26
s=Blackberry 2.0 MVS Session
c=IN IP4 10.251.73.26
t=0 0
m=audio 20002 RTP/AVP 0 8
a=rtpmap:0 PCMU/8000
a=rtpmap:8 PCMA/8000
a=sendonly
[ SUCCESS ], verb [ 512 ]
Call-Id: 18796516433
Sequence-Id: 9
```

Sometimes, the Bev end point 81 may not want to cancel the attended transfer. An example of this will now be described below with reference to FIG. 18, which is a signalling diagram for cancelling an attended transfer.

At step 18-1, the BEV end point 81 is talking to Alice 84. At step 18-2, the BEV end point 81 sends to the BEV server 82 a request to start an attended transfer. The request to start an attended transfer involves a macro operation meaning that the BEV server 82 goes on to perform multiple SIP transactions (i.e. 18-3 through 18-7) up until the macro operation is cancelled. Steps 18-3 through 18-6 are similar to steps 17-3 through 17-6 and are therefore not repeated.

At step 18-7, Bob 85 sends to the BEV server 82 a message that indicates ringing. However, before Bob 85 can answer the call, at step 18-8 the BEV end point 81 sends to the BEV server 82 a request to cancel the attended transfer. Accordingly, at step 18-19 the BEV server 82 sends to Bob 85 a request to cancel the call. Also, at step 18-10 the BEV server 82 sends to the BEV end point 81 a confirmation that the request was received. At step 18-11, Bob 85 sends to the BEV server 82 a confirmation that request was received. At step 18-12, the BEV server 82 sends to Bob 85 a 487 message indicating that the original INVITE from step 18-6 is now terminated. At step 18-13, Bob 85 sends to the BEV server 82 an acknowledgement of the 487 message. Finally, at step 18-14 the BEV server 82 sends to the BEV end point 81 a 480 Temporarily Unavailable message rejecting the ATRANS-FER_START transaction. Thereafter, the BEV end point 81 can re-connect to Alice 84 (not shown) by sending a REVERT request with Resume-SDP.

Sometimes, Bob may not want to take the call and so REVERT can be used to revert the call to original state. An example of this will now be described below with reference to FIG. 19, which is a signalling diagram for reverting an attended transfer.

At step 19-1, the BEV end point 81 is talking to Alice 84. At steps 19-2 through 19-8 an attended transfer is started as similarly described in steps 17-2 through 17-8 of FIG. 17. However, instead of the BEV end point 81 sending to the BEV server 82 a request to finish the attended transfer, the BEV end point 81 sends to the BEV server 82 a request to revert back so that the BEV end point 81 continues to Alice 84. The request to revert involves a macro operation meaning that the BEV server 82 goes on to perform multiple SIP transactions (i.e. 19-11 through 19-15) to complete the macro operation.

At steps 19-11, the BEV server 82 sends to Bob 85 a request to end the call. At step 19-12, Bob 85 sends to the BEV server 82 a confirmation that the request was successful. The BEV server 82 goes on to establish a call with Alice 84 at steps 19-13 through 19-15. At step 19-13, the BEV server 82 sends to Alice 84 a request to connect to a call. The call is connected and at step 19-14 Alice sends to the BEV server 82 a confirmation that the request was successful. At step 19-15, the BEV server 82 sends to Alice 84 an acknowledgment of the success. Finally, at step 19-16 the BEV server 82 sends to the BEV end point 81 a confirmation that the request to revert was successful.

Another variation of this call flow could be semi-attended transfer in which as soon as the BEV end point 81 gets the ringing from Bob it transfers the call. This implies that the FINISH request could be sent earlier as well. An example of a semi-attended transfer will now be described below with reference to FIG. 20.

At step 20-1, the BEV end point 81 is talking to Alice 84. At step 20-2, the BEV end point 81 sends to the BEV server 82 a request to start an attended transfer. The request to start the attended transfer involves a macro operation meaning that the BEV server 82 goes on to perform multiple SIP transactions (i.e. 20-3 through 20-7) to complete the macro operation. Steps 20-3 through 20-6 are similar to steps 17-3 through 17-6 and are therefore not repeated.

At step 20-7, Bob 85 sends to the BEV server 82 a 180 message indicating that Bob 85 is ringing. At step 20-8, the BEV server 82 sends to the BEV end point 81 a message indicating ringing. At step 20-9, the BEV end point 81 sends to the BEV server 82 a request to finish the attended transfer. Note that this request is sent early. The request to finish the attended transfer involves a macro operation meaning that the BEV server 82 goes on to perform multiple SIP transactions (i.e. 20-10 through 20-14) to complete the macro operation.

At step 20-10, the BEV server 82 sends to Alice 84 a request to connect to a multi-media session with Bob 85. Alice 84 connects to the multi-media session and at step 20-11 sends to the BEV server 82 a confirmation that the request was successful. At step 20-12, Bob 85 also sends to the BEV server 82 a confirmation that the multi-media session is now connected. At step 20-13, the BEV server 82 sends to Alice 84 an acknowledgement of the success. At step 20-14, the BEV server 82 also sends to Bob 85 an acknowledgement of the success. Finally, at step 20-15 the BEV server 82 sends to the BEV end point 81 a confirmation that the request to finish the attended transfer was successful.

In bound Call Transfer Request

If the request to transfer the call comes from the network then it is handled in a slightly different way relying on the Update-Hold and INVITE primitives using the RCall-Id header. An example of this will now be described below with reference to FIG. 21, which is a signalling diagram in which the BEV end point 81 gets a transfer request.

At step 21-1, the BEV end point 81 is talking to Alice 84. At step 21-2, Alice 84 sends to the BEV server 82 a request to place the call on hold. Accordingly, at step 21-3 the BEV server 84 sends to the BEV end point 81 a request to place the call on hold. At step 21-4, the BEV server 82 sends to Alice 84 a confirmation that the request to place the call on hold was received. At step 21-5, Alice 84 sends to the BEV server 82 an acknowledgment of the confirmation. The call is placed on hold and at step 21-6 the BEV end point 81 sends to the BEV server 82 a confirmation that the request to place the call on hold was successful.

Subsequently, at step 21-7, Alice 84 sends to Bob 85 a request to connect to a call. Bob 85 connects to the call and at step 21-8 sends to Alice 84 a confirmation that the request was successful. At step 21-9, Alice 84 sends to Bob 85 an acknowledgment of the confirmation. At step 21-10, Alice 84 sends to Bob 85 a request to place the call on hold. The call is placed on hold and at step 21-11 Bob 85 sends to Alice 84 a confirmation that the request was successful. At step 21-12, Alice 84 sends to Bob 85 an acknowledgment of the confirmation.

At step 21-13, Alice 84 sends to the BEV server a request to refer to inform the BEV server that Bob 85 will be taking over from Alice 84. At step 21-14 the BEV server 82 sends to Alice 84 a confirmation that the request was successful. At step 21-15, the BEV server 82 sends to Alice 84 a notification that the move to Bob 85 is taking place, and at step 21-16 Alice 84 sends to the BEV server 82 a confirmation that the notification was successful.

Subsequently, at step 21-17 the BEV server 82 sends to Bob 85 a request to supplant with a new Call-Id and a RCall-Id referring the existing held call. The effect of this SUPPLANT with RCall-Id and existing call on hold is to terminate the previously held call and establishment of a new session. Bob 85 supplants and at step 21-18 sends to the BEV server 82 a confirmation that the request was successful (either SUCCESS or 200 OK). Accordingly, at step 21-19 the BEV server 82 sends to the BEV end point 81 a request to activate the call from being on hold. The call is activated and at step 21-20 the BEV end point 81 sends to the BEV server 82 a confirmation that the request was successful. At step 21-21, the BEV server 82 sends to Bob 85 an acknowledgement of the confirmation (either UPDATE or ACK).

Subsequently, at step 21-22 the BEV server 82 sends to Alice 84 a notification that Alice 84 and Bob 85 have established a call. At step 21-23, Alice sends to the BEV server 82 a confirmation that the notification was received. At step 21-24, Alice sends to the BEV server 82 a request to end the call. The call is ended and at step 21-25 the BEV server 82 sends to Alice 84 a confirmation that the request has been successful.

Health-Check Request

The purpose of Health-Check is to detect the availability of BEV end point during active calls. While the BEV end point has active calls, the BEV server will periodically send a Health-Check to ping the end point. The interval for this ping is 30 seconds as described by the diagram. If the end point does not respond to this Health-Check within 30 seconds, then the BEV server would tear down all active dialogs. An example will now be described below with reference to FIG. 22, which is a signalling diagram for a health check request.

At steps 22-1 through 22-8, the BEV end point 81 connects to a multi-media session with Alice 84. Details of these steps are omitted. At step 22-9, the BEV end point 81 and Alice 84 are in conversation. Later at step 22-10, the BEV server 82 sends to the BEV end point 81 a health check. At step 22-11, the BEV end point 81 sends to the BEV server 82 a confirmation that the health check was successful. Later at step 22-12, the BEV server 82 sends to the BEV end point 81 another health check. However, at step 22-13, the BEV server 82 does not receive a confirmation that the health check was successful. Accordingly, the BEV server 82 tears down the multi-media session at steps 22-14 through 22-18. Details of these steps are omitted. At step 22-19, the BEV end point 81 and Alice 84 are not in conversation.

Figure 22:
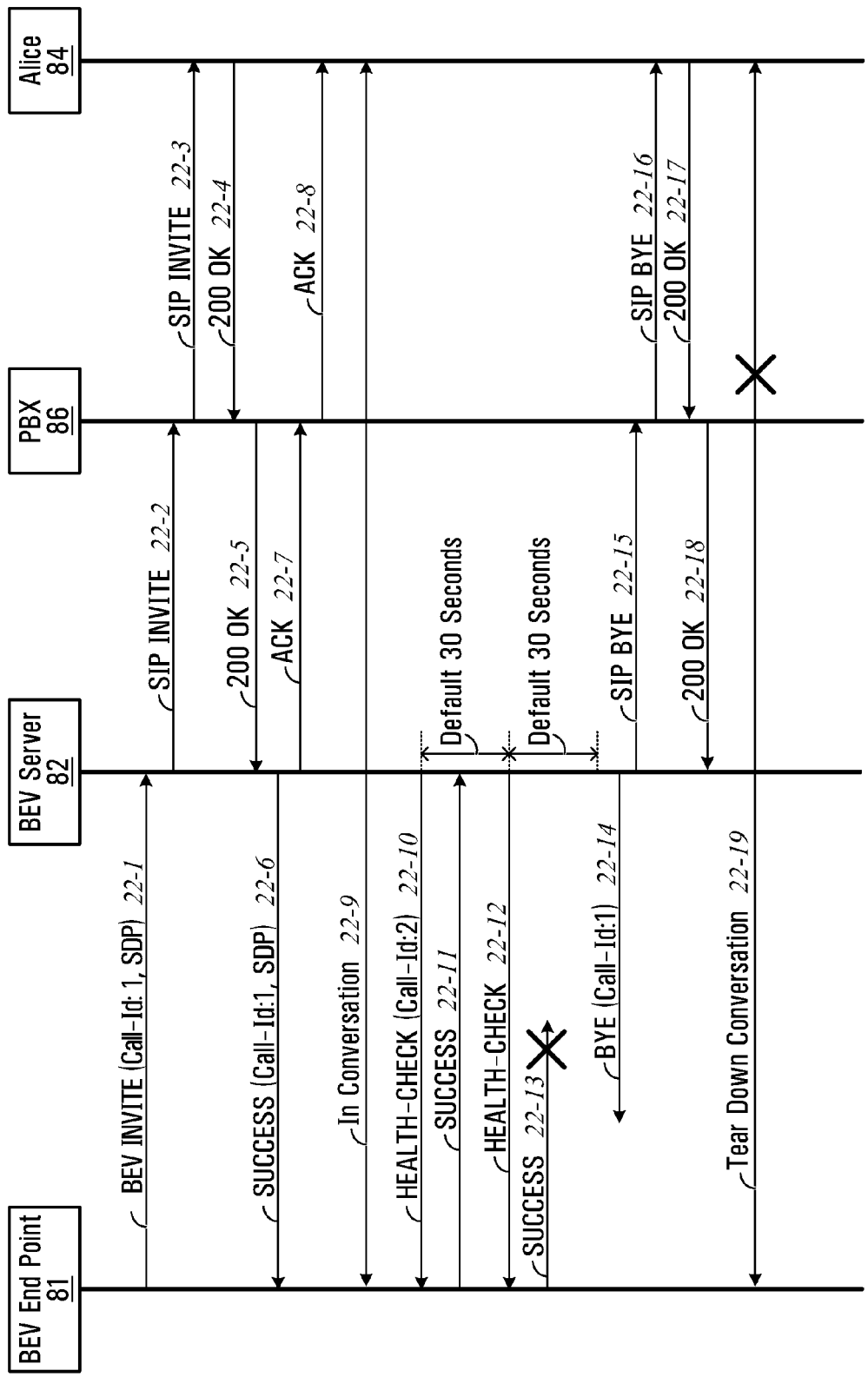

Even though the SUCCESS is shown in FIG. 22, note that other response codes such as 4xx/5xx have the same meaning because the Health-Check is for checking the availability of the BEV end point 81.

Another Communication System

Examples have been described for macro operation initiation and execution involving a plurality of session protocol transactions. A macro operation allows more than one session protocol request to be executed from one request message. Thus, the number of request messages that are sent from the mobile device can be reduced. It can be seen from the examples that, generally speaking, the number of response messages received by the mobile device is also reduced. The concept of reducing the number of response messages received by the mobile device can similarly be applied to operations that more generally involve one or more session protocol transactions. The following examples will demonstrate this. At the outset, it is noted that many of these examples focus on a specific operation, namely establishing a communication session as initiated by the mobile device. However, it is to be understood that embodiments of the disclosure are applicable to other session operations.

Figure 23:
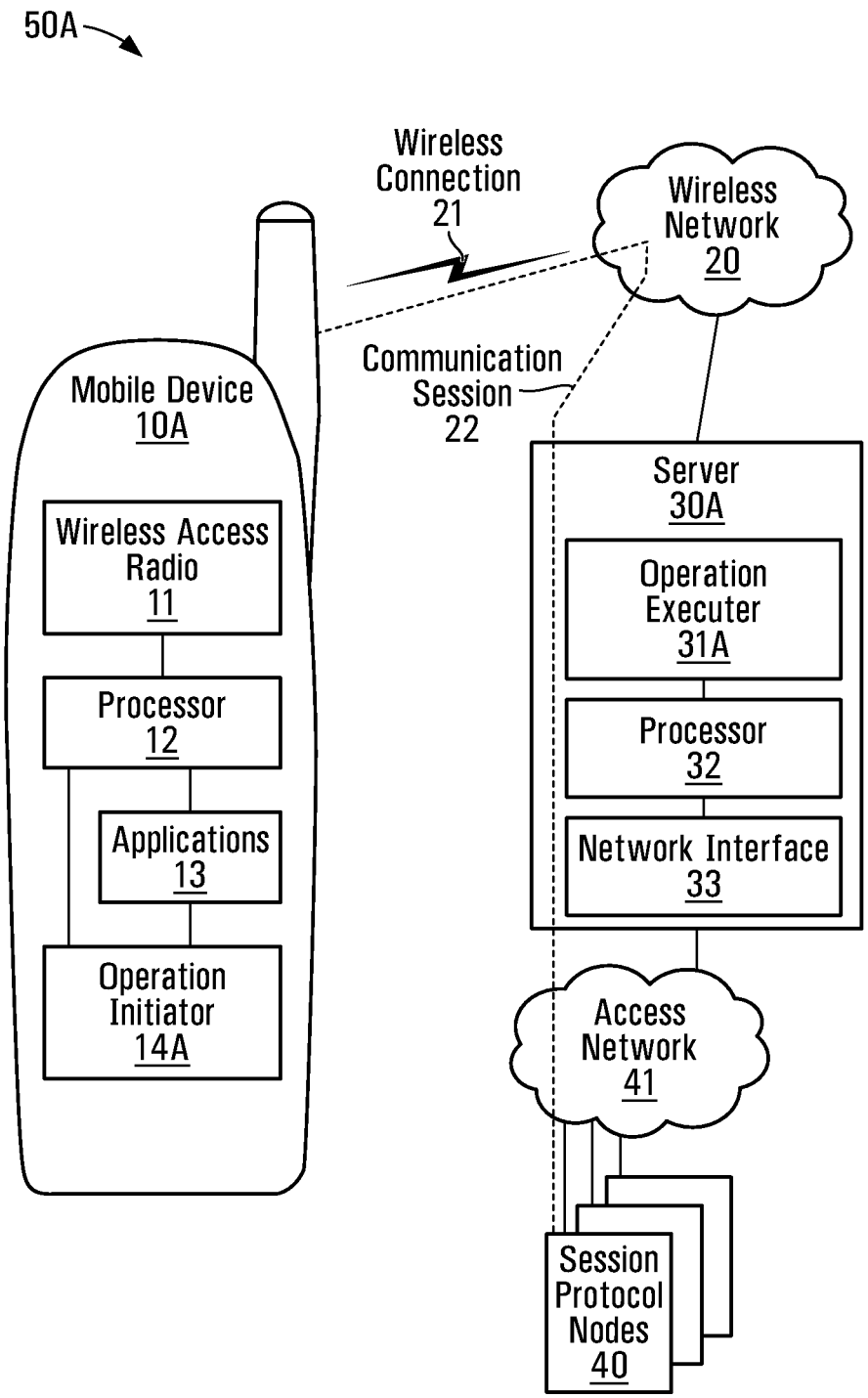
FIG. 23 is a block diagram of another example communication system.

Referring now to FIG. 23, shown is a block diagram of another example communication system 50A. The communication system 50A of FIG. 23 is identical to the communication system 50 of FIG. 1, except that the mobile device 10A is configured with an operation initiator 14A instead of a macro operation initiator 14. Also, the server 30A is configured with an operation executor 31A instead of a macro operation executor 31. Thus, it is noted that much of the description provided above for FIG. 1 may similarly apply, with appropriate modification where appropriate, to FIG. 23.

In the illustrated example, it is assumed that the mobile device 10A initiates an operation for establishing a communication session 22 between the mobile device 10A and one of the session protocol nodes 40. The communication session 22 might for example be a voice and/or video call involving at least one of the applications 13 of the mobile device 10. The application 13 requests application-specific operations from the operation initiator 14A. The operation initiator 14A is responsible for initiating operations on behalf of the application 13. Operations such as establishing the communication session 22 involve a plurality of session protocol messages between the server 30 and at least one of the session protocol nodes 40.

Once the application 13 has requested a session protocol operation, in accordance with an embodiment of the disclosure, the operation initiator 14A generates a binary encoded message having an indication from which the server 30A can determine the session protocol operation to be performed without communicating all session protocol responses for the session protocol operation. The binary encoded message is sent by the mobile device 10A and received by the server 30A. The server 30A communicates with the wireless network 20 and the access network 41 using its at least one network interface 33; however, this does not preclude the mobile device 10A from using two or more network interfaces. To execute the session protocol operation, in accordance with an embodiment of the disclosure, the server 30A determines, based on the indication in the binary encoded message, the session protocol operation to be performed without communicating all responses relating to the session protocol operation back to the mobile device 10A. The server then attempts the session protocol operation. In some implementations, the server 30A first determines the application being used, as the session protocol operation might be application-specific.

The "session protocol operation" involves one or more session protocol transactions. Each session protocol transaction involves a request, zero or more provisional responses, and a final response. An example of a session protocol operation that involves more than one transaction is detailed below.
1. Device sends a binary request
2. Server processes the request
3. Server sends SIP request to a SIP device
4. Server receives a SIP response
5. Server is instructed to wait for a next SIP transaction, so it does not respond to the Device
6. Server receives a SIP request for the same call
7. Server responds to the request
8. Server sends a binary response to the Device In this example, one binary transaction triggers multiple transactions, each having at least one response.

Note that the session protocol operation between the server 30A and at least one of the session protocol nodes 40 can be executed without the mobile device 10A receiving several session protocol response messages, as the server 30A executes the session protocol operation without communicating all of the session protocol response messages. In other words, the session protocol operation involves at least one session protocol transaction having a response that is not communicated back to the mobile device 10A. Thus, there is no reliance on standard session protocol call flows between the mobile device 10A and the server 30A. Consequently, the number of messages received by the mobile device 10A from the server 30A can be reduced. As similarly described with reference to FIG. 1, this can result in conserving communication resources and/or battery power for the communications device.

In the illustrated example, reference is made to a "session protocol". In some implementations, the session protocol is SIP. However, it is to be understood that other session protocols are possible and are within the cope of this disclosure. In other implementations, the session protocol is H323. In other implementations, the session protocol is MGCP. Other session protocols may be possible.

There are many possibilities for the indication from which the server 30A can determine a session protocol operation to be performed without communicating all session protocol responses for the session protocol operation. In some implementations, the indication is a verb and is different for each operation. In other implementations, the indication is a header/parameter. In some implementations, the indication is a combination of verb, header, and/or other message parameters. More generally, the indication can be any suitable indication from which the server can determine a session protocol operation to be performed without communicating all session protocol responses for the session protocol operation.

In the illustrated example, the operation initiator 14A and the operation executer 31A are both implemented as software and are each executed on their respective processors 12, 32. However, more generally, the operation initiator 14A and the operation executer 31A may each be implemented as software, hardware, firmware, or any appropriate combination thereof.

Although embodiments have been described with reference to the mobile device 10A shown in FIG. 23, it is to be understood that such embodiments may be practiced more generally with a communications device. The communications device may be any tethered communications device (i.e. wired) or untethered communications device (i.e. wireless). Note that for a tethered communications device there is no need for a wireless access radio for wireless communication. In some implementations, the communications device is a UE (user element that is directly used by a user. In alternative implementations, the communications device acts on behalf of a UE as a proxy for initiating and/or terminating operations. Further example details of communication devices are provided later under the section "Communications Device".

It is noted that the server 30A shown in FIG. 23 can be any network node involved in session management. The server 30A might have other functions as well. Although embodiments have been described with reference to the server 30A, it is to be understood that such embodiments may be practiced more generally with a network node. The network node might be a single network node or a combination of separate network nodes that may or may not be distributed in a network.

Further details of operation initiation and operation execution are provided below with reference to FIGS. 24 through 27.

Method in a Communications Device

Figure 24:
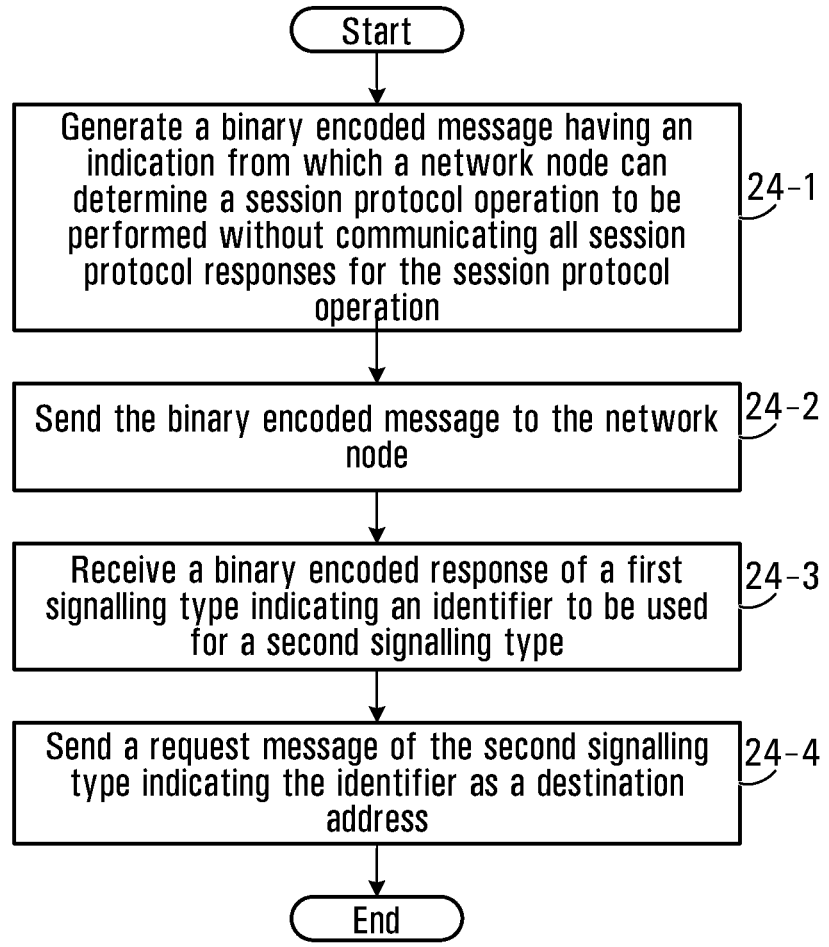
FIG. 24 is a flowchart of a method for initiating an operation.

Referring now to FIG. 24, shown is a flowchart of a method for initiating an operation. This method may be implemented in a communications device, for example by the operation initiator 14A of the mobile device 10A shown in FIG. 23. More generally, this method may be implemented in any appropriately configured communications device.

At step 24-1, the communications device generates a binary encoded message having an indication from which a network node can determine a session protocol operation to be performed without communicating all session protocol responses for the session protocol operation. The session protocol might for example be SIP as discussed above for FIG. 1, or some other session protocol. At step 24-2, the communications device sends the binary encoded message to the network node.

If the binary encoded message is received by the server, then the server can subsequently execute the session protocol operation between the server and at least one session protocol node without communicating all of the response messages back to the communications device. As similarly described with reference to FIG. 1, this can result in conserving communication resources and/or battery power for the communications device.

For the remainder of the example it is assumed that the binary encoded message is of a first signalling type, for example BEV. Other signalling types are possible. At step 24-3, the communications device receives a binary encoded response of the first signalling type indicating an identifier to be used for a second signalling type, for example Circuit Switched 3GPP TS 24.008. Other signalling types are possible. At step 24-4, the communications device sends a request message of the second signalling type indicating the identifier as a destination address. This is sent to another network node. Within the network there is signalling for a media gateway to obtain the identifier and for the media gateway to send a request message to the server containing the identifier.

If the request message is received by the server, then the server verifies that the identifier in the request message matches the identifier provided to the communications device at step 24-2. If there is match, then the server subsequently executes the session protocol transaction between the server and at least one session protocol node without communicating all of the session protocol response messages. Thus, the communications device receives fewer response messages. As similarly described with reference to FIG. 1, this can result in conserving communication resources and/or battery power for the communications device.

In some implementations, the communications device periodically sends the binary encoded message to the network node, in absence of a response, up to a predetermined number of times. In specific implementations, a timer is used for this purpose. The timer is set when the binary encoded message is sent and if no response is received upon expiry of the timer then the binary encoded message is re-sent. In essence validation is performed. In absence of a response after sending the binary encoded message the predetermined number of times, the communication device processes failure to initiate the operation. This might for example include informing a user that the operation failed. Other processing steps are possible.

There are many possibilities for the "identifier". The identifier might for example be a token, a flag, or any other appropriate identifier. The identifier can take any appropriate form, for example an alphanumeric string having zero to many digits. One skilled in the art may recognise that this digit string when it contains a number of digits could comply to ITU recommendation E.164 or any other digit string format. This E.164 number maybe known as an IMRN or PSI DN. In other implementations, the identifier is a user or service name. Other implementations are possible.

Method in a Network Node

Figure 25:
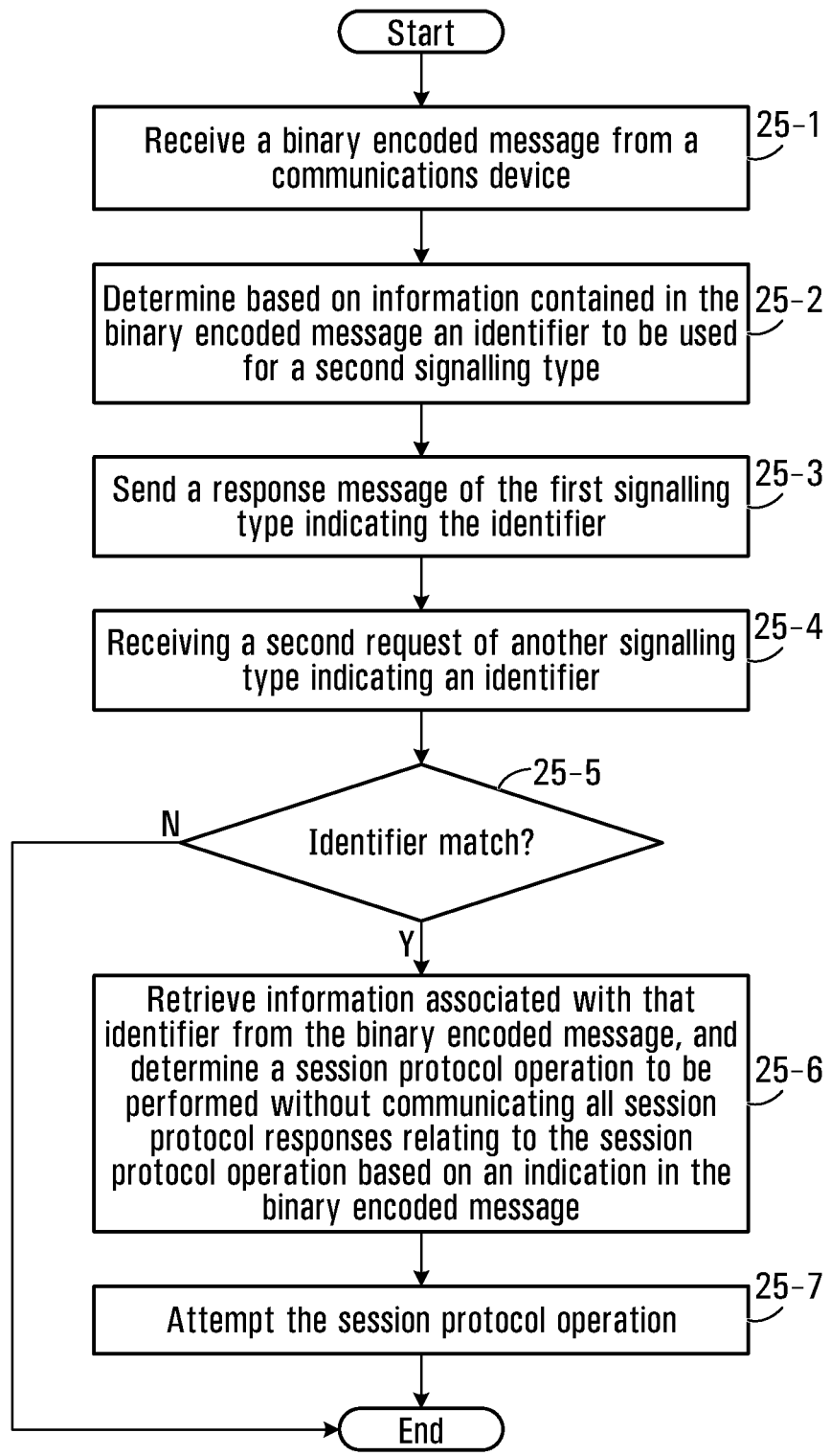
FIG. 25 is a flowchart of a method for executing an operation.

Referring now to FIG. 25, shown is a flowchart of a method for executing an operation. This method may be implemented in network node, for example by the operation executer 31A of the server 30A shown in FIG. 23. More generally, this method may be implemented in any appropriately configured network node of a communications system.

At step 25-1, the network node receives a binary encoded message from a mobile device. For the remainder of the example it is assumed that the binary encoded message is of a first signalling type, for example BEV. Other signalling types are possible, for example, I1 etc. At step 25-2, the network node determines based on information contained in the binary encoded message an identifier to be used for a second signalling type, for example Circuit Switched 3GPP TS 24.008. Other signalling types are possible. At step 25-3, the network node sends a response message of the first signalling type indicating the identifier. Example possibilities for the identifier have been provided above.

Within the network there is signalling for a media gateway to obtain the identifier and for the media gateway to send a second request message to the server containing the identifier. At step 25-4, the network node receives the second request indicating an identifier and having another signalling type, for example SIP. If at step 25-5 the identifier from the second request matches the identifier determined for the second signalling type, then at step 25-6 the network node retrieves information associated with that identifier originating from the binary encoded message at step 25-1. The network node determines a session protocol operation to be performed without communicating all session protocol responses relating to the session protocol operation based on an indication in the binary encoded message at step 25-1. The session protocol might for example be SIP as discussed above for FIG. 1, or some other session protocol. Finally, at step 25-7 the network node attempts the session protocol operation using the information originating from the binary encoded message. The session protocol operation is performed without communicating all responses relating to the session protocol operation back to the communications device. Thus, the communications device receives fewer response messages. As similarly described with reference to FIG. 1, this can result in conserving communication resources and/or battery power for the communications device.

Session Setup as Originating from BEV End Point

Figure 26:
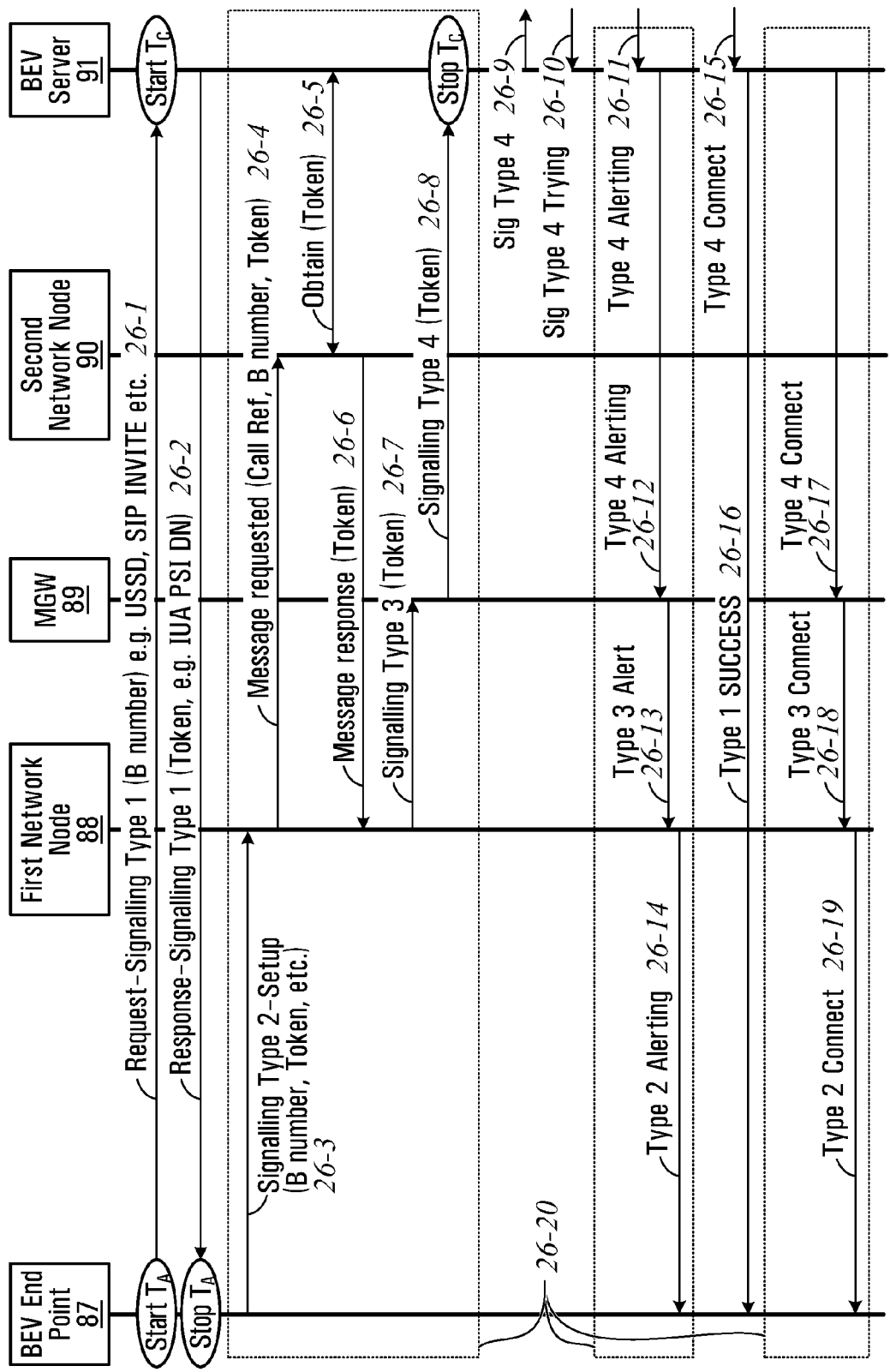
FIGS. 26 and 27 are signalling diagrams depicting a session setup as originating from a BEV end point.

Referring now to FIG. 26, shown is a signalling diagram depicting an ICS session setup as originating from a BEV end point 87. It is to be understood at the outset that this example is very specific for exemplary purposes only. In this example, in addition to the BEV end point 87, there is a first network node 88, an MGW (Media Gateway) 89, a second network node 90, and a BEV server 91. The BEV end point 87 might for example be an ICS UE or any other communications device, while the BEV Server 91 might for example be an SCC AS or any other network node. The session setup as originating from the BEV end point 87 will now be described below.

At step 26-1, when the user initiates a call, the BEV end point 87 generates an outgoing request using a first signaling type, for example BEV. This request contains information related to the session/call origination which could include but is not limited to: A party, B party, correlation identifier, etc. In some implementations, the correlation identifier is generated using any appropriate combination of A Party, B Party, Token e.g E.164 number, Time to live timer for Token (Timer $T_a$), Privacy Requirements etc., and NEXT SEQUENCE ID. NEXT SEQUENCE ID is a number that is kept by the server 91 that is then subsequently used to identify if the next message sent or received on the correlation ID is correct. The correlation identifier is kept for life of a session, and every message received or sent is in sequence. In some implementations, the BEV end point 87 start a timer $T_A$ when the request is sent to determine whether there is a timeout in waiting for a response from the BEV server 91.

The BEV Sever 91 receives the BEV request with the information. In some implementations, the BEV server 91 generates a token, for example, a IUA PSI DN/IMRN (i.e. an E.164 number), to be used for a second signalling type, for example Circuit Switched 3GPP TS 24.008. The E.164 number is stored in the BEV server 91 and associated with the information received in the BEV request from the BEV End point 87. At step 26-2, the BEV server 91 sends a BEV response containing the token and the correlation identifier that was received at step 26-1. In some implementations, the BEV server 91 starts a timer $T_C$ when the BEV response is sent to determine whether there is a timeout in waiting for a response from the MGW 89. In essence a validation is performed.

Upon receipt of the BEV response and determining that the BEV response is a response to the BEV request sent (using correlation identifier), the BEV end point 87 stops the timer $T_A$. However, if the timer $T_A$ expires, then the BEV endpoint 87 may re-send the outgoing request (i.e. step 26-1) up until a maximum of Y times, which might for example be five times, after which if all attempts fail an indication (visual, audioable, etc.) is given to the user indicating that the session set-up attempt has failed.

At step 26-3, the BEV Endpoint 87 generates a request of a second signaling type containing the token received at step 26-2. This message is sent to the first network node 88. At step 26-4, upon receipt of the second signaling type request, the first network node 88 sends to second network node 90 a "message request" containing the identity of the subscriber, the token, and any other information. At step 26-5, the token received is analyzed by comparing to the one stored by the BEV server 91. If there is a match, then at step 26-6 the second network node 90 provides the token back to the first network node 88 in a "message response".

Note that in the illustrated example, it is assumed that the request at step 26-3 contains the token received at step 26-2. Alternatively, the request could contain another token stored in the BEV Endpoint 87. For such cases, steps 26-4 through 26-6 could be skipped.

At step 26-7, the first network node 88 sends to the interworking function MGW 89 a request of a third signaling type, for example TUP or ISUP. The third signaling Type request contains the token as the identified B address/Party that the message should be routed to. At step 26-8, the MGW 89 sends to the BEV server 91 a request of a fourth signaling type, for example SIP, including the identified token (B address/Party) identified as the BEV server 91. Upon receipt of the request, the BEV server 91 analyzes the token. If the token is determined to be a valid token for that server and Timer $T_c$ has not expired, then the BEV server 91 retrieves the information associated with that token from step 26-2 and timer $T_c$ is stopped. However, if the token is valid but the timer has expired, then the information associated with the token is considered invalid. An error code is supplied back to the signaling type 4 request. Also, if the token is not a valid token for the BEV server 91, then an error code is supplied back to the signaling type 4 request.

At step 26-9, the BEV server 91 combines information stored against the token at step 26-2 which information received in the fourth signaling type request and generates a new fourth signaling type request that contains the B party address being that stored against token in 26-2, the A party address being that stored against the token in 26-2, and privacy identifier being stored against the token in 26-2. The BEV server then sends message 26-9 of fourth signaling type to the identified B Party. At step 26-10, the BEV server 91 receives fourth signaling type trying message.

At step 26-11, the BEV server 91 receives a fourth signaling type alerting message. Accordingly, at step 26-12 the BEV server 91 sends to the MGW 89 a fourth signaling type alerting message. At step 26-13, the MGW 89 sends to the first network node 88 a third signaling type alerting message. Finally, at step 26-14 the first network node 88 sends to the BEV end point 87 a second signaling type alerting message.

At step 26-15, the BEV server 91 receives a fourth signaling type connect message. In some implementations, as shown at step 26-16, the BEV server 91 sends to the BEV end point 87 a first signaling type success message. Alternatively, the BEV server 91 might not send the first signaling type success message. Next, at step 26-17 the BEV server 91 sends to the MGW 89 a fourth signaling type connect message. At step 26-18, the MGW 89 sends to the first network node 88 a third signaling type connect message. Finally, at step 26-19 the first network node 88 sends to the BEV end point 87 a second signaling type connect message.

In the illustrated example, there are two state machines running on the BEV end point 87. The first state machine is associated with the first signaling type. First signaling type is sent at step 26-1, which effectively creates the fourth signaling type at step 26-9, which in turn causes 26-10 and 26-11. Note that SIP signaling at step 26-11 is not communicated back to the BEV end point 87 using the first signaling type. In typical SIP call-flow, there would be a first signaling type for the alerting in addition to the second signaling type. Thus, the BEV server performs a SIP transaction at steps 26-9, 26-10, and 26-11 while communicating back only the alerting signal and the connect/success signal. Of these signals, only the connect/success signal is of the first signaling type when received by the BEV end point. Therefore, the BEV server 91 executes the SIP transaction on behalf of the BEV end point 87 in a manner that reduces the number of messages to the first state machine.

The second state machine is associated with the second signaling type as outlined at 26-20. Note that there is no reduction in the number of messages to the second state machine, as BEV is not used to initiate the operation. Rather, the second signaling type is used to initiate the operation.

Figure 27:
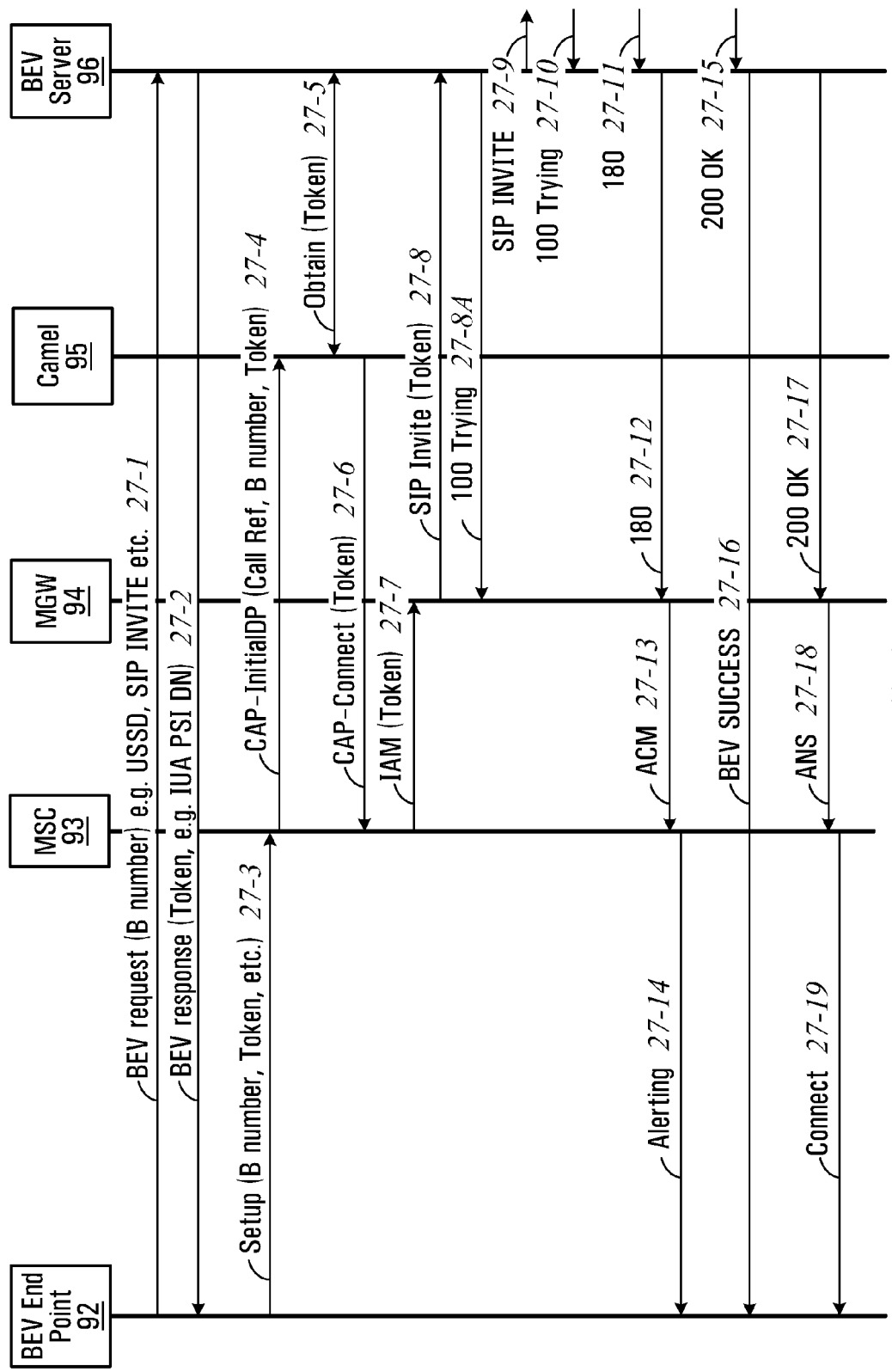

Referring now to FIG. 27, shown is a signaling diagram depicting another ICS session setup as originating from an ICS UE. This diagram represents an embodiment using actual real messages. It is to be understood at the outset that this example is very specific for exemplary purposes only. One skilled in the art will appreciate that these information flows could be equally applicable to other types of BEV End points and servers and other implementations.

When the ICS UE (e.g. BEV End Point) wants to originate a call it constructs an I1 INVITE 27-1 (e.g. BEV INVITE), which contains the following:

1) Request-URI set to the URI of the destination per 3GPP TS 24.229.
2) Call-ID Generated per RFC 3261 to uniquely refer to the dialog.
3) Sequence-ID generate per RFC 3261 e.g. to zero.
4) P-Preferred-Identity header optionally inserted in accordance with RFC 3325 in any initial request for a dialog or request for a standalone transaction as a hint for creation of an asserted identity (contained in the P-Asserted-Identity header) within the IM CN subsystem. The value of the P-Preferred-Identity is in accordance with 3GPP TS 24.229 section 5.1.2A.1.1.
5) Accept contact header set per RFC 3841.
6) From field set to the URI of the caller, this can be a SIP URI, Tel URL or any other URI scheme including a plain string, this is used primarily for identification and display purposes.
7) To field set to the URI to which the request is addressed, this can be a SIP URI, Tel URL or any other URI scheme.
8) Privacy Bit in the "Other I1 elements" set to:
    i) 1 if privacy is required, or
    ii) 0 if privacy is not required.
9) access network type set to:
    i) 00 for GERAN,
    ii) 01 for UTRAN, or
    iii) 10 for CDMA2000.

Note that the 8) privacy bit and the 9) access network type indicated above are very specific to particular embodiments and that other embodiments are possible as would be apparent to those skilled in the art.

The ICS UE (BEV End Point) then selects the transport layer protocol depending on the access network type. For Access Network types of 00 or 01 USSD is to be used however one skilled in the art will appreciate that SMS could also be used. The UE (BEV End Point) sends the I1 INVITE to the Mobile Originated USSD controller in the ICS UE and start I1 timer TA. In the case of using SMS the I1 INVITE would be send to the Mobile Originated SMS controller in the ICS UE. If the SCC AS receives an I1 INVITE 27-1, then it will:

a) Check to see if there are any ongoing dialogues from the ICS UE sending the I1 INVITE. If there is an ongoing dialogue the SCC AS ignores the I1 INVITE.
b) If there are no ongoing dialogues from the requesting ICS UE, the SCC AS will:
    i) Generate an IUA PSI DN and store it against the CallID
    ii) store the CallID;
    ii) store the SequenceID against the CallID;
    iii) if the P-Preferred-Identity field is received, check to see if the value received corresponds to one stored against the ICS US subscribers private identity such as but not limited to IMSI, MIN etc. If the P-Preferred-Identity is valid store it against the CallID. If the P-Preferred-Identity is not valid store the default Public User Identity against the CallID.
    iv) store the FROM, To, Accept Contact and other I1 element details against the CallID;
    v) send an I1 PROGRESS 27-2 to the ICS UE. The I1 PROGRESS shall be set as follows:
    a) CallID as that received in 27-1;
    b) the next SequenceID value that is valid against the CallID. This will be probably an increment of one over the stored SequenceID. This new value shall be stored against the called
    c) an IUA PSI DN if one has been generated;

If the ICS UE receives an I1 PROGRESS message 27-2 it will a) Check the Call-ID to see if a valid dialogue exists for this value. If value received does not match any value stored then the UE shall either disregard the I1 PROGRESS message or send an error response back indicating that the received CALL-ID is unknown.
b) Check the Sequence-ID to see if it's the next valid sequence number for the dialogue. If the value received is not a valid increment over the previous one then the UE shall disregard the I1 PROGRESS message.or send back an error response If the value received is valid the UE stores the SequenceID. If an IUA PSI DN was received it shall be stored in the ICS UE.

The ICS UE shall then construct a GSM CS TS 24.008 Set-up message 27-3. If an IUA PSI DN was received, the stored value shall be used as the B party address else the ICS UE shall use a pre-provisioned stored value as the B Party address.

The rest of the signalling in steps 27-4 to 27-19 is similar to the signalling in steps 26-4 to 26-19 if FIG. 26. Details of the signalling in steps 27-4 to 27-19 are not repeated here.

Specific example detailed behaviour for ICS UE will now be described for an ICS UE CS voice session termination. One skilled in the art will appreciate that these are very similar to those previously described. If the ICS UE receives an I1 INVITE and there are no pending I1 transactions, the ICS UE will:
a) Check to see if there are any ongoing dialogues. If there is an ongoing dialogue the ICS UE shall ignore the I1 INVITE.
b) Store the CallID.
b) Store the SequenceID.
c) If the P-Asserted-Identity field is received, display the P-Asserted-Identity field contents information.
d) Store the received IUA PSI DN
The ICS UE shall then use the IUA PSI DN to as the B party address in a 3GPP TS 24.008 Set-up message.
Specific example detailed behaviour for the SCC AS will now be described for an ICS UE CS voice session origination.

Specific example detailed behaviour will now be described for network release. If the ICS UE receives an I1 BYE it will:
a) Check the CallID to see if a valid dialogue exists for this value. If no valid CallID exists, the I1 BYE shall be ignored. If the CallID is valid then:
b) Check the SequenceID to see if it is the next valid sequence number for the dialogu. If the value received is not a valid increment over the previous one then the UE shall ignore the message. If the SequenceID is correct then the ICS UE imitates a CS Release.
c) After sending the CS Release, ICS UE sends an I1 BYE. The information elements is encoded as:
  i) callID set to the same as the one received in the I1 BYE received from the network.

Signaling Flows for Call Origination

Figure 28:
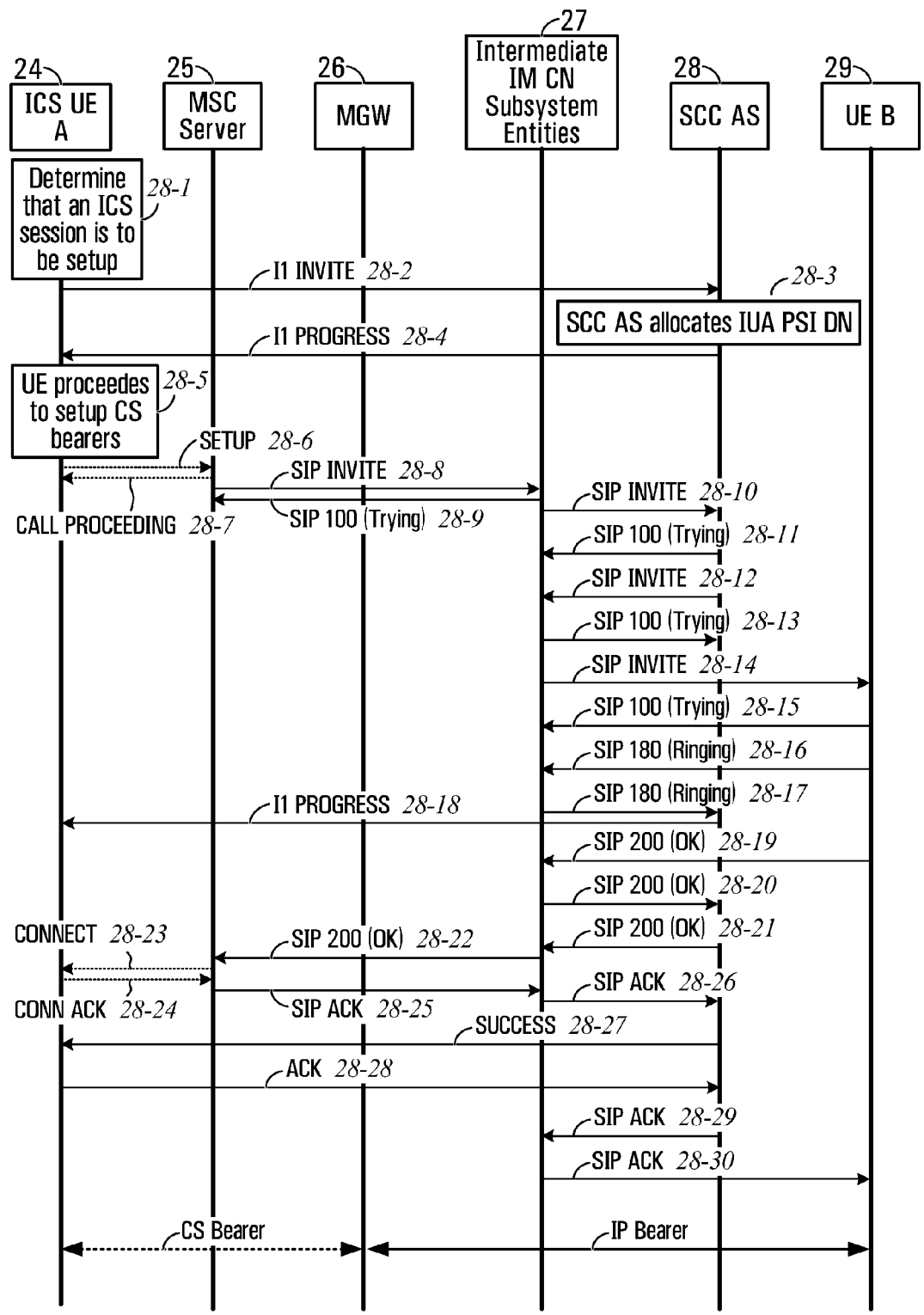
FIGS. 28 and 29 are signalling diagrams depicting session setups involving a CS UE.

Referring now to FIG. 28, shown is a signaling diagram depicting another ICS session setup as originating from an ICS UE A 24. The signaling flow shows origination of a call to the ICS UE A 24 when using I1 interface and represents an embodiment using actual real messages. It is to be understood at the outset that this example is very specific for exemplary purposes only. In this example, in addition to the ICS UE A 24, there is an MSC (Mobile Switching Center) server 25, an MGW 26, intermediate IM CN subsystem entities 27, an SCC AS 28, and a UE B 29. The ICS session setup as originating from the ICS UE A 24 will now be described below.

At step 28-1, there is a determination of call establishment. As a result of some stimulus to establish a session with voice media, based on a combination of user policy and access technology availability, the ICS UE A 24 decides to establish the service control signalling using the IM CN subsystem. The ICS UE A 24 initiates service control signalling in the IM CN subsystem towards the SCC AS 28 by sending a I1 INVITE request to the intermediate IM CN subsystem at step 28-2. Example details of the I1 INVITE request are provided below:

---

I1 INVITE request (ICS UE to SCC AS via I1 Protocol):

I1 INVITE tel:+1-212-555-2222 SIP/2.0
P-Preferred-Identity: <tel: +1-212-555-1111>
P-Access-Network-Info: 3GPP-UTRAN-FDD; utran-cell-id-
    3gpp=234151D0FCE11
Privacy: none
Accept-Contact:
From: <tel: +1-212-555-1111>;tag=171828
To: <tel:+1-212-555-2222>
Call-ID: cb03a0s09a2sdfglkj490333
Cseq: 127 INVITE
Contact:

---

Request-URI: the SIP URI or tel URI of the called party. In this example the tel URI of the called party is included in the tel URI.

At step 28-3 the SCC AS 28 allocates an IUA PSI DN to the ICS UE A 24. The SCC AS 28 stores the information received in the initial INVITE request and associates an IUA PSI DN with this request. The IUA PSI DN is returned at step 28-4 in an I1 PROGRESS to the ICS UE A 24 together with an indication that CS bearer establishment is to be initiated by the ICS UE A 24. For this example the IUA PSI DN is chosen as +1212556666. Example details of the I1 PROGRESS are provided below:

---

I1 (Progress) response (SCC AS to ICS UE via I1 protocol):

I1 Progress
Privacy: none
From: <tel: +1-212-555-1111>;tag=171828
To: <tel:+1-212-555-2222>
Call-ID:
CSeq:
Contact:
Content-Type: application/sdp
Content-Length: (...)
v=0
o=
s=-
c=
t=
m=
a=
a=
a=
a=

---

At step 28-5, the ICS UE A 24 proceeds to setup CS bearers. Upon receipt of the IUA PSI DN, the ICS UE A 24 proceeds with setting up the call using CS bearers.

At step 28-6, the ICS UE A 24 sends to the MSC server 25 a SETUP message (ICS UE to enhanced MSC Server). The MSC server 25 is enhanced as per 3GPP TS 23.292. The ICS UE A 24 initiates the call over CS bearers by sending the SETUP message to the enhanced MSC Server. Specifically for this signaling flow, the SETUP message includes:
  Called Party Number information element=[(Numbering plan identifier=ISDN/telephony numbering plan), (type of number=international number), (Number digits=1212556666)]. The Called Party Number information element is set to the IUA PSI DN.
  Bearer Capability information element=[(information transfer capability=speech), (speech versions=FR AMR, GSM EFR, GSM FR)]
  Supported Codec List information element={[(SysID 1=UMTS), (Codec Bitmap for SysID 1=UMTS AMR 2)], [(SysID 2=GSM), (Codec Bitmap for SysID 2=FR AMR, GSM EFR, GSM FR)]}
The enhanced MSC Server 25 knows the calling party number corresponding to the UE.

At step 28-7, the MSC server 25 sends to the ICS UE A 24 a CALL PROCEEDING message (enhanced MSC Server to ICS UE). Upon receipt of the SETUP message from the ICS UE A 24, the enhanced MSC server 25 responds with the CALL PROCEEDING message. There is no ICS specific content in this message.

At step 28-8, the MSC server 25 sends to the intermediate IM CN subsystem entities 27 a SIP INVITE request (enhanced MSC Server to intermediate IM CN subsystem entities). The enhanced MSC Server 25 maps the received SETUP message to a SIP INVITE request which is addressed to the IUA PSI DN. Example details of the SIP INVITE request are provided below:

---

SIP INVITE request (enhanced MSC Server to intermediate IM CN subsystem entities):

---

INVITE tel:+1-212-555-6666 SIP/2.0
Via: SIP/2.0/UDP msc1.hom1.net;branch=z9hG4bKnashds7
Max-Forwards: 70
Route: <sip:icscf1.home1.net:lr>
P-Asserted-Identity: <tel: +1-212-555-1111>
P-Charging-Vector: icid-
    value="AyretyU0dm+6O2IrT5tAFrbHLso=023551024";
    orig-ioi=home1.net
P-Access-Network-Info:
Privacy: none
From: <tel: +1-212-555-1111>;tag=171828
To: <tel:+1-212-555-6666>
Call-ID: f81d4fae-7dec-11d0-a765-00a0c91e6bf6
Cseq: 127 INVITE
Supported: 100rel, precondition
Require: sec-agree
Proxy-Require: sec-agree
Security-Verify: ipsec-3gpp; q=0.1; alg=hmac-sha-1-96;
    spi=87654321; port=7531
Contact:
Allow: INVITE, ACK, CANCEL, BYE, PRACK, UPDATE, REFER,
    MESSAGE
Content-Type: application/sdp
Content-Length: (...)
v=0
o=- 2987933615 2987933615 IN IP6 5555::aaa:bbb:ccc:eee
s=
c=IN IP6 5555::aaa:bbb:ccc:eee
t=0 0
m=audio 3456 RTP/AVP 97 96
b=AS:25.4
a=curr:qos local sendrecv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
Request-URI: UAI PSI DN as received in the SETUP message.
P-Asserted-Identity: The enhanced MSC inserts the tel-URI containing the subscriber number, as received from the ICS UE.
SDP: The SDP contains preconfigured set of codecs supported by the MGW.

---

At step 28-9, the intermediate IM CN subsystem entities 27 sends to the MSC server 25 a SIP 100 (Trying) response (intermediate IM CN subsystem entities to enahanced MSC Server). The intermediate IM CN subsystem entities 27 respond to the enhanced MSC Server with the SIP 100 (Trying) response. There is no ICS specific content in this response.

At step 28-10, intermediate IM CN subsystem entities 27 send to the SCC AS 28 a SIP INVITE request (intermediate IM CN subsystem entities to SCC AS). The SIP INVITE is routed towards the SCC AS 28. Example details of the SIP INVITE are provided below:

---

SIP INVITE request (intermediate IM CN subsystem entities to SCC AS):

---

INVITE tel:+1-212-555-6666 SIP/2.0
Via: SIP/2.0/UDP scscf1.home1.net;branch=z9hG4bK332b23.1,
    SIP/2.0/UDP
    icscf1.home1.net;branch=z9hG4bKdwe534,
    SIP/2.0/UDP msc1.hom1.net;branch=z9hG4bKnashds7
Max-Forwards: 68
Route: <sip:sccas1.home1.net:lr>,

---

SIP INVITE request (intermediate IM CN subsystem entities to SCC AS):

---

<sip:scscf1.home1.net;lr>;orig-dialog-
    id="yuflsae80r3rb3fh31ondyr829cnyr381cn932YDWref
    0w0-wwtg374"
Record-Route: <sip:scscf1.home1.net:lr>
P-Asserted-Identity: <tel: +1-212-555-1111>
P-Charging-Function-Addresses:
    ccf=[5555::b99:c88:d77:e66];
    ccf=[5555::a55:b44:c33:d22];
    ecf=[5555::1ff:2ee:3dd:4ee];
    ecf=[5555::6aa:7bb:8cc:9dd]
P-Charging-Vector: icid-
    value="AyretyU0dm+6O2IrT5tAFrbHLso=023551024";
    orig-ioi="type 3home1.net"; orig-ioi="home1.net"
P-Access-Network-Info:
Privacy: none
From: <tel: +1-212-555-1111>;tag=171828
To: <tel:+1-212-555-6666>
Call-ID: f81d4fae-7dec-11d0-a765-00a0c91e6bf6
Cseq: 127 INVITE
Supported:
Require:
Proxy-Require:
Security-Verify:
Contact: Allow:
Content-Type:
Content-Length:
v=0
o=
s=
c=
t=
m=
b=
a=
a=
a=
a=
a=
a=
a=
a=

---

At step 28-11, the SCC AS 28 sends to the intermediate IM CN subsystem entities 27 a SIP 100 (Trying) response (SCC AS to intermediate IM CN subsystem entities). The SCC AS 28 responds to the intermediate IM CN subsystem entities 27 with a SIP 100 (Trying) response. There is no ICS specific content in this response.

At step 28-12, the SCC AS 28 sends to the intermediate IM CN subsystem entities 27 a SIP INVITE request (SCC AS to intermediate IM CN subsystem entities). The SCC AS 28 acting as a routing B2BUA, generates the SIP INVITE request based upon the received SIP INVITE request and the information previously stored against this session and routes it towards UE B 29 via the intermediate IM CN subsystem entities. Example details of the SIP INVITE request are provided below:

---

SIP INVITE request (SCC AS to intermediate IM CN subsystem entities):

---

INVITE tel:+1-212-555-2222 SIP/2.0
Via: SIP/2.0/UDP sccas1.home1.net;branch=z9hG4bKnas34r5
Max-Forwards: 67
Route: <sip:scscf1.home1.net:lr>
P-Asserted-Identity: <tel: +1-212-555-1111>

SIP INVITE request (SCC AS to intermediate IM CN subsystem entities):

P-Charging-Function-Addresses:
    ccf=[5555::b99:c88:d77:e66];
    ccf=[5555::a55:b44:c33:d22];
    ecf=[5555::1ff:2ee:3dd:4ee];
    ecf=[5555::6aa:7bb:8cc:9dd]
P-Charging-Vector: icid-
    value="AyretyU0dm+6O2IrT5tAFrbHLso=023551024";
    orig-ioi="type3home1.net"
P-Access-Network-Info: 3GPP-UTRAN-FDD; utran-cell-
    id=3gpp=234151D0FCE11
Privacy: none
From: <tel: +1-212-555-1111>;tag=171828
To: <tel:+1-212-555-2222>
Call-ID: f81d4fae-7dec-11d0-a765-00a0c91e6bf6
Cseq: 127 INVITE
Supported: 100rel, precondition
Require: sec-agree
Proxy-Require: sec-agree
Security-Verify: ipsec-3gpp; q=0.1; alg=hmac-sha-1-96;
    spi=87654321; port=7531
Contact:
Allow: INVITE, ACK, CANCEL, BYE, PRACK, UPDATE,
    REFER, MESSAGE
Content-Type: application/sdp
Content-Length: (...)
v=0
o=- 2987933615 2987933615 IN IP6 5555::aaa:bbb:ccc:eee
s=
c=IN IP6 5555::aaa:bbb:ccc:eee
t=0 0
m=audio 3456 RTP/AVP 97 96
b=AS:25.4
a=curr:qos local sendrecv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
Request-URI: The SCC AS replaces the IUA PSI DN with the tel URI of the called party which was stored from the initial SIP INVITE request sent in step 28-2.

At step 28-13, the intermediate IM CN subsystem entities 27 send to the SCC AS 28 a SIP 100 (Trying) response (intermediate IM CN subsystem entities to SCC AS). The intermediate IM CN subsystem entities 27 respond to the SCC AS 28 with a SIP 100 (Trying) response. There is no ICS specific content in this response.

At step 28-14, the intermediate IM CN subsystem entities 27 send to the UE B 29 a SIP INVITE request (intermediate IM CN subsystem entities to UE B). The intermediate IM CN subsystem entities 27 route the SIP INVITE request to the UE B 29.

At step 28-15, the UE B 29 sends to the intermediate IM CN subsystem entities 27 a SIP 100 (Trying) response (UE B to intermediate IM CN subsystem entities). The UE B 29 responds to the intermediate IM CN subsystem entities with the SIP 100 (Trying) response. There is no ICS specific content in this response.

At step 28-16 the UE B 29 sends to the intermediate IM CN subsystem entities 27 a SIP 180 (Ringing) response (UE B to SCC AS via intermediate IM CN subsystem entities). UE B 29 responds to the received SIP INVITE request with the SIP 180 (Ringing) response. The response contains no SDP body and contains no ICS specific content. At step 28-17 the intermediate IM CN subsystem entities 27 send to the SCC AS 28 a SIP 180 (Ringing) response.

At step 28-18, the SCC AS 28 sends to the ICS UE A 24 an I1 Progress (SCC AS to ICS UE A via using I1 protocol).

Upon receiving the SIP 180 (Ringing) response from the terminating UE, the SCC AS 28 sends an I1 Progress response to the ICS UE A 24 using I1 protocol. The response is associated with the SIP INVITE in step 28-2 and contains no ICS specific content. Furthermore, the I1 Progress contains no SDP body.

At step 28-19, the UE B 29 sends to the intermediate IM CN subsystem entities 27 a SIP 200 (OK) response (UE B to intermediate IM CN subsystem entities). The terminating side sends an SDP answer in the SIP 200 (OK) response to the received SIP INVITE request. Example details of the SIP 200 (OK) response are provided below:

SIP 200 (OK) response (UE B to intermediate IM CN subsystem entities):

SIP/2.0 200 OK
Via: SIP/2.0/UDP
    pcscf2.visited2.net:5088;comp=sigcomp;branch=z9h
    G4bK361k21.1,
    scscf2.home1.net;branch=z9hG4bK764z87.1,
    icscf1.home1.net;branch=z9hG4bK871y12.1,
    SIP/2.0/UDP
    scscf1.home1.net;branch=z9hG4bK332b23.1,
    SIP/2.0/UDP sccas1.home1.net;branch=
    z9hG4bKnas34r5
Record-Route:
    <sip:pcscf2.visited2.net:5088;lr;comp=sigcomp>,
    <sip:scscf2.visited2.net;lr>,
    <sip:scscf1.home1.net;lr>
P-Access-Network-Info: 3GPP-UTRAN-FDD; utran-cell-id-
    3gpp=234151D0FCE11
Privacy: none
From: <tel: +1-212-555-1111>;tag=171828
To: <tel:+1-212-555-2222>
Call-ID:
CSeq:
Require: 100rel, precondition
Contact:
Allow: INVITE, ACK, CANCEL, BYE, PRACK, UPDATE, REFER,
    MESSAGE
Content-Type: application/sdp
Content-Length: (...)
v=0
o=- 2987933623 2987933623 IN IP6 5555::ggg:fff:aaa:bbb
s=-
c=IN IP6 5555::ggg:fff:aaa:bbb
t=0 0
m=audio 3456 RTP/AVP 97 96
b=AS:25.4
a=curr:qos local sendrcv
a=curr:qos remote sendrcv
a=des:qos mandatory local sendrecv
a=des:qos mandatory remote sendrecv
a=rtpmap:97 AMR
a=fmtp:97 mode-set=0,2,5,7; mode-change-period=2
a=maxptime:20

At step 28-20, the intermediate IM CN subsystem entities 27 send to the SCC AS 28 a SIP 200 (OK) response (intermediate IM CN subsystem entities to SCC AS). The SIP 200 (OK) response from UE is routed towards the SCC AS 28.

At step 28-21, the SCC AS 28 sends to the intermediate IM CN subsystem entities 27 a SIP 200 (OK) response (SCC AS to enhanced MSC Server via intermediate IM CN subsystem entities). The SDP answer received in the SIP 200 (OK) response is routed to the enhanced MSC Server 25 at step 28-22 via the intermediate IM CN subsystem entities.

At step 28-23, the MSC server 25 sends to the ICS UE 24 a CONNECT message (enhanced MSC Server to ICS UE). The enhance MSC Server maps the received SIP 200 (OK) to a CONNECT message. There is no ICS specific content in this message.

At step 28-24, the ICS UE A 24 sends to the MSC server 25 a CONNECT ACKNOWLEDGMENT (ICS UE A to enhanced MSC Server). The ICS UE A 24 sends the CONNECT ACKNOWLEDGMENT message upon receiving the CONNECT message.

At step 28-25, the MSC server 25 sends to the intermediate IM CN subsystem entities 27 a SIP ACK request (enhanced MSC Server to SCC AS via intermediate IM CN subsystem entities). Upon receiving the CONNECT ACKNOWLEDGEMENT from the ICS UE A 24, the enhanced MSC Server 25 forwards the SIP ACK request to the SCC AS 28 at step 28-26 via the intermediate IM CN Subsystem entities 27. There is no ICS specific content in this request.

At step 28-27, the SCC AS 28 sends to the ICS UE A 24 an I1 Success (SCC AS to ICS UE A via I1 protocol). The SCC AS 28 responds with the I1 Success response to the initial I1 INVITE sent by the ICS UE A 24 in the step 28-2. Since the SDP answer was previously sent in the 1$^{st}$ I1 Progress, the I1 Success response contains no SDP body. There is no ICS specific content in this response.

At step 28-28, the ICS UE A 24 sends to the SCC AS 28 an I1 ACK request (ICS UE A to SCC AS via I1 Protocol). The ICS UE A 24 sends the I1 ACK request to the SCC AS 28 via the I1 Protocol. There is no ICS specific content in this response.

At steps 28-29 and 28-30, the SCC AS 28 sends to the UE B 29 a SIP ACK request (SCC AS to UE B via intermediate IM CN subsystem entities). The SCC AS 28 sends the SIP ACK request to UE B 29 via the IM CN subsystem entities 27. There is no ICS specific content in this response.

Signaling Flows for Call Termination

Figure 29:
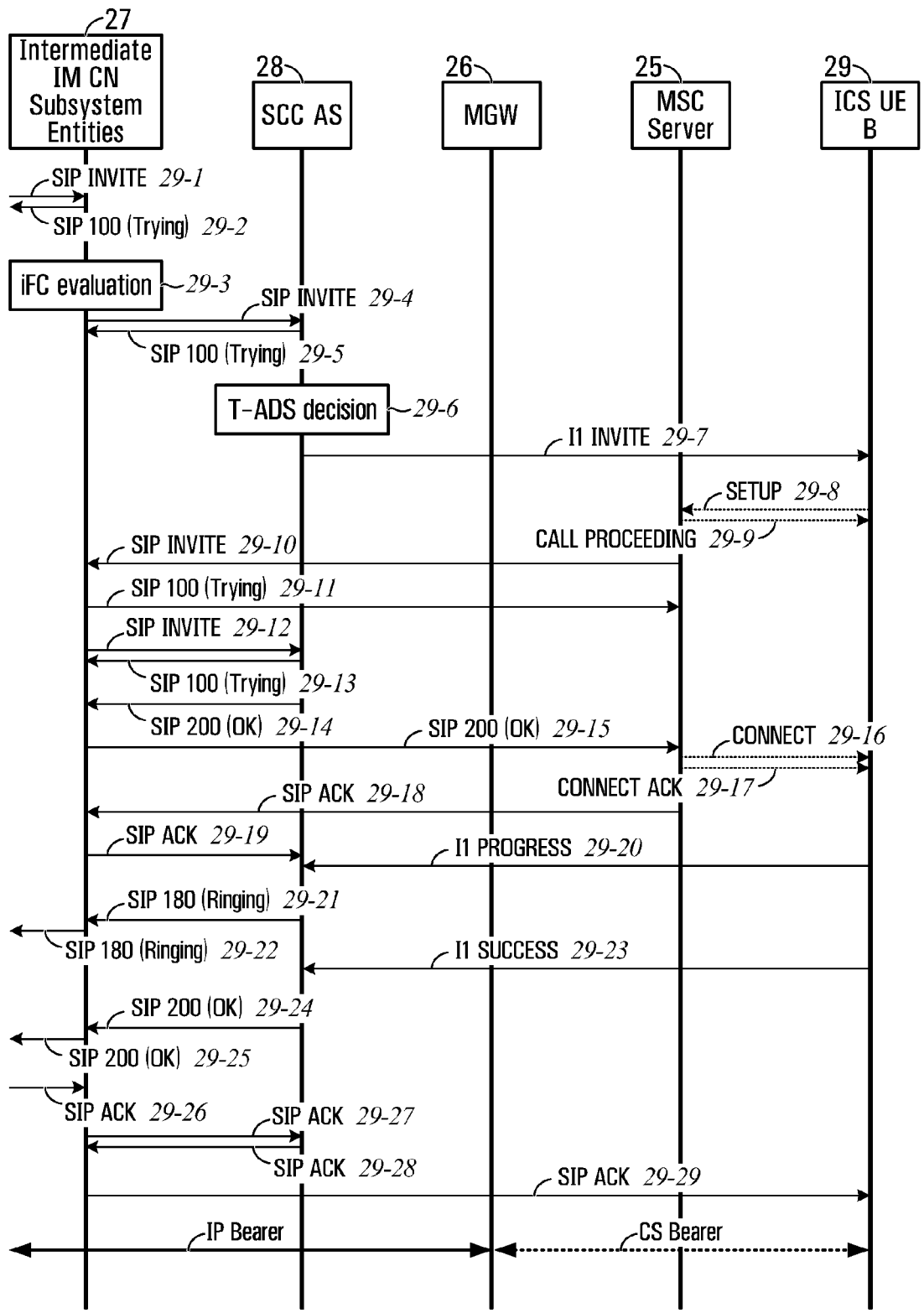

Referring now to FIG. 29, shown is a signaling diagram depicting an ICS session setup as terminating at the ICS UE B 29. The signaling flow shows the termination of a call to the ICS UE B 29 via the I1 interface and represents an embodiment using actual real messages. It is to be understood at the outset that this example is very specific for exemplary purposes only. In this example, in addition to the ICS UE B 29, there is the MSC server 25, the MGW 26, the intermediate IM CN subsystem entities 27, and the SCC AS 28. The ICS session setup as terminating at the ICS UE B 29 will now be described below.

At step 29-1, the intermediate IM CN subsystem entities 27 receive a SIP INVITE request (originating IM CN subsystem to intermediate IM CN subsystem entities in terminating network). In this example, the originating UE (not shown) initiates a voice call though its home IM CN subsystem (home1) with a terminating UE which is ICS capable which is in a different network (home2). Details of the SIP INVITE request are provided below.

---

SIP INVITE request (originating IM CN subsystem to intermediate IM CN subsystem entities in terminating network):

---

INVITE sip:user2_public2@home2.net SIP/2.0
Via: SIP/2.0/UDP icscf2.home2.net;branch=z9hG4bK871y12.1,
    SIP/2.0/UDP
    scscf1.home1.net;branch=z9hG4bK332b23.1,
    SIP/2.0/UDP
    pcscf1.visited1.net;branch=z9hG4bK431h23.1,
    SIP/2.0/UDP
    [5555::aaa:bbb:ccc:ddd]:1357;comp=sigcomp;branch
    =z9hG4bKnashds7
Max-Forwards: 67
Route: <sip:scscf2.home2.net;lr>
Record-Route: <sip:scscf1.home1.net;lr>,
    <sip:pcscf1.visted1.net;lr>
P-Access-Network-Info: 3GPP-UTRAN-TDD; utran-cell-id-
    3gpp=234151D0FCE11

---

SIP INVITE request (originating IM CN subsystem to intermediate IM CN subsystem entities in terminating network):

---

P-Asserted-Identity: "John Doe"
    <sip:user1_public1@home1.net>, <tel:+1-212-555-
    1111>
P-Charging-Vector: icid-
    value="AyretyU0dm+6O2IrT5tAFrbHLso=023551024";
    orig-ioi=home1.net
P-Asserted-Service: urn:urn-xxx:3gpp-
    service.ims.icsi.mmtel
Accept-Contact: *;+g.3gpp.icsi_ref="urn%3Aurn-xxx%3gpp-
    service.ims.icsi.mmtel"
Privacy: none
From: <sip:user1_public1@home1.net>;tag=171828
To: <tel:+1-212-555-2222>
Call-ID: cb03a0s09a2sdfglkj490333
Cseq: 127 INVITE
Supported: 100rel, precondition, gruu
Contact:  ;+g.3gpp.icsi_ref="urn%3Aurn-xxx%3gpp-
    service.ims.icsi.mmtel">
Allow: INVITE, ACK, CANCEL, BYE, PRACK, UPDATE, REFER,
    MESSAGE
Content-Type: application/sdp
Content-Length: (...)
v=0
o=- 2987933615 2987933615 IN IP6 5555::aaa:bbb:ccc:ddd
s=-
c=IN IP6 5555::aaa:bbb:ccc:ddd
t=0 0
m=audio 3456 RTP/AVP 97 0 96
b=AS:25.4
a=curr:qos local sendrcv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20

---

NOTE 1: This example assumes the session originated from a 3GPP Release 8 IMS UE and thus includes the ICSI value defined for MMTel in the Contact header and Accept Contact header. However, termination procedures for ICS do not rely upon the MMTel ICSI value being present in the incoming request.

At step 29-2, the intermediate IM CN subsystem entities 27 send a SIP 100 (Trying) response (intermediate IM CN subsystem entities to originating IM CN subsystem). The intermediate IM CN subsystem entities 27 respond to the originating IM CN subsystem with the SIP 100 (Trying) response. There is no ICS specific content in this response.

At step 29-3, there is evaluation of initial filter criteria. The S-CSCF (part of the intermediate IM CN subsystem entities 27) evaluates initial filter criteria for the served ICS user and as a result routes the SIP INVITE request towards the SCC AS 28.

NOTE 2: for terminating scenario, the SCC AS 28 is configured as the last AS in the terminating iFC chain.

At step 29-4, the intermediate IM CN subsystem entities 27 send to the SCC AS 28 a SIP INVITE request (intermediate IM CN subsystem entities to SCC AS). As a result of iFC evaluation, the S-CSCF routes the INVITE request to the SCC AS 28. Details of the SIP INVITE request are provided below.

| SIP INVITE request (intermediate IM CN subsystem entities to SCC AS): |
|---|
| INVITE sip:user2_public2@home2.net SIP/2.0<br>Via: SIP/2.0/UDP<br>    scscf2.home2.net;branch=z9hG4bK332b33.1,SIP/2.0/<br>    UDP  icscf2.home2.net;branch=z9hG4bK871y12.1,<br>    SIP/2.0/UDP<br>    scscf1.home1.net;branch=z9hG4bK332b23.1,<br>    SIP/2.0/UDP<br>    pcscf1.visited1.net;branch=z9hG4bK431h23.1,<br>    SIP/2.0/UDP<br>    [5555::aaa:bbb:ccc:ddd]:1357;comp=sigcomp;branch<br>    =z9hG4bKnashds7<br>Max-Forwards: 66<br>Route: <sip:sccas2.home2.net;lr>,<br>    <sip: cb03a0s09a2sdfglkj490333@scscf2.home2.net;lr>;<br>    orig-dialog-id="O:73935718_92645110-<br>    712786jd246395302d-zKE"<br>Record-Route: <sip:scscf2.home2.net;lr>,<br>    <sip:scscf1.home1.net;lr>,<br>    <sip:pcscf1.visited1.net;lr><br>P-Access-Network-Info:<br>P-Asserted-Identity:<br>P-Charging-Vector:<br>P-Asserted-Service:<br>Accept-Contact:<br>Privacy:<br>From:<br>To:<br>Call-ID:<br>Cseq:<br>Supported:<br>Contact:<br>Allow:<br>Content-Type:<br>Content-Length:<br>v=0<br>o=-<br>s=-<br>c=<br>t=<br>m=<br>b=<br>a=<br>a=<br>a=<br>a=<br>a=<br>a=<br>a=<br>a= |

At step 29-5, the SCC AS 28 sends to the intermediate IM CN subsystem entities 27 a SIP 100 (Trying) response (SCC AS to intermediate IM CN subsystem entities). The SCC AS 28 responds to the intermediate IM CN subsystem entities 28 with the SIP 100 (Trying) response. There is no ICS specific content in this response.

At step 29-6 there is a terminating access domain selection. The SCC AS 28 performs terminating access domain selection and chooses the CS domain for the setup of the media.

In some implementations, the SCC AS 28 sends to the intermediate IM CN subsystem entities 27 a SIP INVITE request (SCC AS to intermediate IM CN subsystem entities). This signal is not shown in the signaling flow. The SCC AS 28, acting as a routing B2BUA, generates the SIP INVITE request based upon the received SIP INVITE request and sends it to the intermediate subsystem entities 28. The SDP indicates that the ICS UE B should establish a CS media bearer. Details of the SIP INVITE request are provided below.

| SIP INVITE request (MSC server to intermediate IM CN subsystem entities): |
|---|
| INVITE sip:user2_public2@home2.net SIP/2.0<br>Via: SIP/2.0/UDP sccas2.home2.net;branch=z9hG4bKnas34r5<br>Max-Forwards: 65<br>Route:<br>    <sip:cb03a0s09a2sdfglkj490333@scscf2.home2.net;lr>;<br>    orig-dialog-id="O:73935718_92645110-<br>    712786jd246395302d-zKE"<br>P-Access-Network-Info:<br>P-Asserted-Identity:<br>P-Charging-Function-Addresses:<br>    ccf=[5555::b99:c88:d77:e66];<br>    ccf=[5555::a55:b44:c33:d22];<br>    ecf=[5555::1ff:2ee:3dd:4ee];<br>    ecf=[5555::6aa:7bb:8cc:9dd]<br>P-Charging-Vector:<br>P-Asserted-Service:<br>Accept-Contact:<br>Privacy:<br>From:<br>To:<br>Call-ID: f81d4fae-7dec-11d0-a765-00a0c91e6bf6<br>Cseq:<br>Supported:<br>Contact:<br>Allow:<br>Content-Type:<br>Content-Length:<br>v=0<br>o=-<br>s=-<br>c=<br>t=<br>m=<br>b=<br>a=<br>a=<br>a=<br>a=<br>a=<br>a=<br>a=<br>a= |

In some implementations, the intermediate IM CN subsystem entities 27 send to the SCC AS 28 a SIP 100 (Trying) response (intermediate IM CN subsystem entities to SCC AS). This signal is not shown in the signaling flow. The intermediate IM CN subsystem entities 27 respond to the SCC AS 28 with a SIP 100 (Trying) response. There is no ICS specific content in this response.

At step 29-7, the SCC AS 28 sends to the ICE UE B 29 an I1 INVITE request (using I1 Protocol to ICS UE B). The I1 INVITE request is routed towards the called party ICS UE B 29. Details of the I1 INVITE request are shown below.

| I1 INVITE request (SCC AS to ICE UE B using I1 Protocol): |
|---|
| I1 INVITE<br>P-Asserted-Identity:<br>P-Asserted-Service:<br>Accept-Contact:<br>From:<br>To:<br>Call-ID: f81d4fae-7dec-11d0-a765-00a0c91e6bf6<br>Cseq:<br>Contact:<br>Content-Type:<br>Content-Length:<br>v=0<br>o=-<br>s=-<br>c=<br>t= |

I1 INVITE request (SCC AS to ICE UE B using I1 Protocol):

```
m=
b=
a=
a=
a=
a=
a=
a=
a=
a=
```

In some implementations, the ICS UE B 29 sends to the intermediate IM CN subsystem entities 27 a SIP 100 (Trying) response (ICS UE B to intermediate IM CN subsystem entities). This signal is not shown in the signaling flow. The ICS UE B 29 responds to the intermediate IM CN subsystem entities with a SIP 100 (Trying) response. There is no ICS specific content in this response.

At step 29-8, the ICS UE B 29 sends to the MSC Server 25 a SETUP message (ICS UE B to MSC Server enhanced for ICS). The ICS UE B 29 inititates bearer setup in the CS domain by sending the SETUP message to the MSC Server 25 enhanced for ICS. Specifically for this signaling flow, the SETUP message includes:

Called Party Number information element=[(Numbering plan identifier=ISDN/telephony numbering plan), (type of number=international number), (Number digits=1212556666)]. The Called Party Number information element is set to the IUA PSI DN.

Bearer Capability information element=[(information transfer capability=speech), (speech versions=FR AMR, GSM EFR, GSM FR)]

Supported Codec List information element={[(SysID 1=UMTS), (Codec Bitmap for SysID 1=UMTS AMR 2)], [(SysID 2=GSM), (Codec Bitmap for SysID 2=FR AMR, GSM EFR, GSM FR)]}

The MSC Server 25 enhanced for ICS knows the calling party number corresponding to the ICS UE B 29.

At step 29-9, the MSC Server 25 sends to the ICS UE B 29 a CALL PROCEEDING message (MSC Server enhanced for ICS to ICS UE B). Upon receipt of the SETUP message from the ICS UE B 29, the MSC Server 25 enhanced for ICS responds with the CALL PROCEEDING message. There is no ICS specific content in this message.

At step 29-10, the MSC Server 25 sends to the intermediate IM CN subsystem entities 27 a SIP INVITE request (MSC Server enhanced for ICS to intermediate IM CN subsystem entities). The MSC Server 25 enhanced for ICS maps the received SETUP message to the SIP INVITE request which is routed towards the intermediate IM CN subsystem entities 27. The INVITE request is addressed to the IUA PSI DN in the Request-URI. Details of the SIP INVITE request are provided below:

SIP INVITE request (MSC Server enhanced for ICS to intermediate IM CN subsystem entities):

INVITE tel:+1-212-555-6666 SIP/2.0
Via: SIP/2.0/UDP msc2.home2.net;branch=z9hG4bKnashds7
Max-Forwards: 70
Route: <sip:icscf2.home2.net;lr>
P-Asserted-Identity: <tel: +1-212-555-2222>
P-Charging-Vector: icid-
  value="AyretyU0dm+6O2IrT5tAFrbHLso=023551024";
  orig-ioi=home2.net SIP INVITE request (MSC Server enhanced for ICS to intermediate IM CN subsystem entities):

P-Access-Network-Info:
Privacy: none
From: <tel: +1-212-555-2222>;tag=171828
To: <tel:+1-212-555-6666>
Call-ID: f81d4fae-7dec-11d0-a765-00a0c91e6bf6
Cseq: 127 INVITE
Supported: 100rel, precondition
Require: sec-agree
Proxy-Require: sec-agree
Security-Verify: ipsec-3gpp; q=0.1; alg=hmac-sha-1-96;
  spi=87654321; port=7531
Contact:
Allow: INVITE, ACK, CANCEL, BYE, PRACK, UPDATE,
  REFER, MESSAGE
Content-Type: application/sdp
Content-Length: (...)
v=0
o=− 2987933615 2987933615 IN IP6 5555::aaa:bbb:ccc:eee
s=
c=IN IP6 5555::aaa:bbb:ccc:eee
t=0 0
m=audio 3456 RTP/AVP 97 96
b=AS:25.4
a=curr:qos local sendrecv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
Request-URI: UAI PSI DN as received in the SETUP message.
P-Asserted-Identity header: The MSC Server enhanced for ICS
inserts the tel-URI containing the subscriber number, as
received from the ICS UE B.
SDP: The SDP contains preconfigured set of codecs supported by
the MGW.

At step 29-11, the intermediate IM CN subsystem entities 27 send to the MSC Server 25 a SIP 100 (Trying) response (intermediate IM CN subsystem entities to MSC Server enhanced for ICS). The intermediate IM CN subsystem entities 27 respond to the MSC Server 25 enhanced for ICS with the SIP 100 (Trying) response. There is no ICS specific content in this response.

At step 29-12, the intermediate IM CN subsystem entities 27 send to the SCC AS 28 a SIP INVITE request (intermediate IM CN subsystem entities to SCC AS). The SIP INVITE request is sent to the SCC AS 28. Details of the SIP INVITE request are provided below:

SIP INVITE request (MSC Server enhanced for ICS to intermediate IM CN subsystem entities)

INVITE tel:+1-212-555-6666 SIP/2.0
Via: SIP/2.0/UDP
  scscf2.home2.net;branch=z9hG4bK332b33.1,SIP/2.0/
  UDP icscf2.home2.net;branch=z9hG4bK871y12.1,
  SIP/2.0/UDP msc2.home2.net;branch=z9hG4bKnashds7
Max-Forwards: 68
Route: <sip:sccas2.home2.net;lr>,
  <sip: scscf2.home2.net;lr>;orig-dialog-
  id="yuflsae80r3rb3fh31ondyr829cnyr381cn932YDWref
  0w0-wwtg374"
Record-Route: <sip:scscf2.home2.net;lr>
P-Asserted-Identity:
P-Charging-Vector:
P-Access-Network-Info:

| SIP INVITE request (MSC Server enhanced for ICS to intermediate IM CN subsystem entities) |
|---|
| Privacy:<br>From:<br>To:<br>Call-ID:<br>Cseq:<br>Supported:<br>Require:<br>Proxy-Require:<br>Security-Verify:<br>Contact:<br>Allow:<br>Content-Type:<br>Content-Length: (...)<br>v=<br>o=-<br>s=<br>c=<br>t=<br>m=<br>b=<br>a=<br>a=<br>a=<br>a=<br>a=<br>a=<br>a=<br>a= |

At step 29-13, the SCC AS 28 sends to the intermediate IM CN subsystem entities 27 a SIP 100 (Trying) response (SCC AS to intermediate IM CN subsystem entities). The SCC AS 28 responds to the intermediate IM CN subsystem entities 27 with the SIP 100 (Trying) response. There is no ICS specific content in this response.

At step 29-14, the SCC AS 28 sends to the intermediate IM CN subsystem entities 27 a SIP 200 (OK) response (SCC AS to intermediate IM CN subsystem entities). The SCC AS 28 responds to the SIP INVITE request with the SIP 200 (OK) response that includes an SDP answer. Details of the SIP 200 (OK) response are provided below.

| SIP 200 (OK) response (SCC AS to intermediate IM CN subsystem entities): |
|---|
| SIP/2.0 200 OK<br>Via: SIP/2.0/UDP<br>    scscf2.home2.net;branch=z9hG4bK332b33.1,SIP/2.0/<br>    UDP  icscf2.home2.net;branch=z9hG4bK871y12.1,<br>    SIP/2.0/UDP msc2.home2.net;branch=z9hG4bKnashds7<br>Record-Route: <sip:scscf2.home2.net;lr><br>P-Access-Network-Info:<br>Privacy: none<br>From: <tel: +1-212-555-2222>;tag=171828<br>To: <tel:+1-212-555-6666><br>Call-ID: f81d4fae-7dec-11d0-a765-00a0c91e6bf6<br>CSeq:<br>Require: 100rel, precondition<br>Contact:<br>Allow: INVITE, ACK, CANCEL, BYE, PRACK, UPDATE, REFER, MESSAGE<br>Content-Type: application/sdp<br>Content-Length: (...)<br>v=0<br>o=- 2987933623 2987933623 IN IP6 5555::ggg:fff:aaa:bbb<br>s=-<br>c=IN IP6 5555::ggg:fff:aaa:bbb<br>t=0 0<br>m=audio 3456 RTP/AVP 97 96<br>b=AS:25.4<br>a=curr:qos local sendrcv |

| SIP 200 (OK) response (SCC AS to intermediate IM CN subsystem entities): |
|---|
| a=curr:qos remote sendrcv<br>a=des:qos mandatory local sendrecv<br>a=des:qos mandatory remote sendrecv<br>a=rtpmap:97 AMR<br>a=fmtp:97 mode-set=0,2,5,7; mode-change-period=2<br>a=maxptime:20 |

At step 29-15, the intermediate IM CN subsystem entities 27 send to the MSC Server 25 a SIP 200 (OK) response (intermediate IM CN subsystem to MSC Server enhanced for ICS). The intermediate IM CN subsystem entities 27 route the SIP 200 (OK) response to the MSC Server 25 enhanced for ICS.

At step 29-16, the MSC Server 25 sends to the ICS UE B 29 a CONNECT message (MSC Server enhanced for ICS to ICS UE B). The enhance MSC Server 25 maps the received SIP 200 (OK) response to the CONNECT message. There is no ICS specific content in this message.

At step 29-17, the ICS UE B 29 sends to the MSC Server 25 a CONNECT ACKNOWLEDGEMENT message (ICS UE B to MSC Server enhanced for ICS). The ICS UE B 29 sends the CONNECT ACKNOWLEDGMENT message upon receiving the CONNECT message. There is no ICS specific content in this message.

At steps 29-18 and 29-19, the MSC Server 25 sends to the SCC AS 28 via intermediate IM CN subsystem entities 27 a SIP ACK request (MSC Server enhanced for ICS to SCC AS via intermediate IM CN subsystem entities). The MSC Server 25 enhanced for ICS interworks the received CONNECT ACKNOWLEDGEMENT message to the SIP ACK request which is routed to the SCC AS 28 via the intermediate IM CN subsystem entities 27. There is no ICS specific content in this response.

At step 29-20, the ICS UE B 29 sends to SCC AS 28 via intermediate IM CN subsystem entities 27 a SIP 180 (Ringing) response (ICS UE B to SCC AS via intermediate IM CN subsystem entities). The ICS UE B 29 responds to the received SIP INVITE request with the SIP 180 (Ringing) response. The response contains no SDP body and contains no ICS specific content. The SIP 180 (Ringing) response is routed to the SCC AS 28.

At steps 29-21 and 29-22, the SCC AS 28 sends to originating IM CN subsystem a SIP 180 (Ringing) response (SCC AS to originating IM CN subsystem via intermediate IM CN subsystem entities). The SCC AS 28 routes the received SIP 180 (Ringing) response towards the originating network and the calling party.

At steps 29-23, the ICS UE B 29 sends to the intermediate IM CN subsystem entities 27 a SIP 200 (OK) response (ICS UE B to intermediate IM CN subsystem entities). The ICS UE B 29 responds to the received initial SIP INVITE request with the SIP 200 (OK) response. This SIP 200 (OK) response includes an SDP answer from the ICS UE and indicates resources have been reserved and the dialog can be established. Details of the SIP 200 (OK) response are provided below.

| SIP 200 (OK) response (ICS UE B to intermediate IM CN subsystem entities): |
|---|
| SIP/2.0 200 OK<br>Via: SIP/2.0/UDP pcscf2.home2.net;branch=z9hG4bKfeh9083, |

-continued

SIP 200 (OK) response (ICS UE B to intermediate IM CN subsystem entities):

SIP/2.0/UDP
    scscf2.home2.net;branch=z9hG4bK332b44.1,
SIP/2.0/UDP
    sccas2.home2.net;branch=z9hG4bKnas34r5
Record-Route: <sip:pcscf2.visited2.net;lr>,
    <sip:scscf2.home2.net;lr>
P-Access-Network-Info: 3GPP-UTRAN-FDD; utran-cell-id-
    3gpp=234151D0FCE11
Privacy: none
From: <tel: +1-212-555-1111>;tag=171828
To: <tel:+1-212-555-2222>
Call-ID: cb03a0s09a2sdfglkj490333
CSeq:
Require: 100rel, precondition
Contact:
Allow: INVITE, ACK, CANCEL, BYE, PRACK, UPDATE, REFER,
    MESSAGE
Content-Type: application/sdp
Content-Length: (...)
v=0
o=- 2987933623 2987933623 IN IP6 5555::eee:fff:aaa:bbb
s=-
c=IN IP6 5555::eee:fff:aaa:bbb
t=0 0
m=audio 3456 RTP/AVP 97 96
a=curr:qos local sendrcv
a=curr:qos remote sendrcv
a=des:qos mandatory local sendrecv
a=des:qos mandatory remote sendrecv
a=rtpmap:97 AMR
a=fmtp:97 mode-set=0,2,5,7; mode-change-period=2
a=maxptime:20

In some implementations, the intermediate IM CN subsystem entities 27 send to the SCC AS 28 a SIP 200 (OK) response (intermediate IM CN subsystem entities to SCC AS). This signal is not shown in the signaling flow. The SIP 200 (OK) response and final SDP answer from the ICS UE is routed towards the SCC AS 28.

At steps 29-24 and 29-25, the SCC AS 28 sends to the originating IM CN subsystem a SIP 200 (OK) response (SCC AS to originating IM CN subsystem via intermediate IM CN subsystem entities). The SIP 200 OK response is routed towards the originator of the session in the originating IM CN subsystem.

At steps 29-26 and 29-27, the originating IM CN subsystem sends to the SCC AS 28 a SIP ACK request (originating IM CN subsystem to SCC AS via intermediate IM CN subsystem entities and SCC AS). The originating IM CN subsystem sends the SIP ACK request to the SCC AS 28 via the intermediate IM CN subsystem entities 27. There is no ICS specific content in this response.

At steps 29-28 and 29-29, the SCC AS 28 sends to the ICS UE B 29 a SIP ACK request (SCC AS to ICS UE B via intermediate IM CN subsystem entities and SCC AS). The SCC AS 28 sends the SIP ACK request to the ICS UE B 29 via the intermediate IM CN subsystem entities 27. There is no ICS specific content in this response.

The foregoing has shown call termination to a CS UE registered in IMS using an MSC Server enhanced for ICS codec negotiation. This shows ICS UE termination with CS media using Gm reference point when using an MSC Server enhanced for ICS.

Negotiating Capabilities

Session protocols such as SIP use an ASCII format known as SDP (Session Description Protocol) to negotiate media capabilities between end points as to the type and encoding method that is to be used by the end points for interaction. In some implementations, the communications device informs the network node of its capabilities (e.g. media capabilities). This might for example occur at session initiation using a binary encoded format. The network node then constructs the SDP as to negotiate the media on behalf of the communications device. Therefore, the network node uses SDP to negotiate the media formats to be used on behalf of the device. This might occur for example when the network node is executing a plurality of session protocol transactions (or more generally at least one session protocol transaction). Once the negotiation is complete, the network node communicates the resultant agreed media types and encoding schemes back to the communication device using a binary encoded format. Therefore, the communications device receives from the network node an indication of a payload format to be used. This could be similar to an RUA for SDP capability negotiations.

Note that other implementations are possible, with or without binary encoded messages. Furthermore, use of SDP in the manner described above is applicable with or without BEV. For instance, it can be applied when SIP or any other session protocol is used between the end point and the network node.

According to another broad aspect of the disclosure, there is provided a method for execution by a communications device, the method comprising: at session initiation, sending to a network node an indication of media capabilities of the communications device; and receiving from the network an indication of a media format to be used.

According to another broad aspect of the disclosure, there is provided a computer readable medium having computer executable instructions stored thereon for execution on a processor of a communications device so as to implement the method summarised above.

According to another broad aspect of the disclosure, there is provided a mobile device comprising: a wireless access radio configured for communicating with a wireless access network; a processor; and a function configured for implementing the method summarised above.

According to another broad aspect of the disclosure, there is provided a method for execution by a network node, the method comprising: at session initiation, receiving from a communications device an indication of media capabilities of the communications device; when executing at least one SIP transaction, negotiating on behalf of the communications device for a media format to be used; and sending to the communications device an indication of the media format to be used.

According to another broad aspect of the disclosure, there is provided a computer readable medium having computer executable instructions stored thereon for execution on a processor of a network node so as to implement the method summarised above.

According to another broad aspect of the disclosure, there is provided a network node comprising: at least one network interface configured for communicating with a network; a processor; and a function configured for implementing the method summarised above.

Combination of Embodiments

Examples have been provided for initiating and executing a macro operation involving a plurality of session protocol transactions. Examples have also been provided for initiating and executing an operation involving a session protocol transaction without communicating all session protocol responses. Examples have also been provided for negotiating media on behalf of a communications device. It is to be understood that appropriate combinations of these embodiments are contemplated by this disclosure. For instance, initiating and executing a macro operation involving a plurality of session protocol transactions together with initiating and executing an operation involving a session protocol transaction without communicating all session protocol responses is within the scope of this disclosure. Also, negotiating media on behalf of a communications device can be applied to the embodiment for initiating and executing a macro operation. This can also be applied to the embodiment for initiating and executing an operation without communicating all session protocol responses. Those skilled in the art will appreciate that example details provided for one embodiment can similarly apply to other embodiments with modification when appropriate.

Communications Device

As previously noted, embodiments may be practiced generally with a "communications device". There are many possibilities for the communications device. The communications device might for example be a mobile device or MS (mobile station), a user agent, or a UE (user equipment). The communications device may include any personal computer (e.g., desktops, laptops, palmtops, or handheld computing devices) equipped with a suitable wireless modem, or a mobile communications device (e.g., cellular phones or data-enabled handheld devices capable of receiving and sending messages, web browsing, etc.), or any enhanced PDA device or integrated information appliance capable of email, video mail, Internet access, corporate data access, messaging, calendaring and scheduling, information management, and the like.

The communications device can also include electronic devices such as fixed and mobile telephones, personal digital assistants, handheld or laptop computers, smartphones, printers, fax machines, televisions, set top boxes, and other video display devices, home audio equipment and other home entertainment systems, home monitoring and control systems (e.g., home monitoring, alarm systems and climate control systems), enhanced home appliances such as computerized refrigerators and similar devices that have network communications capabilities. The communications device can also include devices that have similar capabilities but that are not readily transportable, such as desktop computers, set-top boxes, TV, IPTV or network nodes.

The communications device can be a SIP UA (User Agent) that can be fixed or mobile. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent," "UA," "user equipment, "UE," and "node" might be used synonymously herein. Those skilled in the art will appreciate that these terms can be used interchangeably within the application.

Communications devices that are mobile may or may not include a memory module that is internal to the device or can be removed. Examples of this being but not limited to: a SIM (subscriber identity module) or a UICC card, possibly including an ISIM application, Compact Flash, MicroSD, R-UIM etc. SIM/UICC functionality may also be provided for by software downloadable SIM/UICC security software. A specific example mobile device is described below with reference to FIG. 30.

Figure 30:
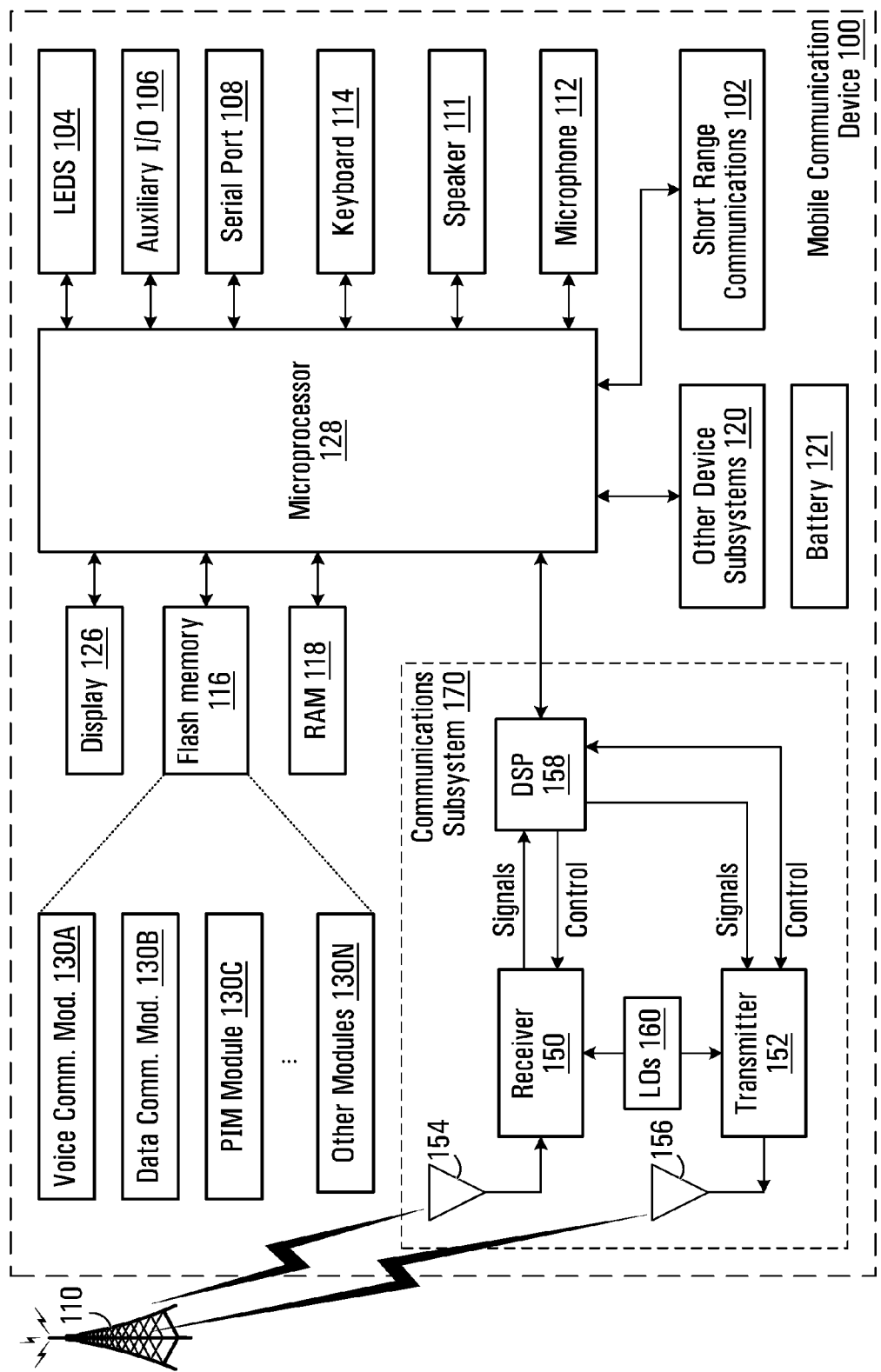
FIG. 30 is a block diagram of another mobile device.

Referring now to FIG. 30, shown is a block diagram of another wireless device 100 that may implement any of the device methods described in this disclosure. The wireless device 100 is shown with specific components for implementing features similar to those of the mobile device 10 of FIG. 1 or the mobile device 10A of FIG. 23. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 12 of the mobile device 10 shown in FIG. 1 or the processor 12 of the mobile device 10A shown in FIG. 23. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the macro operation initiator 14 of the mobile device 10 shown in FIG. 1 and/or the operation initiator 14A of the mobile device 10A shown in FIG. 23. In a specific implementation, the other module 130N of the flash memory 116 stores computer executable instructions that when executed implement a notification initiator. Note that the implementations described with reference to FIG. 30 are very specific for exemplary purposes.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 11 of the mobile device 10 shown in FIG. 1 or the wireless access radio 11 of the mobile device 10A shown in FIG. 23. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Those skilled in the art will recognize that a mobile UE device may sometimes be treated as a combination of a separate ME (mobile equipment) device and an associated removable memory module. Accordingly, for purposes of the present disclosure, the terms "mobile device" and "communications device" are each treated as representative of both ME devices alone as well as the combinations of ME devices with removable memory modules as applicable.

Also, note that a communications device might be capable of operating in multiple modes such that it can engage in both CS (Circuit-Switched) as well as PS (Packet-Switched) communications, and can transition from one mode of communications to another mode of communications without loss of continuity. Other implementations are possible.

Numerous modifications and variations of the present disclosure are possible in light of the above teachings. It is therefore to be understood that within the scope of the appended claims, the disclosure may be practiced otherwise than as specifically described herein.

We claim:

1. A method for execution by a communications device for initiating a macro operation, the method comprising:
    sending, to a network node, a binary encoded message comprising a binary encoded verb from which the network node can determine a plurality of session protocol transactions to be performed with a plurality of servers that are separate from one another and separate from the network node, wherein each session protocol transaction is a SIP 'Session Initiated Protocol' transaction;

running an application that communicates with another device via one or more dialogs over a communication session, the application prompting the binary encoded message for initiating the macro operation involving at least one of the dialogs over the communication session;

establishing a point-to-point data link between the communications device and the network node;

wherein sending the binary encoded message comprises:

sending the binary encoded message free of routing information, the binary encoded message being deliverable to the network node over the point-to-point data link.

2. The method of claim 1 wherein the binary encoded verb is for call swap, unattended call transfer, start of attended call transfer, finish of attended call transfer, or call transfer revert.

3. The method of claim 1 further comprising:

receiving a response from the network node, the response signifying a result of the plurality of session protocol transactions; and if the response signifies that the plurality of session protocol transactions were not successful and the network node could not revert to a state prior to attempting the plurality of session protocol transactions, tearing down the communication session or reverting to a safe known state for at least one of the dialogs over the communication session.

4. The method of claim 1 further comprising:

at session initiation, sending to the network node an indication of capabilities of the communications device; and receiving from the network node an indication of a payload format to be used.

5. A non-transitory computer readable medium having computer executable instructions stored thereon for execution on a processor of a communications device so as to implement the method of claim 1.

6. A mobile device comprising:

a processor;

an application that communicates with another device via one or more dialogs over a communication session;

wherein the application prompts the binary encoded message for initiating a macro operation involving at least one of the dialogs over the communication session; and a tangibly-embodied macro operation initiator configured for:

sending, to a network node, a binary encoded message comprising a binary encoded verb from which the network node can determine a plurality of session protocol transactions to be performed with a plurality of servers that are separate from one another and separate from the network node, wherein each session protocol transaction is a SIP 'Session Initiated Protocol' transaction;

establishing a point-to-point data link between the mobile device and the network node;

wherein the macro operation initiator is configured for sending the binary encoded message by:

sending the binary encoded message free of routing information, the binary encoded message being deliverable to the network node over the point-to-point data link.

7. The mobile device of claim 6 wherein the binary encoded verb is for call swap, unattended call transfer, start of attended call transfer, finish of attended call transfer, or call transfer revert.

8. The mobile device of claim 6 wherein the macro operation initiator is further configured for:

receiving a response from the network node, the response signifying a result of the plurality of session protocol transactions; and if the response signifies that the plurality of session protocol transactions were not successful and the network node could not revert to a state prior to attempting the plurality of session protocol transactions, tearing down the communication session or reverting to a safe known state for at least one of the dialogs over the communication session.

9. The mobile device of claim 6 wherein the macro operation initiator is further configured for:

at session initiation, sending to the network node an indication of capabilities of the communications device; and receiving from the network node an indication of a payload format to be used.

10. A method for execution by a network node for executing a macro operation, the method comprising:

receiving a binary encoded message from a communications device;

determining, based on a binary encoded verb of the binary encoded message, a plurality of session protocol transactions to be performed with a plurality of servers that are separate from one another and separate from the network node, wherein each session protocol transaction is a SIP 'Session Initiated Protocol' transaction;

attempting the plurality of session protocol transactions with the plurality of servers;

maintaining a communication session supporting one or more dialogs between the communications device and a session protocol device;

wherein the plurality of session protocol transactions collectively correspond to a macro operation involving at least one of the dialogs over the communication session;

if any of the plurality of session protocol transactions are unsuccessful, attempting to revert to a state prior to attempting the plurality of session protocol transactions; and providing a response to the communications device, the response signifying a result of the plurality of session protocol transactions establishing a point-to-point data link between the communications device and the network node;

wherein receiving the binary encoded message comprises:

receiving the binary encoded message free of routing information, the binary encoded message being deliverable to the network node over the point-to-point data link.

11. The method of claim 10 wherein the binary encoded verb is for call swap, unattended call transfer, start of attended call transfer, finish of attended call transfer, or call transfer revert.

12. The method of claim 10 further comprising:

executing the plurality of session protocol transactions without communicating all session protocol responses relating to the session protocol transactions.

13. The method of claim 10 further comprising:

if any of the plurality of session protocol transactions are unsuccessful, attempting to revert to a state prior to attempting the plurality of session protocol transactions; and providing a response to the communications device, the response signifying a result of the plurality of session protocol transactions.

14. The method of claim 10 further comprising:

at session initiation, receiving from the communications device an indication of capabilities of the communications device;

when executing the plurality of session protocol transactions, negotiating on behalf of the communications device for a payload format to be used; and sending to the communications device an indication of the payload format to be used.

15. A non-transitory computer readable medium having computer executable instructions stored thereon for execution on a processor of a server so as to implement the method of claim 10.

16. A network node comprising:
a processor; and
a tangibly-embodied macro operation executer configured for:
receiving a binary encoded message from a communications device by receiving the binary encoded message free of routing information, the binary encoded message being deliverable to the network node over the point-to-point data link;
determining, based on a binary encoded verb of the binary encoded message, a plurality of session protocol transactions to be performed with a plurality of servers that are separate from one another and separate from the network node, wherein each session protocol transaction is a SIP 'Session Initiated Protocol' transaction;
attempting the plurality of session protocol transactions with the plurality of servers;
maintaining a communication session supporting one or more dialogs between the communications device and a session protocol device;
wherein the plurality of session protocol transactions collectively correspond to a macro operation involving at least one of the dialogs over the communication session;
establishing a point-to-point data link between the communications device and the network node.

17. The network node of claim 16 wherein the binary encoded verb is for call swap, unattended call transfer, start of attended call transfer, finish of attended call transfer, or call transfer revert.

18. The network node of claim 16 wherein the network node is configured for: executing the plurality of session protocol transactions without communicating all session protocol responses relating to the session protocol transactions.

19. The network node of claim 16 wherein the macro operation executer is further configured for:
if any of the plurality of session protocol transactions are unsuccessful, attempting to revert to a state prior to attempting the plurality of session protocol transactions; and
providing a response to the communications device, the response signifying a result of the plurality of session protocol transactions.

20. The network node of claim 16 wherein the macro operation executer is further configured for:
at session initiation, receiving from the communications device an indication of capabilities of the communications device;
when executing the plurality of session protocol transactions, negotiating on behalf of the communications device for a payload format to be used; and sending to the communications device an indication of the payload format to be used.

* * * * *